US012804119B2

(12) United States Patent
Shimizu et al.

(10) Patent No.: US 12,804,119 B2
(45) Date of Patent: Nov. 17, 2026

(54) AIR FLOATING VIDEO DISPLAY APPARATUS

(71) Applicant: Maxell, Ltd., Kyoto (JP)

(72) Inventors: Takuya Shimizu, Kyoto (JP); Koji Fujita, Kyoto (JP)

(73) Assignee: MAXELL, LTD., Kyoto (JP)

( * ) Notice: Subject to any disclaimer, the term of this patent is extended or adjusted under 35 U.S.C. 154(b) by 34 days.

(21) Appl. No.: 19/126,267

(22) PCT Filed: Nov. 27, 2023

(86) PCT No.: PCT/JP2023/042419
§ 371 (c)(1),
(2) Date: May 1, 2025

(87) PCT Pub. No.: WO2024/122391
PCT Pub. Date: Jun. 13, 2024

(65) Prior Publication Data

US 2026/0230594 A1 Aug. 6, 2026

(30) Foreign Application Priority Data

Dec. 9, 2022 (JP) ................................ 2022-197143

(51) Int. Cl.
*H04N 13/32* (2018.01)
*G02B 27/28* (2006.01)
*G02B 30/56* (2020.01)

(52) U.S. Cl.
CPC ........... *H04N 13/32* (2018.05); *G02B 27/283* (2013.01); *G02B 27/286* (2013.01); *G02B 30/56* (2020.01)

(58) Field of Classification Search
CPC .... H04N 13/32; G02B 27/283; G02B 27/286; G02B 30/56
See application file for complete search history.

(56) References Cited

U.S. PATENT DOCUMENTS

2009/0109404 A1* 4/2009 Thornton ............ H04N 13/388 353/10
2018/0024373 A1 1/2018 Joseph et al.
(Continued)

FOREIGN PATENT DOCUMENTS

JP 2019-128722 A 8/2019
WO WO-2017099116 A1 * 6/2017 .............. G02B 5/12
(Continued)

OTHER PUBLICATIONS

International Search Report of PCT/JP2023/042419 dated Jan. 30, 2024.

*Primary Examiner* — Fernando Alcon
(74) *Attorney, Agent, or Firm* — MATTINGLY & MALUR, PC

(57) ABSTRACT

An air floating video display apparatus includes a display configured to display a video, a first polarization separator, a second polarization separator, and one or plurality of retroreflection plates, a display screen of the display includes a first video display region and a second video display region, and a video light emitted from the first video display region of the display screen of the display forms a first air floating video in air after passing through the first polarization separator and a retroreflection by any one retroreflection plate included in the one or plurality of retroreflection plates, and a video light emitted from the second video display region of the display screen of the display forms a second air floating video in air after passing through or reflection by the second polarization separator and a retroreflection by any one retroreflection plate included in the one or plurality of retroreflection plates.

28 Claims, 43 Drawing Sheets

(56) References Cited

U.S. PATENT DOCUMENTS

| | | | | |
|---|---|---|---|---|
| 2018/0188548 | A1 | 7/2018 | Frayne et al. | |
| 2019/0227489 | A1 | 7/2019 | Tokuchi | |
| 2022/0308693 | A1* | 9/2022 | Edo | G06F 3/042 |
| 2022/0382066 | A1* | 12/2022 | Hikichi | G02B 27/0093 |
| 2022/0397762 | A1* | 12/2022 | Bae | G02B 27/0103 |
| 2022/0413317 | A1* | 12/2022 | Daiku | G02B 30/56 |
| 2023/0168742 | A1* | 6/2023 | Lin | G06F 3/0346 348/51 |
| 2024/0045227 | A1* | 2/2024 | Takahashi | G02B 30/56 |
| 2024/0061240 | A1* | 2/2024 | Hirata | G02B 27/0101 |
| 2024/0192518 | A1* | 6/2024 | Noda | G02B 27/283 |
| 2024/0241390 | A1* | 7/2024 | Ye | G02B 30/56 |
| 2024/0255773 | A1 | 8/2024 | Hirata et al. | |
| 2024/0255775 | A1* | 8/2024 | Niu | G02B 30/56 |
| 2024/0280830 | A1* | 8/2024 | Kikuta | G02B 30/56 |
| 2025/0008078 | A1* | 1/2025 | Philipp | B60K 35/00 |

FOREIGN PATENT DOCUMENTS

| | | | | |
|---|---|---|---|---|
| WO | 2022/249800 | A1 | 12/2022 | |
| WO | WO-2023037813 | A1 * | 3/2023 | H04N 13/398 |

* cited by examiner

AIR FLOATING VIDEO DISPLAY APPARATUS

TECHNICAL FIELD

The present invention relates to an air floating video display apparatus.

BACKGROUND ART

For example, Patent Document 1 discloses an air floating information display technology.

Related Art Documents Patent Documents

Patent Document 1: Japanese Unexamined Patent Application Publication No. 2019-128722

SUMMARY OF THE INVENTION

Problems to be Solved by the Invention

However, in the disclosure of Patent Document 1, sufficient consideration has not been given to the configuration for obtaining practical brightness and quality of an air floating video, the configuration for enabling a user to visually recognize an air floating video more enjoyably, and the like.

An object of the present invention is to provide a more favorable air floating video display apparatus.

Means for Solving the Problems

In order to solve the problem described above, for example, the configuration described in claims is adopted. Although this application includes a plurality of means for solving the problem, one example thereof can be presented as an air floating video display apparatus configured to display an air floating video, and the air floating video display apparatus includes a display configured to display a video, a first polarization separator, a second polarization separator, and one or plurality of retroreflection plates, a display screen of the display includes a first video display region and a second video display region, and a video light emitted from the first video display region of the display screen of the display forms a first air floating video in air after undergoing a passage through the first polarization separator and a retroreflection by any one retroreflection plate included in the one or plurality of retroreflection plates, and a video light emitted from the second video display region of the display screen of the display forms a second air floating video in air after undergoing a passage or reflection by the second polarization separator and a retroreflection by any one retroreflection plate included in the one or plurality of retroreflection plates, whereby the first air floating video and the second air floating video form air floating videos in multiple layers having different depths as viewed from a user.

Effects of the Invention

According to the present invention, it is possible to realize a more favorable air floating video display apparatus. Other problems, configurations, and effects will become apparent in the following description of embodiments.

DETAILED DESCRIPTION OF PREFERRED EMBODIMENTS

Figure 1:
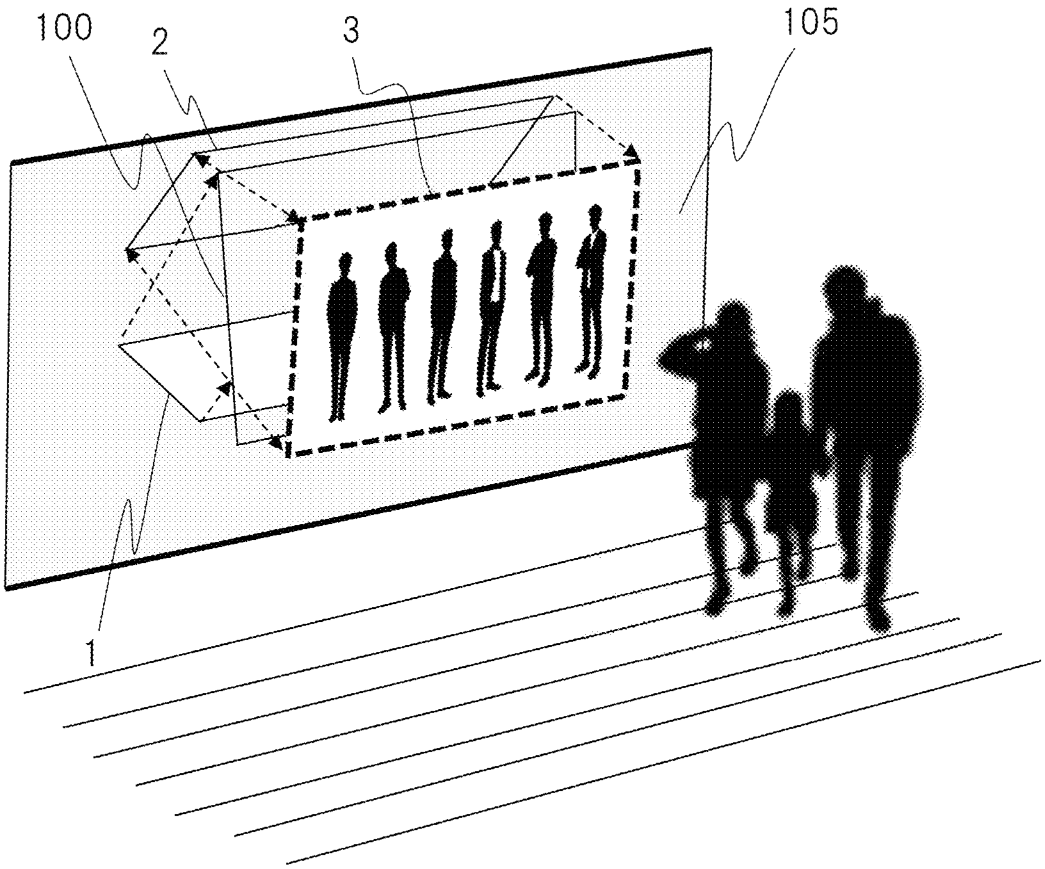
FIG. 1 is a diagram showing an example of usage form of an air floating video display apparatus according to one embodiment of the present invention.

Hereinafter, embodiments of the present invention will be described in detail with reference to drawings. Note that the present invention is not limited to the described embodiments, and various changes and modifications can be made by those skilled in the art within the scope of the technical idea disclosed in this specification. Further, in all the drawings for describing the present invention, components having the same function are denoted by the same reference characters, and the repetitive descriptions will be omitted in some cases.

The following embodiment s relate to a video display apparatus capable of transmitting a video by video light from a video light emitting source through a transparent member that partitions a space such as a glass and displaying the video as an air floating video outside the transparent member. In the following description of the embodiments, a video floating in the air is expressed by the term "air floating video." Instead of this term, expressions such as "aerial image", "space image", "aerial floating video", "air floating optical image of a display image", "aerial floating optical image of a display image", etc. may be used. The term "air floating video" mainly used in the description of the embodiments is used as a representative example of these terms.

According to the following embodiments, for example, it is possible to realize a video display apparatus suitable for an ATM of a bank, a ticket vending machine of a station, a digital signage, or the like. For example, though a touch panel is generally used in an ATM of a bank, a ticket vending machine of a station, or the like at present, it becomes possible to display high-resolution video information above a transparent glass surface or a light-transmitting plate material in a state of floating in the air. At this time, by making the divergence angle of the emitted video light small, that is, an acute angle, and further aligning the video light with a specific polarized wave, only the normal reflected light is efficiently reflected with respect to the retroreflection plate, so that the light utilization efficiency can be increased, the ghost image which is generated in addition to the main air floating image and is a problem in the conventional retroreflective system can be suppressed, and a clear air floating video can be obtained. Also, with the apparatus including the light source of the present embodiment, it is possible to provide a novel and highly usable air floating video display apparatus (air floating video display system) capable of significantly reducing power consumption. Further, it is also possible to provide an in-vehicle air floating video display apparatus capable of displaying a so-called unidirectional air floating video which can be visually recognized inside and/or outside the vehicle.

First Embodiment

<Example of Usage Form of Air Floating Video Display Apparatus>

FIG. 1 is a diagram showing an example of usage form of an air floating video display apparatus according to one embodiment of the present invention, and is a diagram showing an entire configuration of the air floating video display apparatus according to the present embodiment. Although a specific configuration of the air floating video display apparatus will be described in detail with reference to FIG. 2 and the like, light of a specific polarized wave with narrow-angle directional characteristics is emitted from a video display apparatus 1 as a video light flux, once enters a retroreflection plate 2 thorough reflection or the like on an optical system in the air floating video display apparatus, is retroreflected and passes through a transparent member 100 (glass or the like), thereby forming an aerial image (air floating video 3) which is a real image on the outside of the glass surface. In the following description of the embodiments, the retroreflection plate 2 (retroreflective plate) will be used as an example of a retroreflector. However, the retroreflection plate 2 of the present invention is not limited to a planar plate, and is used as an example of a concept including a sheet-like retroreflector attached to a planar or non-planar member or an entire assembly in which a sheet-like retroreflector is attached to a planar or non-planar member.

In a store or the like, a space is partitioned by a show window (referred to also as "window glass") 105 which is a translucent member such as glass. With the air floating video display apparatus of the present embodiment, the floating video can be displayed in one direction to the outside and/or the inside of the store (space) through such a transparent member.

In FIG. 1, the inner side of the window glass 105 (the inside of the store) is shown on the far side in the depth direction, and the outer side thereof (e.g., a sidewalk) is shown on the near side. On the other hand, it is also possible to form an aerial image at a desired position in the store by providing a reflector configured to reflect a specific polarized wave on the window glass 105 and reflecting the light by the reflector.

<Configuration Example of Optical System of Air Floating Video Display Apparatus>

Figure 2A:
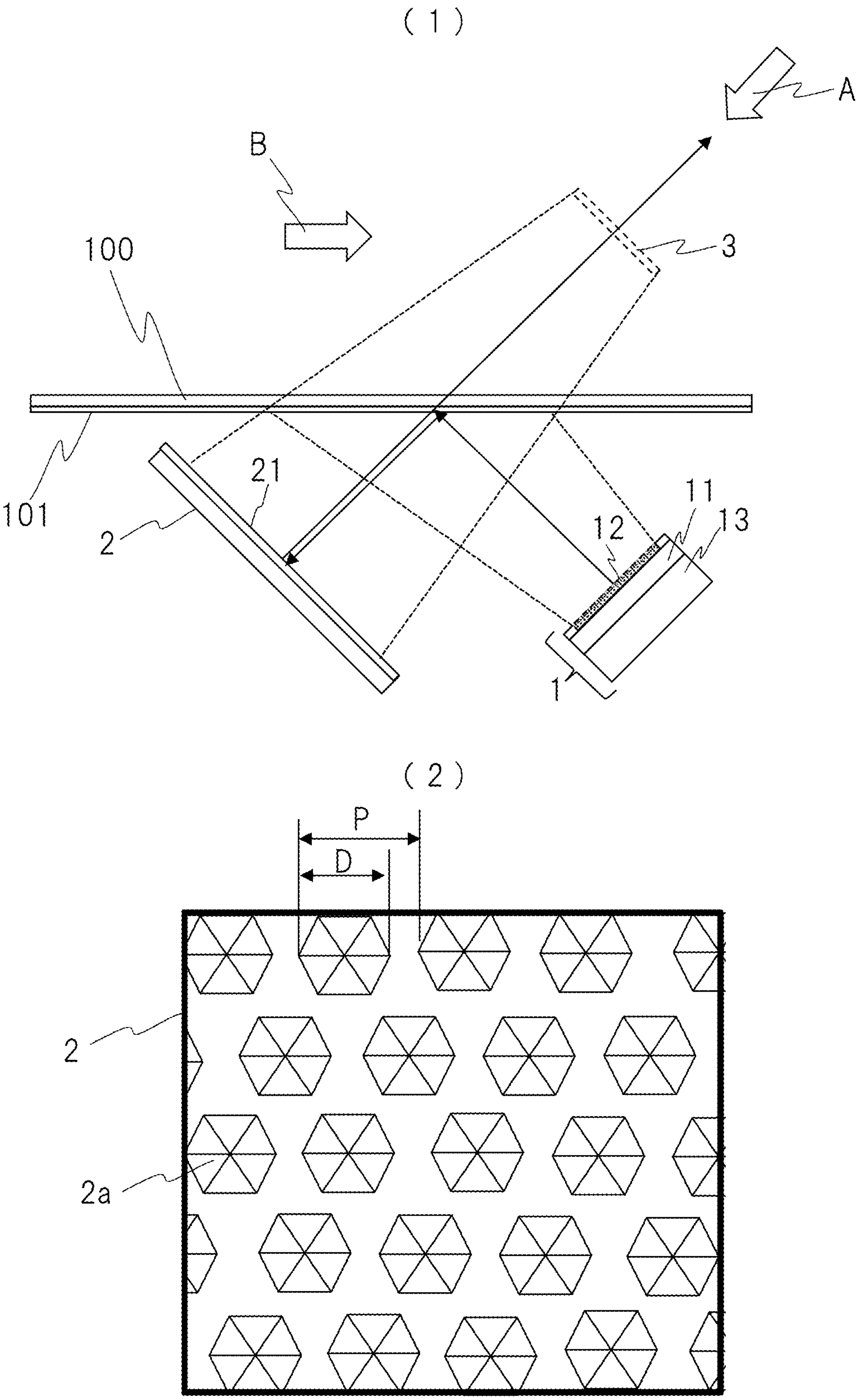
FIG. 2A is a diagram showing an example of a configuration of a main part and a configuration of a retroreflection portion of the air floating video display apparatus according to one embodiment of the present invention.

FIG. 2A is a diagram showing an example of a configuration of an optical system of the air floating video display apparatus according to one embodiment of the present invention. The configuration of the air floating video display apparatus will be described more specifically with reference to FIG. 2A. As shown in FIG. 2A(1), the display apparatus 1 which diverges video light of a specific polarized wave at a narrow angle is provided in the oblique direction of the transparent member 100 such as glass. The display apparatus 1 includes a liquid crystal display panel 11 and a light source apparatus 13 configured to generate light of a specific polarized wave having narrow-angle diffusion characteristics.

The video light of a specific polarized wave from the display apparatus 1 is reflected by a polarization separator 101 having a film selectively reflecting the video light of a specific polarized wave and provided on the transparent member 100 (in the drawing, the polarization separator 101 is formed in a sheet shape and is adhered to the transparent member 100), and enters the retroreflection plate 2. A λ/4 plate 21 is provided on the video light incident surface of the retroreflection plate 2. The video light passes through the λ/4 plate 21 twice at the time when the video light enters the retroreflection plate 2 and at the time when the video light is emitted from the retroreflection plate 2, whereby the video light is subjected to polarization conversion from a specific polarized wave to the other polarized wave. Here, since the polarization separator 101 which selectively reflects the video light of a specific polarized wave has a property of transmitting the polarized light of the other polarized wave subjected to the polarization conversion, the video light of the specific polarized wave after the polarization conversion passes through the polarization separator 101. The video light that has passed through the polarization separator 101 forms the air floating video 3, which is a real image, on the outside of the transparent member 100.

Here, a first example of a polarization design in the optical system in FIG. 2A will be described. For example, the configuration in which the video light of S polarization is emitted from the display apparatus 1 to the polarization separator 101 and the polarization separator 101 has the property of reflecting S polarization and transmitting P polarization is also possible. In this case, the video light of S polarization that has reached the polarization separator 101 from the display apparatus 1 is reflected by the polarization separator 101 and is directed toward the retroreflection plate 2. Since the video light passes through the λ/4 plate 21 provided on the incident surface of the retroreflection plate 2 twice when the video light is reflected by the retroreflection plate 2, the video light is converted from S-polarized light into P-polarized light. The video light converted into P-polarized light is directed toward the polarization separator 101 again. Here, since the polarization separator 101 has the property of reflecting S polarization and transmitting P polarization, the video light of P polarization passes through the polarization separator 101 and then passes through the transparent member 100. Since the video light that has passed through the transparent member 100 is the light generated by the retroreflection plate 2, the air floating video 3 which is an optical image of the displayed video of the display apparatus 1 is formed at a position having a mirror relationship with the displayed video of the display apparatus 1 with respect to the polarization separator 101. With the polarization design described above, the air floating video 3 can be favorably formed.

Next, a second example of the polarization design in the optical system in FIG. 2A will be described. For example, the configuration in which the video light of P polarization is emitted from the display apparatus 1 to the polarization separator 101 and the polarization separator 101 has the property of reflecting P polarization and transmitting S polarization is also possible. In this case, the video light of P polarization that has reached the polarization separator 101 from the display apparatus 1 is reflected by the polarization separator 101 and is directed toward the retroreflection plate 2. Since the video light passes through the λ/4 plate 21 provided on the incident surface of the retroreflection plate 2 twice when the video light is reflected by the retroreflection plate 2, the video light is converted from P-polarized light into S-polarized light. The video light converted into S-polarized light is directed toward the polarization separator 101 again. Here, since the polarization separator 101 has the property of reflecting P polarization and transmitting S polarization, the video light of S polarization passes through the polarization separator 101 and then passes through the transparent member 100. Since the video light that has passed through the transparent member 100 is the light generated by the retroreflection plate 2, the air floating video 3 which is an optical image of the displayed video of the display apparatus 1 is formed at a position having a mirror relationship with the displayed video of the display apparatus 1 with respect to the polarization separator 101. With the polarization design described above, the air floating video 3 can be favorably formed.

Note that the light that forms the air floating video 3 is a set of light rays converging from the retroreflection plate 2 to the optical image of the air floating video 3, and these light rays go straight even after passing through the optical image of the air floating video 3. Therefore, the air floating video 3 is a video having high directivity, unlike diffused video light formed on a screen by a general projector or the like. Therefore, in the configuration of FIG. 2A, when the user visually recognizes the air floating video 3 from the direction of an arrow A, the air floating video 3 is visually recognized as a bright video. However, when another person visually recognizes the video from the direction of an arrow B, the air floating video 3 cannot be visually recognized as a video at all. These characteristics are very suitable for use in a system that displays a video requiring high security or a highly confidential video that is desired to be kept secret from a person facing the user.

Note that, depending on the performance of the retroreflection plate 2, the polarization axes of the video light after the reflection may become uneven, and the reflection angles may also become uneven. Such uneven light does not maintain the polarization state and traveling angle assumed in design in some cases. For example, such light with the polarization state and traveling angle that are not assumed in design may directly enter the video display surface of the liquid crystal display panel 11 again from the position of the retroreflection plate 2 without passing through the polarization separator. Also, such light with the polarization state and traveling angle that are not assumed in design may enter the video display surface of the liquid crystal display panel 11 again after being reflected by components in the air floating video display apparatus. The light that has entered the video display surface of the liquid crystal display panel 11 again is reflected again on the video display surface of the liquid crystal display panel 11 constituting the display apparatus 1, so that a ghost image is generated and the image quality of the air floating image is deteriorated in some cases. Thus, in the present embodiment, an absorptive polarization plate 12 may be provided on the video display surface of the display apparatus 1. The video light emitted from the display apparatus 1 is transmitted through the absorptive polarization plate 12, and the reflected light returning from the polarization separator 101 is absorbed by the absorptive polarization plate 12, whereby the re-reflection described above can be suppressed. In this way, it is possible to prevent deterioration in image quality due to a ghost image of an air floating image. Specifically, in the configuration in which the video light of S polarization is emitted from the display apparatus 1 to the polarization separator 101, the polarization plate that absorbs P-polarized light can be used as the absorptive polarization plate 12. Also, in the configuration in which the video light of P polarization is emitted from the display apparatus 1 to the polarization separator 101, the polarization plate that absorbs S-polarized light can be used as the absorptive polarization plate 12.

The polarization separator 101 described above may be formed of, for example, a reflective polarization plate or a metal multilayer film that reflects a specific polarized wave.

Then, FIG. 2A(2) shows a surface shape of a retroreflection plate manufactured by Nippon Carbide Industries Co., Inc. used in this study as the typical retroreflection plate 2. The light ray that enters regularly arranged hexagonal columns is reflected by the wall surfaces and bottom surfaces of the hexagonal columns and emitted as retroreflected light in a direction corresponding to the incident light, and an air floating video which is a real image is displayed based on the video displayed on the display apparatus 1.

The resolution of the air floating image largely depends on the outer shape D and pitch P of the retroreflection portions of the retroreflection plate 2 shown in FIG. 2A(2), in addition to the resolution of the liquid crystal display panel 11. For example, when a 7-inch WUXGA (1920×1200 pixels) liquid crystal display panel is used, even if one pixel (one triplet) is about 80 μm, one pixel of the air floating image is about 300 μm if the diameter D of the retroreflection portion is 240 μm and the pitch is 300 μm, for example. Therefore, the effective resolution of the air floating video is reduced to about ⅓.

Therefore, in order to make the resolution of the air floating video equal to the resolution of the display apparatus 1, it is desired that the diameter and the pitch of the retroreflection portions are close to one pixel of the liquid crystal display panel. On the other hand, in order to suppress the occurrence of moire caused by the retroreflection plate and the pixels of the liquid crystal display panel, it is preferable to design each pitch ratio so as not to be an integral multiple of one pixel. Further, the shape is preferably arranged such that any one side of the retroreflection portion does not overlap with any one side of one pixel of the liquid crystal display panel.

Note that the surface shape of the retroreflection plate according to the present embodiment is not limited to the above example, and the retroreflection plate may have a variety of surface shapes to realize the retroreflection. Specifically, a retroreflective element in which triangular pyramidal prisms, hexagonal pyramidal prisms, other polygonal prisms, or combinations thereof are regularly arranged may be provided on the surface of the retroreflection plate of the present embodiment. Alternatively, a retroreflective element in which these prisms are regularly arranged to form cube corners may be provided on the surface of the retroreflection plate of the present embodiment. Moreover, a capsule-lens retroreflection element in which glass beads are regularly arranged may be provided on the surface of the retroreflection plate of the present embodiment. Since existing techniques can be used for the detailed configurations of these retroreflective elements, detailed description thereof will be omitted. Specifically, it is possible to use the techniques disclosed in Japanese Unexamined Patent Application Publications No. 2001-33609, No. 2001-264525, No. 2005-181555, No. 2008-70898, No. 2009-229942, and others.

<Another Configuration Example (1) of Optical System of Air Floating Video Display Apparatus>

Another configuration example of the optical system of the air floating video display apparatus will be described with reference to FIG. 2B. Note that it is assumed that components in FIG. 2B denoted by the same reference characters as those in FIG. 2A have the same functions and configurations as those in FIG. 2A. The repetitive descriptions for such components will be omitted to simplify the description.

Figure 2B:
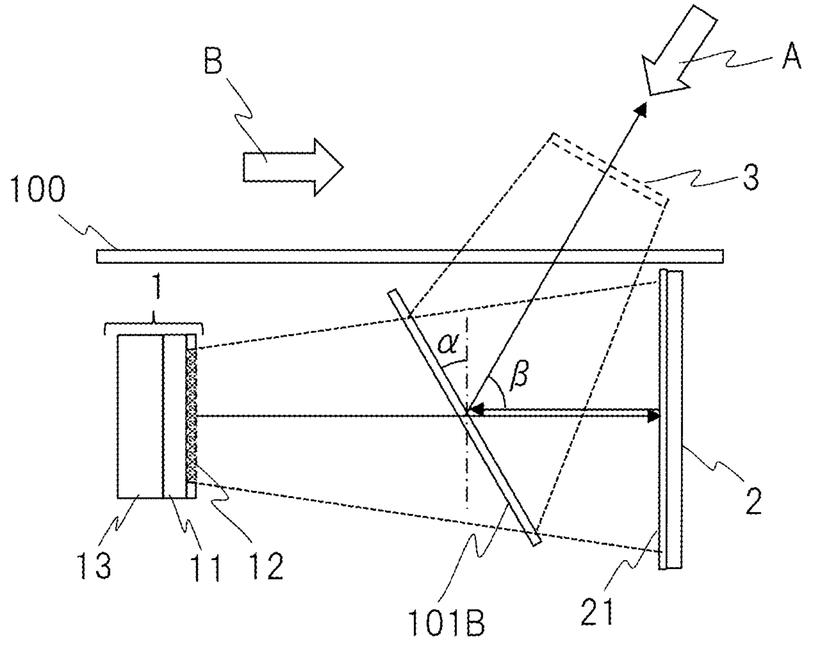
FIG. 2B is a diagram showing an example of a configuration of a main part and a configuration of a retroreflection portion of the air floating video display apparatus according to one embodiment of the present invention.

In the optical system in FIG. 2B, video light of a specific polarized wave is output from the display apparatus 1 as in FIG. 2A. The video light of a specific polarized wave output from the display apparatus 1 is input to a polarization separator 101B. The polarization separator 101B is a member that selectively transmits video light of a specific polarized wave. Unlike the polarization separator 101 in FIG. 2A, the polarization separator 101B is not integrated with the transparent member 100 but has a plate-like shape independently. Therefore, the polarization separator 101B may be expressed as a polarization separation plate. For example, the polarization separator 101B may be configured as a reflective polarization plate obtained by attaching a polarization separation sheet on a transparent member. Alternatively, the polarization separator 101B may be formed by attaching a metal multilayer film that selectively transmits a specific polarized wave and reflects the other specific polarized wave, on a transparent member. In FIG. 2B, the polarization separator 101B is configured so as to transmit the video light of a specific polarized wave output from the display apparatus 1.

The video light that has passed through the polarization separator 101B enters the retroreflection plate 2. The λ/4 plate 21 is provided on the video light incident surface of the retroreflection plate. The video light is subjected to polarization conversion from a specific polarized wave to the other polarized wave by passing through the λ/4 plate 21 twice at the time when it enters the retroreflection plate and at the time when it is emitted therefrom. Here, since the polarization separator 101B has a property of reflecting the light of the other polarized wave that has been subjected to the polarization conversion by the λ/4 plate 21, the video light after the polarization conversion is reflected by the polarization separator 101B. The video light reflected by the polarization separator 101B passes through the transparent member 100, and forms the air floating video 3 which is a real image outside the transparent member 100.

Here, a first example of polarization design in the optical system in FIG. 2B will be described. For example, the configuration in which the video light of P polarization is emitted from the display apparatus 1 to the polarization separator 101B and the polarization separator 101B has a property of reflecting S polarization and transmitting P polarization is also possible. In this case, the video light of P polarization that has reached the polarization separator 101B from the display apparatus 1 passes through the polarization separator 101B and travels toward the retroreflection plate 2. Since the video light passes through the λ/4 plate 21 provided on the incident surface f the retroreflection plate 2 twice when it is reflected by the retroreflection plate 2, the video light is converted from P-polarized light into S-polarized light. The video light converted into S-polarized light is directed to the polarization separator 101B again. Here, since the polarization separator 101B has a property of reflecting S polarization and transmitting P polarization, the video light of S polarization is reflected by the polarization separator 101 and passes through the transparent member 100. Since the video light that has passed through the transparent member 100 is the light generated by the retroreflection plate 2, the air floating video 3 which is an optical image of the displayed video of the display apparatus 1 is formed at a position having a mirror relationship with the displayed image of the display apparatus 1 with respect to the polarization separator 101B. With the polarization design described above, the air floating video 3 can be favorably formed.

Next, a second example of a polarization design in the optical system in FIG. 2B will be described. For example, the configuration in which the video light of S polarization is emitted from the display apparatus 1 to the polarization separator 101B and the polarization separator 101B has the property of reflecting P polarization and transmitting S polarization is also possible. In this case, the video light of S polarization that has reached the polarization separator 101B from the display apparatus 1 passes through the polarization separator 101B and is directed toward the retroreflection plate 2. Since the video light passes through the λ/4 plate 21 provided on the incident surface of the retroreflection plate 2 twice when the video light is reflected by the retroreflection plate 2, the video light is converted from S-polarized light into P-polarized light. The video light converted into P-polarized light is directed toward the polarization separator 101B again. Here, since the polarization separator 101B has the property of reflecting P polarization and transmitting S polarization, the video light of P polarization is reflected by the polarization separator 101 and then passes through the transparent member 100. Since the video light that has passed through the transparent member 100 is the light generated by the retroreflection plate 2, the air floating video 3 which is an optical image of the displayed video of the display apparatus 1 is formed at a position having a mirror relationship with the displayed video of the display apparatus 1 with respect to the polarization separator 101B. With the polarization design described above, the air floating video 3 can be favorably formed.

In FIG. 2B, the video display surface of the display apparatus 1 and the surface of the retroreflection plate 2 are arranged parallel to each other. The polarization separator 101B is arranged so as to be inclined at an angle α (for example, 30°) with respect to the video display surface of the display apparatus 1 and the surface of the retroreflection plate 2. Then, in the reflection by the polarization separator 101B, the traveling direction of the video light reflected by the polarization separator 101B (direction of principal light ray of the video light) differs by an angle β (for example, 60°) from the traveling direction of the video light emitted from the retroreflection plate 2 (direction of principal light ray of the video light). With this configuration, in the optical system in FIG. 2B, the video light is output at a predetermined angle shown in the drawing toward the outside of the transparent member 100, and the air floating video 3 which is a real image is formed. In the configuration of FIG. 2B, when the user visually recognizes the air floating video 3 from the direction of an arrow A, the air floating video 3 is visually recognized as a bright video. However, when another person visually recognizes the video from the direction of an arrow B, the air floating video 3 cannot be visually recognized as a video at all. These characteristics are particularly suitable for use in a system that displays a video requiring high security or a highly confidential video that is desired to be kept secret from a person facing the user.

As described above, although the optical system in FIG. 2B has a different configuration from the optical system in FIG. 2A, it is possible to form a favorable air floating video like the optical system in FIG. 2A.

Note that it is also possible to provide an absorptive polarization plate on the surface of the transparent member 100 on the side closer to the polarization separator 101B. As the absorptive polarization plate, an absorptive polarization plate that transmits the polarized wave of the video light from the polarization separator 101B and absorbs the polarized wave whose phase is different by 90° from the polarized wave of the video light from the polarization separator 101B can be provided. In this way, the external light that enters the transparent member 100 from the side of the air floating video 3 can be reduced by about 50%, while sufficiently transmitting the video light for forming the air floating video 3. As a result, it is possible to reduce stray light in the optical system in FIG. 2B due to external light entering the transparent member 100 from the side of the air floating video 3.

<Another Configuration Example (2) of Optical System of Air Floating Video Display Apparatus>

Another configuration example of the optical system of the air floating video display apparatus will be described with reference to FIG. 2C. Note that it is assumed that components in FIG. 2C denoted by the same reference characters as those in FIG. 2B have the same functions and configurations as those in FIG. 2B. The repetitive descriptions for such components will be omitted to simplify the description.

Figure 2C:
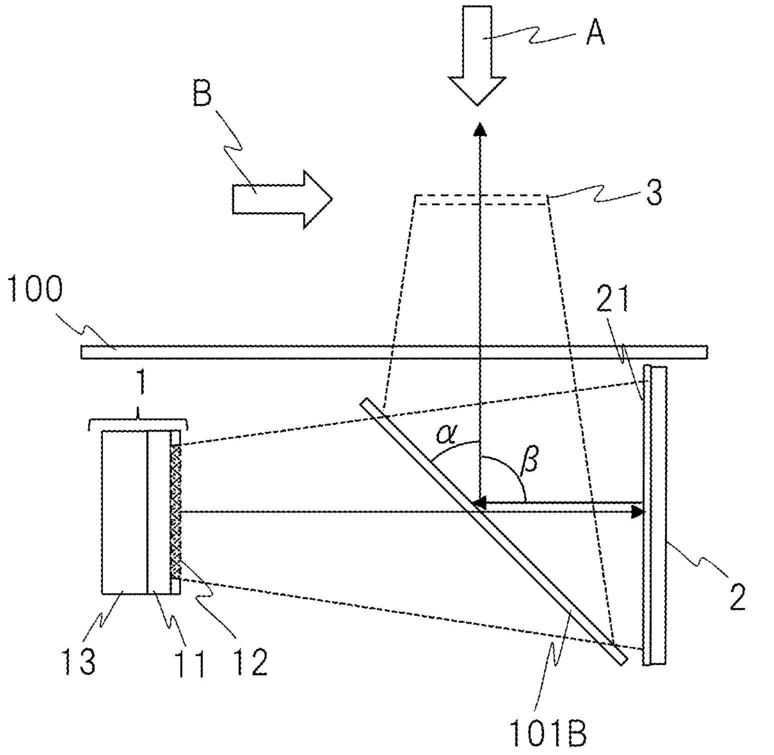
FIG. 2C is a diagram showing an example of a configuration of a main part and a configuration of a retroreflection portion of the air floating video display apparatus according to one embodiment of the present invention.

The optical system in FIG. 2C is different from the optical system in FIG. 2B only in the arrangement angle of the polarization separator 101B with respect to the video display surface of the display apparatus 1 and the surface of the retroreflection plate 2. All of the other configurations are the same as those of the optical system in FIG. 2B, and thus the repetitive descriptions will be omitted. The polarization design of the optical system in FIG. 2C is also similar to the polarization design of the optical system in FIG. 2B, and thus the repetitive descriptions will be omitted.

In the optical system in FIG. 2C, the polarization separator 101B is arranged so as to be inclined at an angle $\alpha$ with respect to the video display surface of the display apparatus 1 and the surface of the retroreflection plate 2. In FIG. 2C, the angle $\alpha$ is 45°. With this configuration, in the reflection of the polarization separator 101B, the angle $\beta$ formed by the traveling direction of the video light reflected by the polarization separator 101B (direction of principal light ray of the video light) with respect to the traveling direction of the video light entering from the retroreflection plate 2 (direction of principal light ray of the video light) is 90°. As a result, the video display surface of the display apparatus 1 and the surface of the retroreflection plate 2 are in a perpendicular relationship with the traveling direction of the video light reflected by the polarization separator 101B, and the angular relationship of the surfaces constituting the optical system can be simplified. The angular relationship of the surfaces constituting the optical system can be more simplified if the surface of the transparent member 100 is arranged so as to be orthogonal to the traveling direction of the video light reflected by the polarization separator 101B. In the configuration in FIG. 2C, when the user visually recognizes the air floating video 3 from the direction of an arrow A, the air floating video 3 is visually recognized as a bright video. However, when another person visually recognizes the video from the direction of an arrow B, the air floating video 3 cannot be visually recognized as a video at all. These characteristics are particularly suitable for use in a system that displays a video requiring high security or a highly confidential video that is desired to be kept secret from a person facing the user.

As described above, although the optical system in FIG. 2C has a different configuration from the optical systems in FIG. 2A and FIG. 2B, it is possible to form a favorable air floating video like the optical systems in FIG. 2A and FIG. 2B. Furthermore, the angles of the surfaces constituting the optical system can be simplified.

Note that it is also possible to provide an absorptive polarization plate on the surface of the transparent member 100 on the side closer to the polarization separator 101B. As the absorptive polarization plate, an absorptive polarization plate that transmits the polarized wave of the video light from the polarization separator 101B and absorbs the polarized wave whose phase is different by 90° from the polarized wave of the video light from the polarization separator 101B can be provided. In this way, the external light that enters the transparent member 100 from the side of the air floating video 3 can be reduced by about 50%, while sufficiently transmitting the video light for forming the air floating video 3. As a result, it is possible to reduce stray light in the optical system in FIG. 2C due to external light entering the transparent member 100 from the side of the air floating video 3.

According to the optical systems in FIG. 2A, FIG. 2B, and FIG. 2C described above, it is possible to provide a brighter higher-quality air floating video.

<<Block Diagram of Internal Configuration of Air Floating Video Display Apparatus>>

Figure 3:
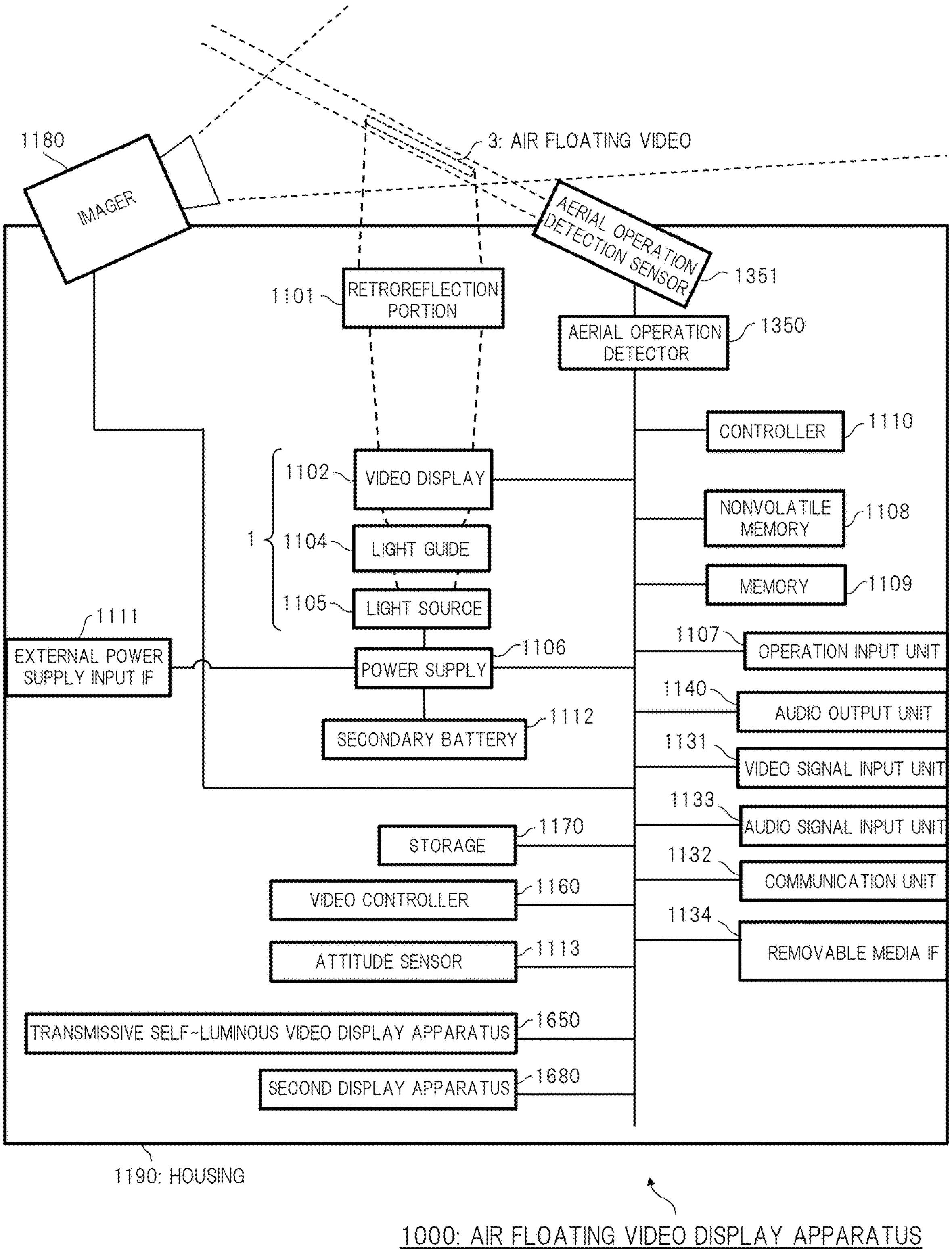
FIG. 3 is a diagram showing a configuration example of an air floating video display apparatus according to one embodiment of the present invention.

Next, a block diagram of an internal configuration of an air floating video display apparatus 1000 will be described. FIG. 3 is a block diagram showing an example of an internal configuration of the air floating video display apparatus 1000.

The air floating video display apparatus 1000 includes a retroreflection portion 1101, a video display 1102, a light guide 1104, a light source 1105, a power supply 1106, an external power supply input interface 1111, an operation input unit 1107, a nonvolatile memory 1108, a memory 1109, a controller 1110, a video signal input unit 1131, an audio signal input unit 1133, a communication unit 1132, an aerial operation detection sensor 1351, an aerial operation detector 1350, an audio output unit 1140, a video controller 1160, a storage 1170, an imager 1180, and the like. Note that the air floating video display apparatus 1000 may include a removable media interface 1134, an attitude sensor 1113, a transmissive self-luminous video display apparatus 1650, a second display apparatus 1680, a secondary battery 1112, and the like.

Each component of the air floating video display apparatus 1000 is arranged in a housing 1190. Note that the imager 1180 and the aerial operation detection sensor 1351 shown in FIG. 3 may be provided outside the housing 1190.

The retroreflection portion 1101 in FIG. 3 corresponds to the retroreflection plate 2 in FIG. 2A, FIG. 2B, and FIG. 2C. The retroreflection portion 1101 retroreflects the light modulated by the video display 1102. Of the reflected light from the retroreflection portion 1101, the light output to the outside of the air floating video display apparatus 1000 forms the air floating video 3.

The video display 1102 in FIG. 3 corresponds to the liquid crystal display panel 11 in FIG. 2A, FIG. 2B, and FIG. 2C. The light source 1105 in FIG. 3 corresponds to the light source apparatus 13 in FIG. 2A, FIG. 2B, and FIG. 2C. Further, the video display 1102, the light guide 1104, and the light source 1105 in FIG. 3 correspond to the display apparatus 1 in FIG. 2A, FIG. 2B, and FIG. 2C.

The video display 1102 is a display that generates a video by modulating transmitted light based on a video signal input under the control of the video controller 1160 to be described below. The video display 1102 corresponds to the liquid crystal display panel 11 in FIG. 2A, FIG. 2B, and FIG. 2C. As the video display 1102, for example, a transmissive liquid crystal panel is used. Alternatively, as the video display 1102, for example, a reflective liquid crystal panel using a method of modulating reflected light, a DMD (Digital Micromirror Device: registered trademark) panel, or the like may be used.

The light source 1105 is configured to generate light for the video display 1102, and is a solid-state light source such as an LED light source or a laser light source. The power supply 1106 converts an AC current input from the outside through the external power supply input interface 1111 into a DC current, and supplies power to the light source 1105. Further, the power supply 1106 supplies a necessary DC current to each unit in the air floating video display apparatus 1000. The secondary battery 1112 stores power supplied from the power supply 1106. Also, the secondary battery 1112 supplies power to the light source 1105 and other configurations that require power when power is not supplied from outside via the external power supply input interface 1111. In other words, when the air floating video display apparatus 1000 includes the secondary battery 1112, the user can use the air floating video display apparatus 1000 even when power is not supplied from outside.

The light guide 1104 guides the light generated by the light source 1105 and irradiates the video display 1102 with the light. A combination of the light guide 1104 and the light source 1105 may be referred to also as a backlight of the video display 1102. The light guide 1104 may have a configuration mainly made of glass. The light guide 1104 may have a configuration mainly made of plastic. The light guide 1104 may have a configuration using a mirror. Various configurations are possible as the combination of the light guide 1104 and the light source 1105. A specific configuration example of the combination of the light guide 1104 and the light source 1105 will be described later in detail.

The aerial operation detection sensor 1351 is a sensor that detects an operation on the air floating video 3 by a finger of a user 230. For example, the aerial operation detection sensor 1351 senses a range overlapping with the entire display range of the air floating video 3. Note that the aerial operation detection sensor 1351 may sense only a range overlapping with at least a part of the display range of the air floating video 3.

Specific examples of the aerial operation detection sensor 1351 include a distance sensor using invisible light such as infrared light, an invisible light laser, an ultrasonic wave, or the like. Also, the aerial operation detection sensor 1351 may be configured to be able to detect coordinates on a two-dimensional plane by combining a plurality of sensors. Further, the aerial operation detection sensor 1351 may be composed of a ToF (Time of Flight) type LiDAR (Light Detection and Ranging) or an image sensor.

The aerial operation detection sensor 1351 is not particularly limited as long as it can perform sensing for detecting a touch operation or the like on an object displayed as the air floating video 3 by a finger of the user. Such sensing can be performed by using an existing technique.

The aerial operation detector 1350 acquires a sensing signal from the aerial operation detection sensor 1351, and determines whether or not the finger of the user 230 has touched an object in the air floating video 3 and calculates the position (touch position) where the finger of the user 230 has touched the object, based on the sensing signal. The aerial operation detector 1350 is composed of, for example, a circuit such as a FPGA (Field Programmable Gate Array). Also, a part of the functions of the aerial operation detector 1350 may be implemented by software, for example, by a program for aerial operation detection executed by the controller 1110.

The aerial operation detection sensor 1351 and the aerial operation detector 1350 may be built in the air floating video display apparatus 1000, or may be provided outside separately from the air floating video display apparatus 1000. When provided separately from the air floating video display apparatus 1000, the aerial operation detection sensor 1351 and the aerial operation detector 1350 are configured to be able to transmit information and signals to the air floating video display apparatus 1000 via a wired or wireless communication connection path or video signal transmission path.

Also, the aerial operation detection sensor 1351 and the aerial operation detector 1350 may be provided separately. In this way, it is possible to construct a system in which the air floating video display apparatus 1000 without the aerial operation detection function is provided as a main body and only the aerial operation detection function can be added as an option. Further, the configuration in which only the aerial operation detection sensor 1351 is provided separately and the aerial operation detector 1350 is built in the air floating video display apparatus 1000 is also possible. In a case such as when it is desired to arrange the aerial operation detection sensor 1351 more freely with respect to the installation position of the air floating video display apparatus 1000, the configuration in which only the aerial operation detection sensor 1351 is provided separately is advantageous.

The imager 1180 is a camera having an image sensor, and is configured to capture the image of the space near the air floating video 3 and/or the face, arms, fingers, and the like of the user 230. A plurality of imagers 1180 may be provided. By using a plurality of imagers 1180 or by using an imager with a depth sensor, it is possible to assist the aerial operation detector 1350 in the detection processing of the touch operation on the air floating video 3 by the user 230. The imager 1180 may be provided separately from the air floating video display apparatus 1000. When the imager 1180 is provided separately from the air floating video display apparatus 1000, the imager 1180 may be configured to be able to transmit imaging signals to the air floating video display apparatus 1000 via a wired or wireless communication connection path or the like.

For example, when the aerial operation detection sensor 1351 is configured as an object intrusion sensor that detects whether or not an object has intruded a plane (intrusion detection plane) including the display plane of the air floating video 3, the aerial operation detection sensor 1351 may not be able to detect information indicating how far an object (e.g., a finger of the user) that has not intruded the intrusion detection plane is away from the intrusion detection plane or how close the object is to the intrusion detection plane.

In such a case, it is possible to calculate the distance between the object and the intrusion detection plane by using information such as depth calculation information of the object based on the captured images of the plurality of imagers 1180 or depth information of the object by the depth sensor. Further, these pieces of information and various kinds of information such as the distance between the object and the intrusion detection plane are used for various kinds of display control for the air floating video 3.

Alternatively, the aerial operation detector 1350 may detect a touch operation on the air floating video 3 by the user 230 based on the image captured by the imager 1180 without using the aerial operation detection sensor 1351.

Further, the imager 1180 may capture an image of the face of the user 230 who operates the air floating video 3, and the controller 1110 may perform the identification processing of the user 230. Also, in order to determine whether or not another person is standing around or behind the user 230 who operates the air floating video 3 and the person is peeking at the operation of the user 230 on the air floating video 3, the imager 1180 may capture an image of a range including the user 230 who operates the air floating video 3 and the surrounding region of the user 230.

The operation input unit 1107 is, for example, an operation button or a signal receiver or an infrared receiver such as a remote controller, and receives an input of a signal regarding an operation different from the aerial operation (touch operation) by the user 230. The operation input unit 1107 may be used by, for example, an administrator to operate the air floating video display apparatus 1000 apart from the above-described user 230 who performs the touch operation on the air floating video 3.

The video signal input unit 1131 is connected to an external video output unit and receives an input of video data. Various digital video input interfaces may be used as the video signal input unit 1131. For example, the video signal input unit 1131 can be configured by a video input interface of the HDMI (High-Definition Multimedia Interface (registered trademark)) standard, a video input interface of the DVI (Digital Visual Interface) standard, or a video input interface of the DisplayPort standard. Alternatively, an analog video input interface such as analog RGB or composite video may be provided. The audio signal input unit 1133 is connected to an external audio output unit and receives an input of audio data. The audio signal input unit 1133 can be configured by an audio input interface of the HDMI standard, an optical digital terminal interface, a coaxial digital terminal interface, or the like. In the case of the interface of the HDMI standard, the video signal input unit 1131 and the audio signal input unit 1133 may be configured as an interface having integrated terminal and cable. The audio output unit 1140 can output audio based on the audio data input to the audio signal input unit 1133. The audio output unit 1140 may be configured by a speaker. Also, the audio output unit 1140 may output a built-in operation sound or error warning sound. Alternatively, a configuration to output a digital signal to an external device like the Audio Return Channel function specified in the HDMI standard may be adopted as the audio output unit 1140.

The nonvolatile memory 1108 stores various kinds of data used in the air floating video display apparatus 1000. The data stored in the nonvolatile memory 1108 include, for example, data for various operations to be displayed in the air floating video 3, display icons, data of objects to be operated by user, layout information, and the like. The memory 1109 stores video data to be displayed as the air floating video 3, data for controlling the apparatus, and the like.

The controller 1110 controls the operation of each unit connected thereto. Also, the controller 1110 may perform arithmetic operation based on information acquired from each unit in the air floating video display apparatus 1000 in cooperation with a program stored in the memory 1109.

The communication unit 1132 communicates with an external device, an external server, or the like via a wired or wireless communication interface. When the communication unit 1132 has a wired communication interface, the wired communication interface may be configured by, for example, the LAN interface of the Ethernet standard. When the communication unit 1132 has a wireless communication interface, the wireless communication interface may be configured by, for example, the communication interface of the Wi-Fi standard, the communication interface of the Bluetooth standard, or the 4G or 5G mobile communication interface. Various kinds of data such as video data, image data, and audio data are transmitted and received through communication via the communication unit 1132.

Further, the removable media interface 1134 is an interface configured to connect removable recording media (removable media). The removable recording media (removable media) may be configured by a semiconductor memory such as solid state drive (SSD), a magnetic recording storage device such as hard disk drive (HDD), or an optical recording media such as an optical disc. The removable media interface 1134 can read various kinds of information such as video data, image data, audio data, and others recorded in the removable recording media. The video data, image data, and others recorded in the removable recording media are output as the air floating video 3 via the video display 1102 and retroreflection portion 1101.

The storage 1170 is a storage device that records various kinds of information, for example, various kinds of data such as video data, image data, and audio data. The storage 1170 may be configured by a magnetic recording storage device such as a hard disk drive (HDD), a semiconductor element memory such as a solid state drive (SSD), or the like. In the storage 1170, for example, various kinds of information, for example, various kinds of data such as video data, image data, and audio data may be recorded in advance at the time of product shipment. In addition, the storage 1170 may record various kinds of information, for example, various kinds of data such as video data, image data, and audio data acquired from an external device, an external server, or the like via the communication unit 1132.

The video data, the image data, and the like recorded in the storage 1170 are output as the air floating video 3 via the video display 1102 and the retroreflection portion 1101. Video data, image data, and the like of display icons, an object to be operated by a user, and the like which are displayed as the air floating video 3 are also recorded in the storage 1170.

Layout information of display icons, an object, and the like displayed as the air floating video 3, information of various kinds of metadata related to the object, and the like are also recorded in the storage 1170. The audio data recorded in the storage 1170 is output as audio from, for example, the audio output unit 1140.

The video controller 1160 performs various kinds of control related to a video signal to be input to the video display 1102. The video controller 1160 may be referred to as a video processing circuit, and may be configured by hardware such as ASIC, FPGA, or video processor. Note that the video controller 1160 may be referred to also as a video processing unit or an image processing unit. For example, the video controller 1160 performs the control of video switching for determining which of a video signal stored in the memory 1109 or a video signal (video data) input to the video signal input unit 1131 is to be input to the video display 1102.

Also, the video controller 1160 may perform the control to form a composite video as the air floating video 3 by generating a superimposed video signal obtained by superimposing the video signal stored in the memory 1109 and the video signal input from the video signal input unit 1131 and inputting the superimposed video signal to the video display 1102.

Further, the video controller 1160 may perform the control to perform image processing on the video signal input from the video signal input unit 1131, the video signal to be stored in the memory 1109, or the like. Examples of the image processing include scaling processing for enlarging, reducing, and deforming an image, brightness adjustment processing for changing luminance, contrast adjustment processing for changing a contrast curve of an image, and retinex processing for decomposing an image into light components and changing weighting for each component.

In addition, the video controller 1160 may perform special effect video processing or the like for assisting an aerial operation (touch operation) of the user 230 to the video signal to be input to the video display 1102. The special effect video processing is performed based on, for example, the detection result of the touch operation of the user 230 by the aerial operation detector 1350 and the captured image of the user 230 by the imager 1180.

The attitude sensor 1113 is a sensor configured by a gravity sensor, an acceleration sensor, or a combination thereof, and can detect the attitude with which the air floating video display apparatus 1000 is installed. Based on the attitude detection result of the attitude sensor 1113, the controller 1110 may control the operation of each connected unit. For example, when an unfavorable attitude as the usage state of the user is detected, control to stop the display of the video displayed on the video display 1102 and display an error message to the user may be performed. Alternatively, when the attitude sensor 1113 detects that the installation attitude of the air floating video display apparatus 1000 has changed, control to rotate the display direction of the video displayed on the video display 1102 may be performed.

As described above, the air floating video display apparatus 1000 is provided with various functions. However, the air floating video display apparatus 1000 does not need to have all of these functions, and may have any configuration as long as the apparatus has a function of forming the air floating video 3.

<Configuration Example of Air Floating Video Display Apparatus>

Next, the configuration example of the air floating video display apparatus will be described. As the layout of the components of the air floating video display apparatus according to the present embodiment, various layouts are possible depending on the usage form. Each layout in FIG. 4A to FIG. 4M will be described below. Note that, in any of the examples in FIG. 4A to FIG. 4M, a thick line surrounding the air floating video display apparatus 1000 indicates an example of the housing structure of the air floating video display apparatus 1000.

Figure 4A:
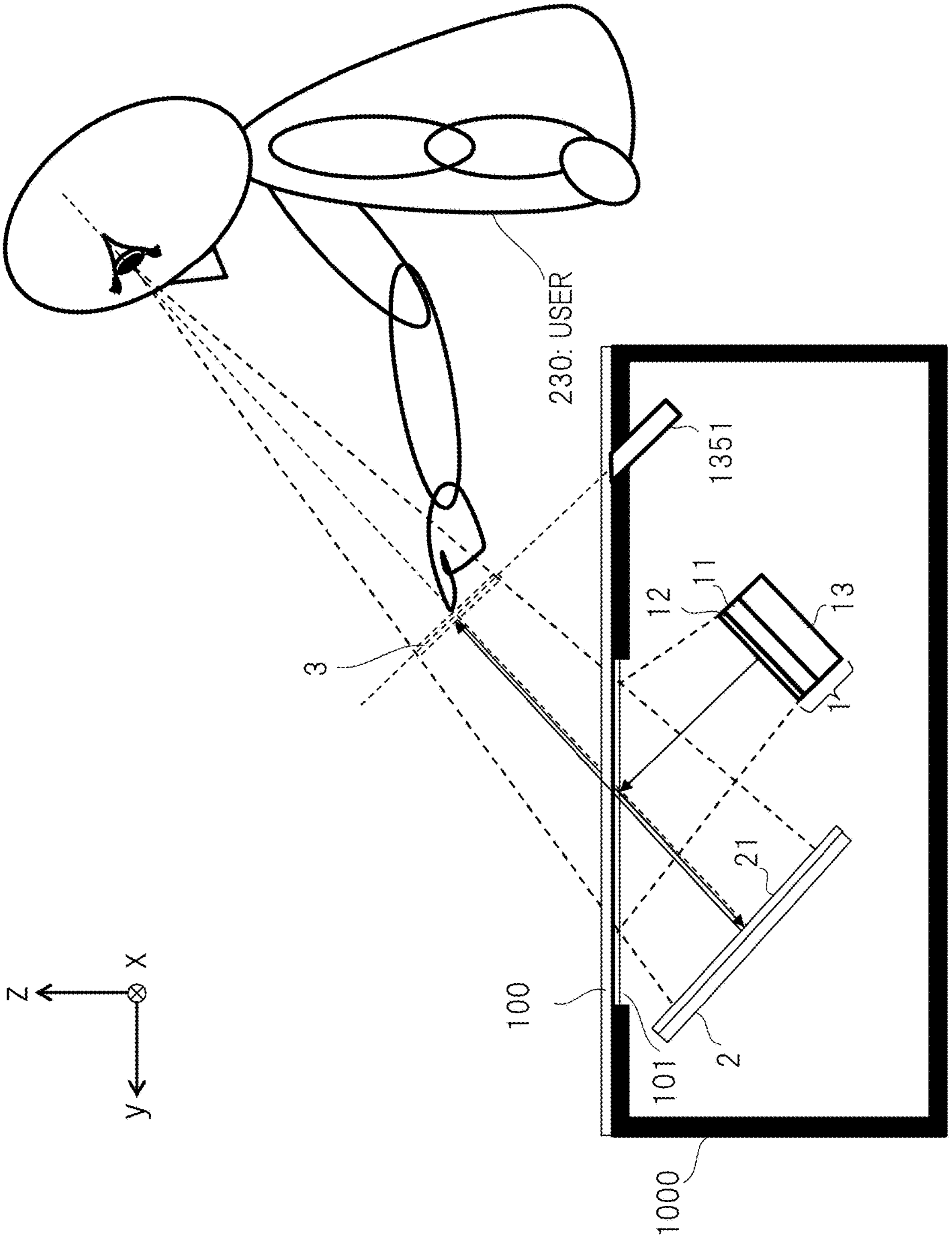
FIG. 4A is a diagram showing an example of the configuration of the air floating video display apparatus according to one embodiment of the present invention.

FIG. 4A is a diagram showing an example of the configuration of the air floating video display apparatus. The air floating video display apparatus 1000 shown in FIG. 4A is mounted with an optical system corresponding to the optical system shown in FIG. 2A. The air floating video display apparatus 1000 shown in FIG. 4A is installed horizontally such that the surface on the side where the air floating video 3 is formed faces upward. Namely, in FIG. 4A, the air floating video display apparatus 1000 has the transparent member 100 placed on an upper surface of the apparatus. The air floating video 3 is formed above the surface of the transparent member 100 of the air floating video display apparatus 1000. The light of the air floating video 3 travels obliquely upward. When the aerial operation detection sensor 1351 is provided as shown in the drawing, it is possible to detect the operation on the air floating video 3 by the finger of the user 230. Note that the x direction is the left-right direction when viewed from the user, the y direction is the front-rear direction (depth direction) when viewed from the user, and the z direction is the up-down direction (vertical direction). Hereinafter, since the definitions of the x direction, y direction, and z direction are the same in each drawing of FIG. 4A to FIG. 4M, repetitive description will be omitted.

Figure 4B:
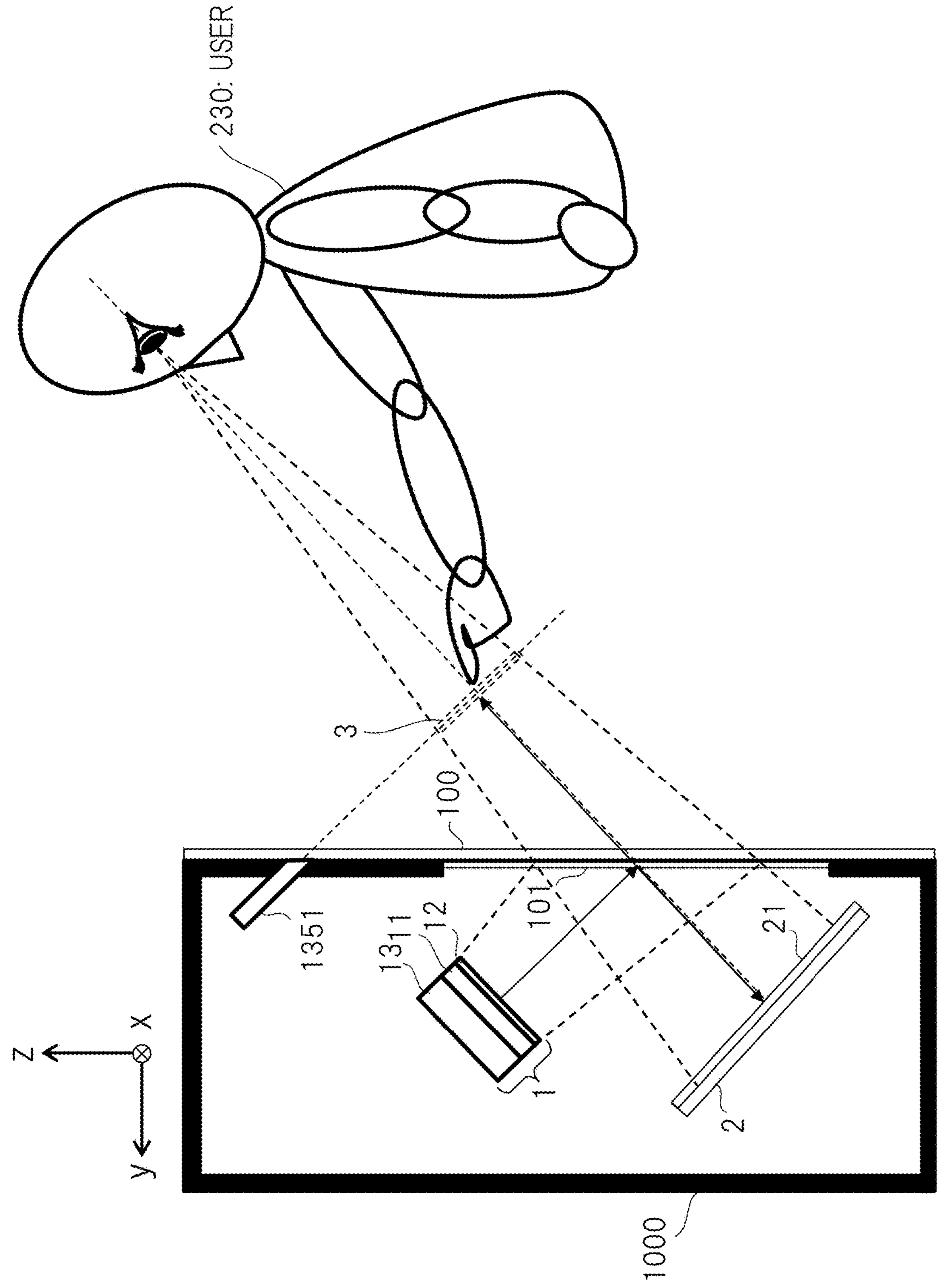
FIG. 4B is a diagram showing an example of the configuration of the air floating video display apparatus according to one embodiment of the present invention.

FIG. 4B is a diagram showing an example of the configuration of the air floating video display apparatus. The air floating video display apparatus 1000 shown in FIG. 4B is mounted with an optical system corresponding to the optical system shown in FIG. 2A. The air floating video display apparatus 1000 shown in FIG. 4B is installed vertically such that the surface on the side where the air floating video 3 is formed is located on the front side of the air floating video display apparatus 1000 (faces the user 230). Namely, in FIG. 4B, the air floating video display apparatus 1000 has the transparent member 100 placed on the front side of the apparatus (on the side of the user 230). The air floating video 3 is formed on the side of the user 230 with respect to the surface of the transparent member 100 of the air floating video display apparatus 1000. The light of the air floating video 3 travels obliquely upward. When the aerial operation detection sensor 1351 is provided as shown in the drawing, it is possible to detect the operation on the air floating video 3 by the finger of the user 230. Here, as shown in FIG. 4B, the aerial operation detection sensor 1351 can utilize the reflection of the sensing light by the nail of the user for touch detection by sensing the finger of the user 230 from above. Since a nail generally has a higher reflectance than a pad of a finger, this configuration can improve the accuracy of touch detection.

Figure 4C:
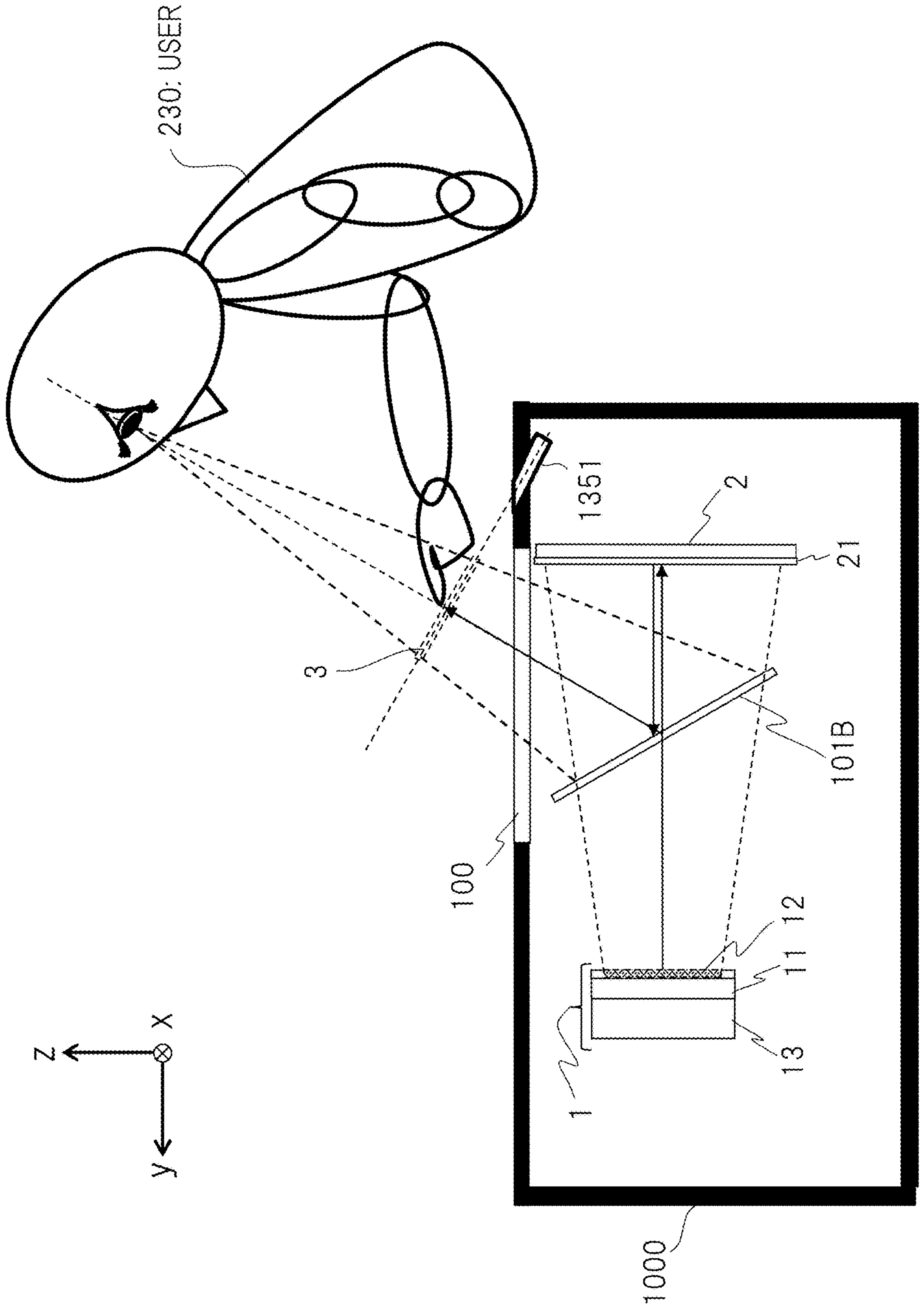
FIG. 4C is a diagram showing an example of the configuration of the air floating video display apparatus according to one embodiment of the present invention.

FIG. 4C is a diagram showing an example of the configuration of the air floating video display apparatus. The air floating video display apparatus 1000 shown in FIG. 4C is mounted with an optical system corresponding to the optical system shown in FIG. 2B. The air floating video display apparatus 1000 shown in FIG. 4C is installed horizontally such that the surface on the side where the air floating video 3 is formed faces upward. Namely, in FIG. 4C, the air floating video display apparatus 1000 has the transparent member 100 placed on the upper surface of the apparatus. The air floating video 3 is formed above the surface of the transparent member 100 of the air floating video display apparatus 1000. The light of the air floating video 3 travels obliquely upward. When the aerial operation detection sensor 1351 is provided as shown in the drawing, it is possible to detect the operation on the air floating video 3 by the finger of the user 230.

Figure 4D:
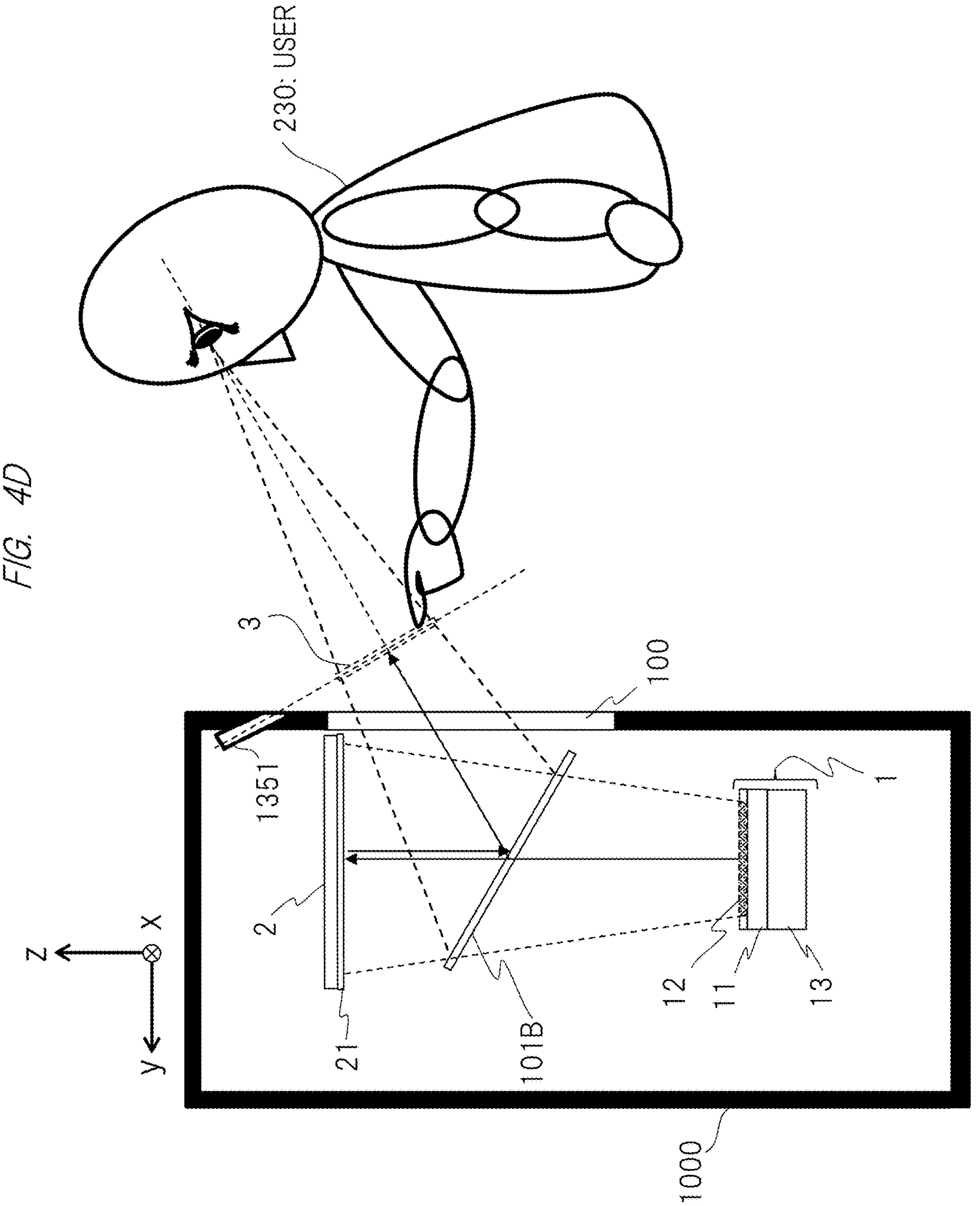
FIG. 4D is a diagram showing an example of the configuration of the air floating video display apparatus according to one embodiment of the present invention.

FIG. 4D is a diagram showing an example of the configuration of the air floating video display apparatus. The air floating video display apparatus 1000 shown in FIG. 4D is mounted with an optical system corresponding to the optical system shown in FIG. 2B. The air floating video display apparatus 1000 shown in FIG. 4D is installed vertically such that the surface on the side where the air floating video 3 is formed is located on the front side of the air floating video display apparatus 1000 (faces the user 230). Namely, in FIG. 4D, the air floating video display apparatus 1000 has the transparent member 100 placed on the front side of the apparatus (on the side of the user 230). The air floating video 3 is formed on the side of the user 230 with respect to the surface of the transparent member 100 of the air floating video display apparatus 1000. The light of the air floating video 3 travels obliquely upward. When the aerial operation detection sensor 1351 is provided as shown in the drawing, it is possible to detect the operation on the air floating video 3 by the finger of the user 230. Here, as shown in FIG. 4D, the aerial operation detection sensor 1351 can utilize the reflection of the sensing light by the nail of the user for touch detection by sensing the finger of the user 230 from above. Since a nail generally has a higher reflectance than a pad of a finger, this configuration can improve the accuracy of touch detection.

Figure 4E:
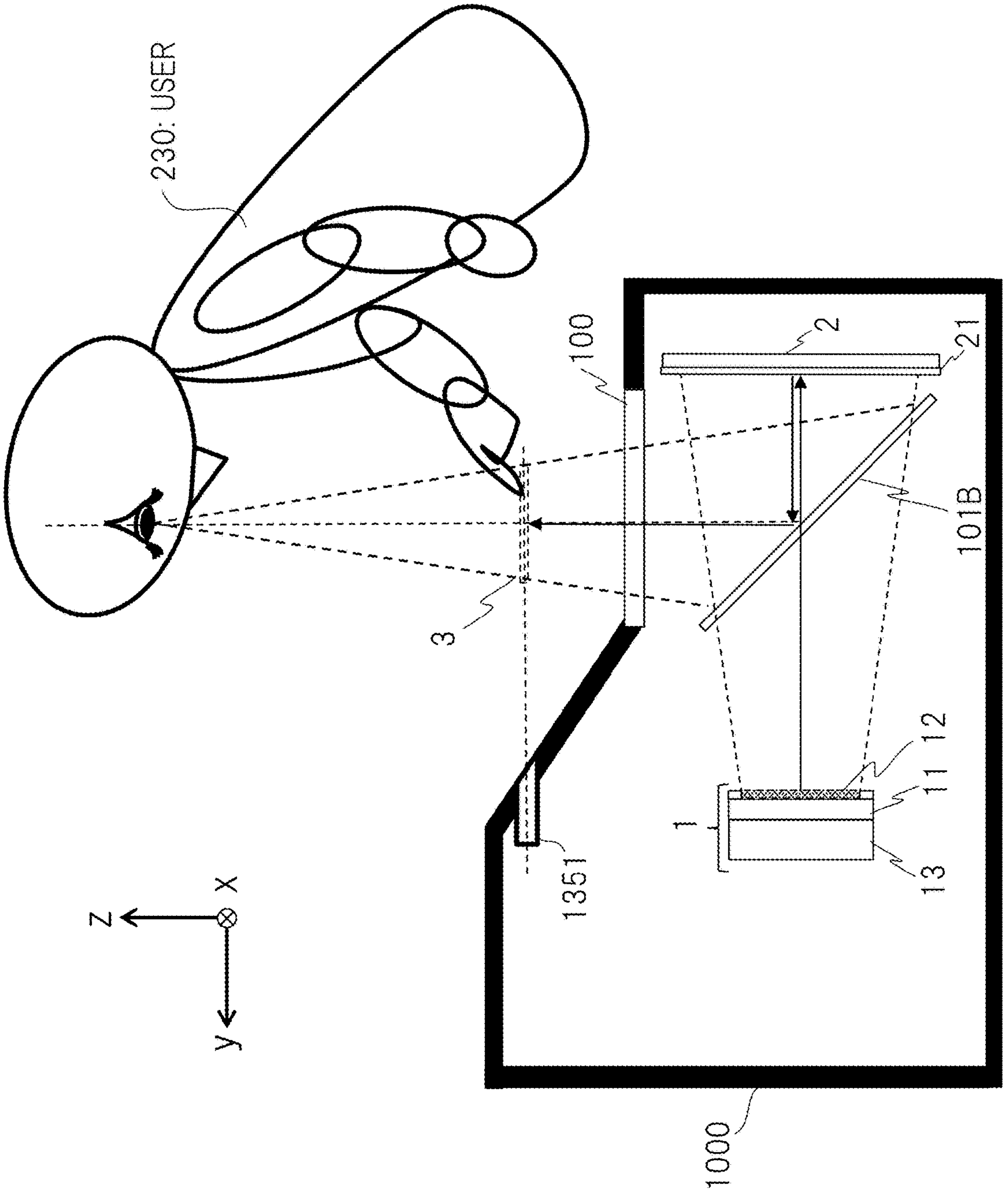
FIG. 4E is a diagram showing an example of the configuration of the air floating video display apparatus according to one embodiment of the present invention.

FIG. 4E is a diagram showing an example of the configuration of the air floating video display apparatus. The air floating video display apparatus 1000 shown in FIG. 4E is mounted with an optical system corresponding to the optical system shown in FIG. 2C. The air floating video display apparatus 1000 shown in FIG. 4E is installed horizontally such that the surface on the side where the air floating video 3 is formed faces upward. Namely, in FIG. 4E, the air floating video display apparatus 1000 has the transparent member 100 placed on the upper surface of the apparatus. The air floating video 3 is formed above the surface of the transparent member 100 of the air floating video display apparatus 1000. The light of the air floating video 3 travels directly upward. When the aerial operation detection sensor 1351 is provided as shown in the drawing, it is possible to detect the operation on the air floating video 3 by the finger of the user 230.

Figure 4F:
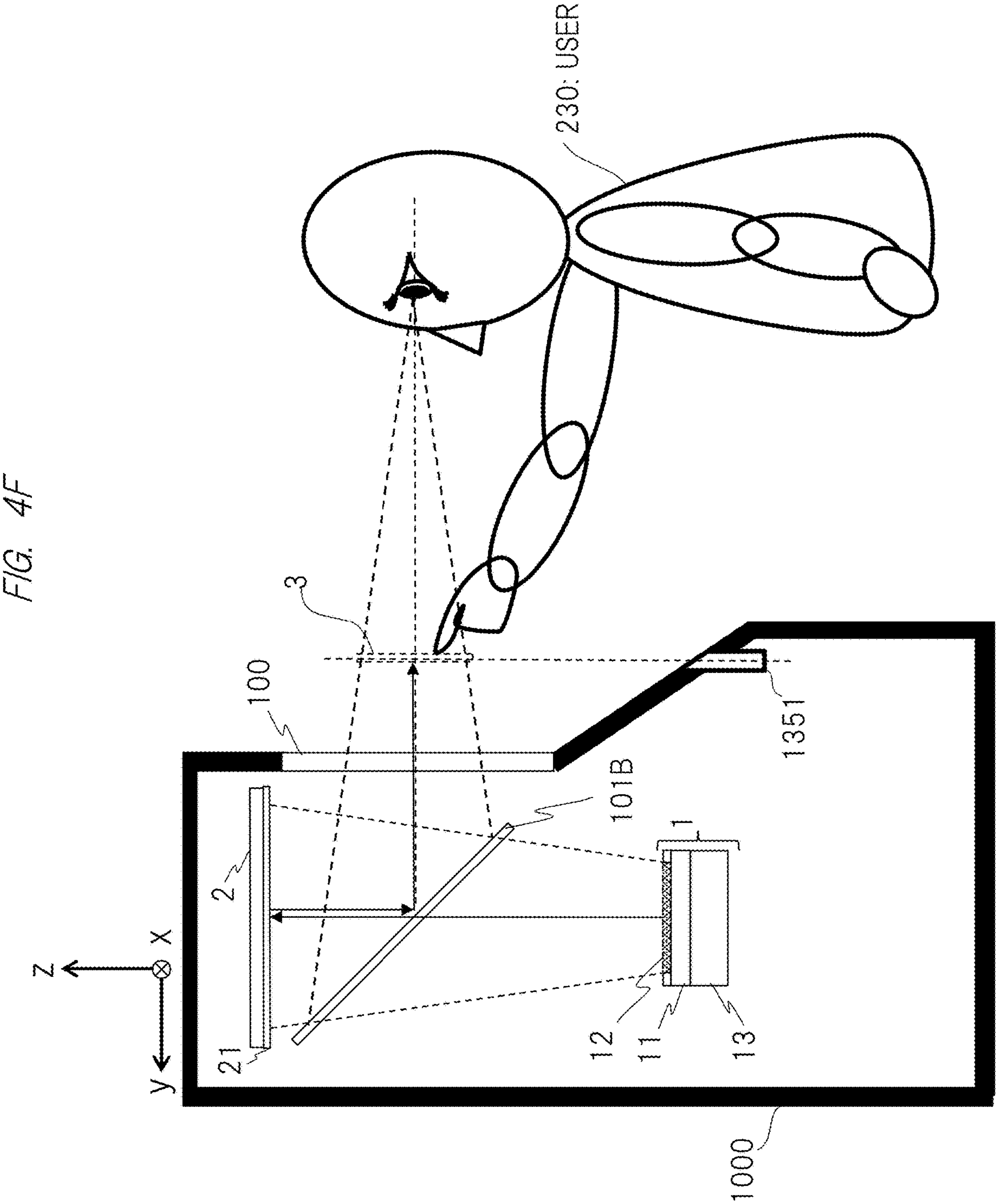
FIG. 4F is a diagram showing an example of the configuration of the air floating video display apparatus according to one embodiment of the present invention.

FIG. 4F is a diagram showing an example of the configuration of the air floating video display apparatus. The air floating video display apparatus 1000 shown in FIG. 4F is mounted with an optical system corresponding to the optical system shown in FIG. 2C. The air floating video display apparatus 1000 shown in FIG. 4F is installed vertically such that the surface on the side where the air floating video 3 is formed is located on the front side of the air floating video display apparatus 1000 (faces the user 230). Namely, in FIG. 4F, the air floating video display apparatus 1000 has the transparent member 100 placed on the front side of the apparatus (on the side of the user 230). The air floating video 3 is formed on the side of the user 230 with respect to the surface of the transparent member 100 of the air floating video display apparatus 1000. The light of the air floating video 3 travels toward the user. When the aerial operation detection sensor 1351 is provided as shown in the drawing, it is possible to detect the operation on the air floating video 3 by the finger of the user 230.

Figure 4G:
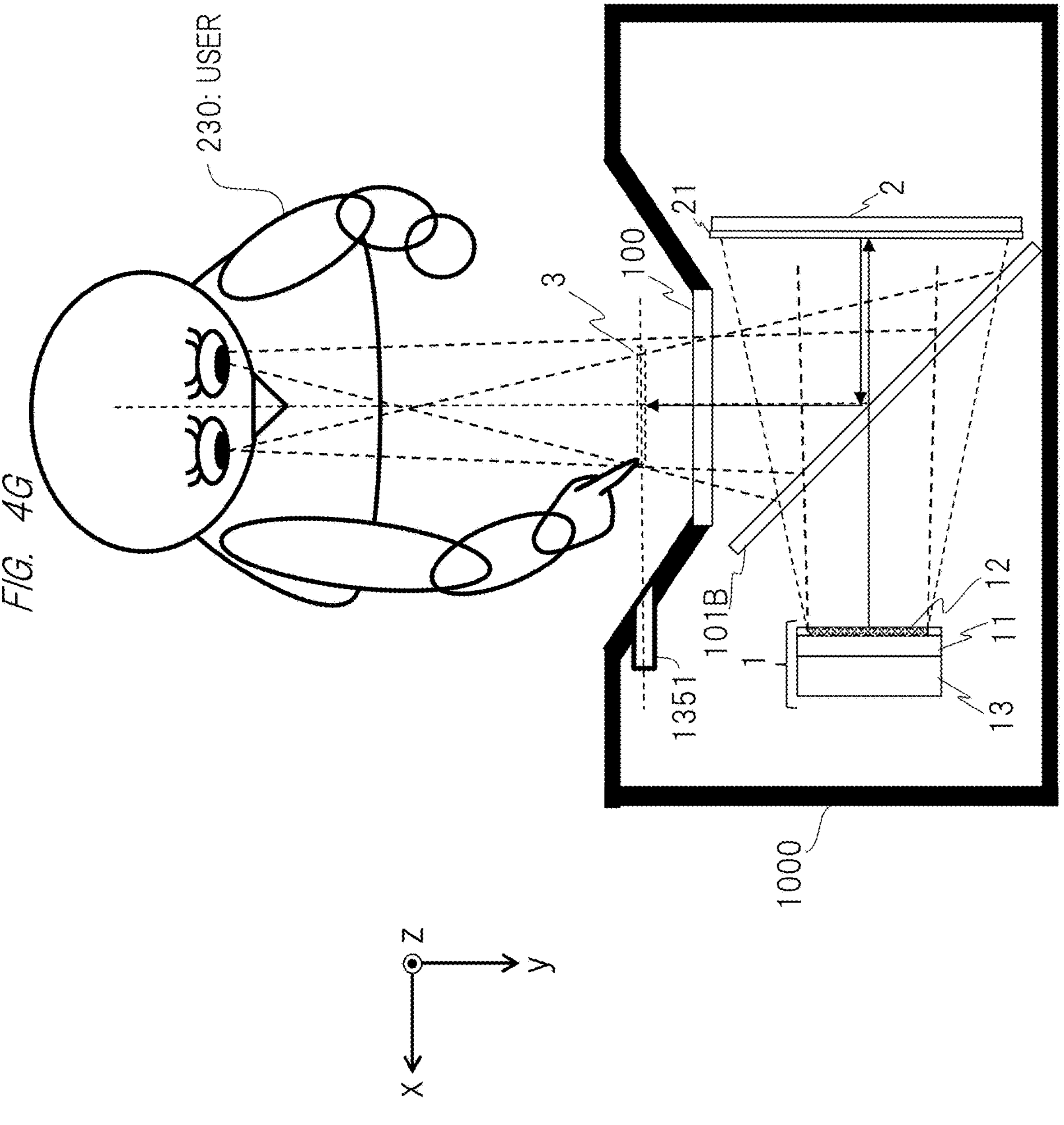
FIG. 4G is a diagram showing an example of the configuration of the air floating video display apparatus according to one embodiment of the present invention.

FIG. 4G is a diagram showing an example of the configuration of the air floating video display apparatus. The air floating video display apparatus 1000 shown in FIG. 4G is mounted with an optical system corresponding to the optical system shown in FIG. 2C. In the optical system of each air floating video display apparatus shown in FIG. 4A to FIG. 4F, the central optical path of the video light emitted from the display apparatus 1 is on the y-z plane. Namely, in the optical system of each air floating video display apparatus shown in FIG. 4A to FIG. 4F, the video light travels in the front-rear direction and the up-down direction when viewed from the user. On the other hand, in the optical system of the air floating video display apparatus shown in FIG. 4G, the central optical path of the video light emitted from the display apparatus 1 is on the x-y plane. Namely, in the optical system of the air floating video display apparatus shown in FIG. 4G, video light travels in the left-right direction and front-rear direction when viewed from the user. The air floating video display apparatus 1000 shown in FIG. 4G is installed such that the surface on the side where the air floating video 3 is formed is located on the front side of the apparatus (faces the user 230). Namely, in FIG. 4G, the air floating video display apparatus 1000 has the transparent member 100 placed on the front side of the apparatus (on the side of the user 230). The air floating video 3 is formed on the side of the user 230 with respect to the surface of the transparent member 100 of the air floating video display apparatus 1000. The light of the air floating video 3 travels toward the user. When the aerial operation detection sensor 1351 is provided as shown in the drawing, it is possible to detect the operation on the air floating video 3 by the finger of the user 230.

Figure 4H:
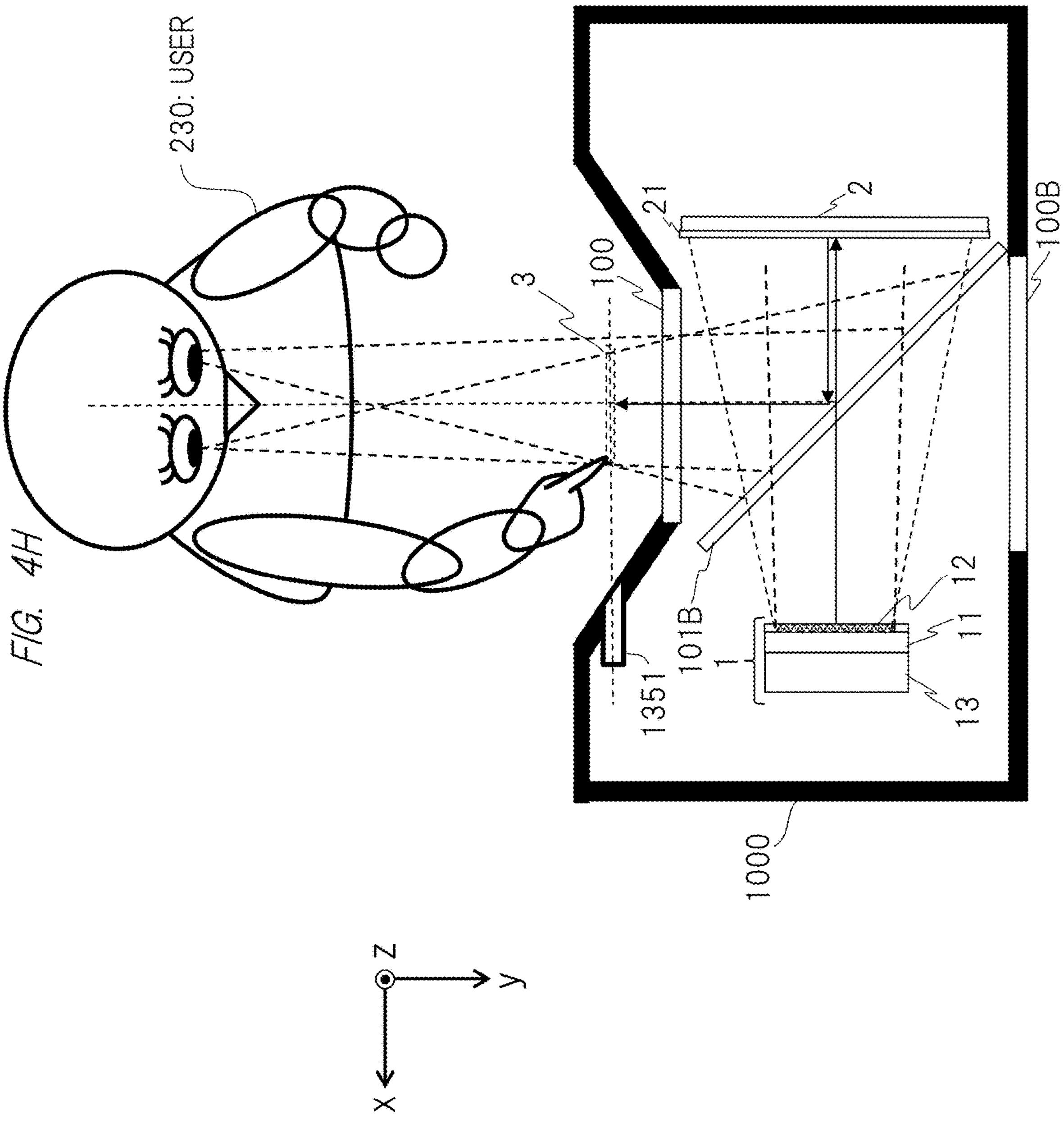
FIG. 4H is a diagram showing an example of the configuration of the air floating video display apparatus according to one embodiment of the present invention.

FIG. 4H is a diagram showing an example of the configuration of the air floating video display apparatus. The air floating video display apparatus 1000 in FIG. 4H is different from the air floating video display apparatus 1000 in FIG. 4G in that a window having a transparent plate 100B such as glass or plastic is provided on the rear side of the apparatus (on the opposite side of the position where the user 230 visually recognizes the air floating video 3, that is, on the opposite side of the traveling direction of the video light of the air floating video 3 toward the user 230). Since the other configuration is the same as that of the air floating video display apparatus in FIG. 4G, the repetitive description will be omitted. The air floating video display apparatus 1000 in FIG. 4H includes a window having the transparent plate 100B at a position on the opposite side of the traveling direction of the video light of the air floating video 3 with respect to the air floating video 3. Therefore, when the user 230 visually recognizes the air floating video 3, the user 230 can recognize the scenery behind the air floating video display apparatus 1000 as the background of the air floating video 3. Accordingly, the user 230 can perceive the air floating video 3 as if it is floating in the air in front of the scenery behind the air floating video display apparatus 1000. In this way, it is possible to further emphasize the sense of floating in the air of the air floating video 3.

Note that, depending on the polarization distribution of the video light output from the display apparatus 1 and the performance of the polarization separator 101B, there is a possibility that a part of the video light output from the display apparatus 1 is reflected by the polarization separator 101B and travels toward the transparent plate 100B. Depending on the coating property of the surface of the transparent plate 100B, the light may be reflected again on the surface of the transparent plate 100B and visually recognized by the user as stray light. Therefore, in order to prevent the stray light, the configuration in which the transparent plate 100B is not provided in the window on the rear side of the air floating video display apparatus 1000 is also possible.

Figure 4I:
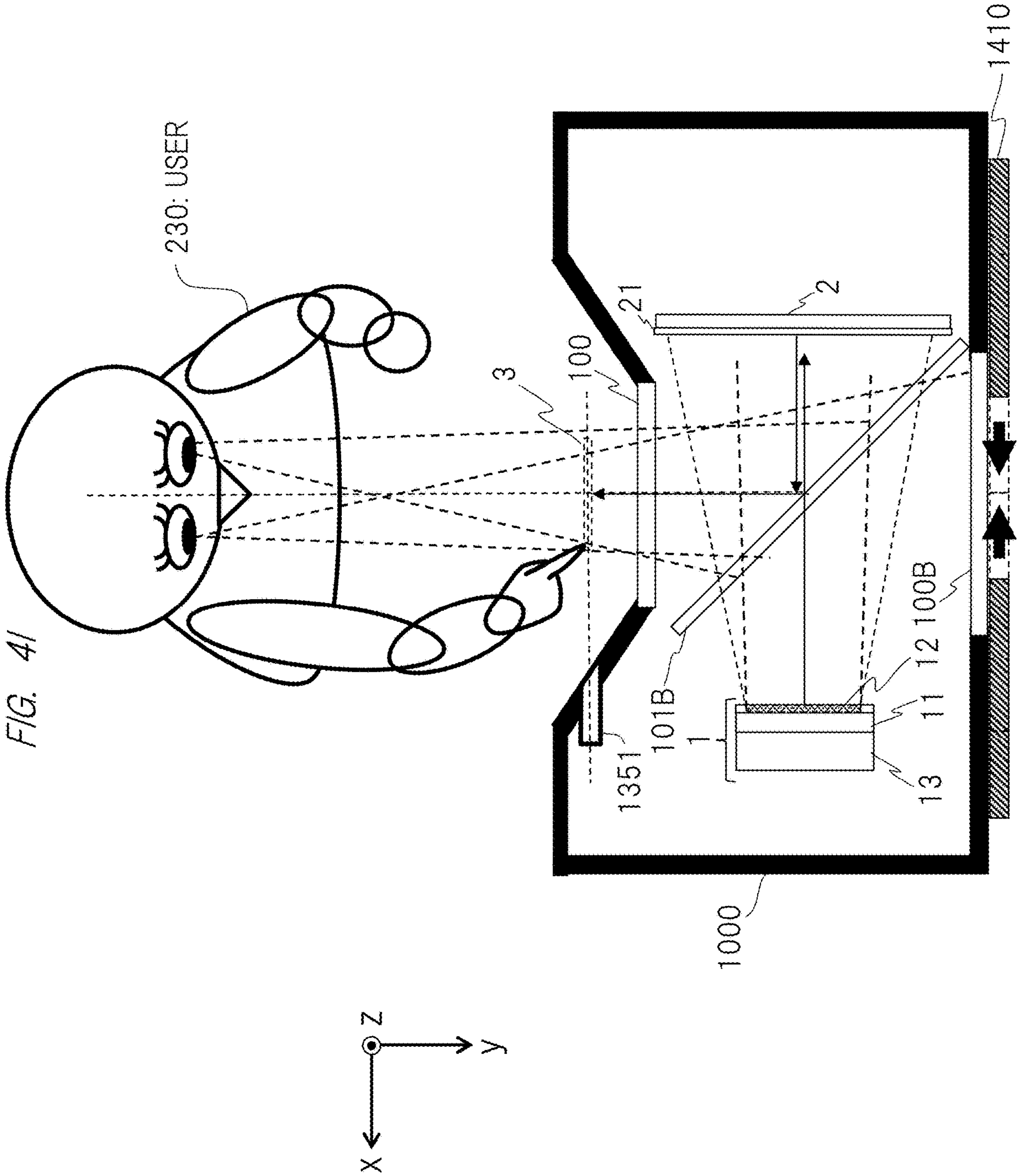
FIG. 4I is a diagram showing an example of the configuration of the air floating video display apparatus according to one embodiment of the present invention.

FIG. 4I is a diagram showing an example of the configuration of the air floating video display apparatus. The air floating video display apparatus 1000 in FIG. 4I is different from the air floating video display apparatus 1000 in FIG. 4H in that an opening/closing door 1410 for blocking light is provided on the window of the transparent plate 100B provided on the rear side of the apparatus (on the opposite side of the position where the user 230 visually recognizes the air floating video 3). Since the other configuration is the same as that of the air floating video display apparatus in FIG. 4H, the repetitive description will be omitted. The opening/closing door 1410 of the air floating video display apparatus 1000 in FIG. 4I includes, for example, a light-shielding plate and a mechanism for moving (sliding), rotating, or attaching/detaching the light-shielding plate, so that the state of the window (rear-side window) of the transparent plate 100B located on the rear side of the air floating video display apparatus 1000 can be switched between an open state and a light-shielding state. The movement (sliding) or rotation of the light-shielding plate of the opening/closing door 1410 may be electrically driven by a motor (not shown). The motor may be controlled by the controller 1110 in FIG. 3. Note that, in the example in FIG. 4I, the case in which the light-shielding plate of the opening/closing door 1410 is composed of two plate members is disclosed. On the other hand, the light-shielding plate of the opening/closing door 1410 may be composed of one plate member.

For example, when the scenery seen behind the window of the transparent plate 100B of the air floating video display apparatus 1000 is outdoors, the brightness of sunlight varies depending on the weather. If the sunlight outside is strong, the background of the air floating video 3 may become too bright, and the visibility of the air floating video 3 for the user 230 may be lowered. In such a case, if the rear-side window can be brought into the light-shielding state by moving (sliding), rotating, or attaching the light-shielding plate of the opening/closing door 1410, the background of the air floating video 3 becomes dark and the visibility of the air floating video 3 can be increased relatively. The shielding action by the light-shielding plate of the opening/closing door 1410 may be performed manually by the hand of the user 230. Alternatively, the shielding action by the light-shielding plate of the opening/closing door 1410 may be performed by a motor (not shown) under the control of the controller 1110 in response to the operation input via the operation input unit 1107 in FIG. 3.

Note that it is also possible to measure the brightness of the space beyond the rear-side window by providing an illuminance sensor on the back side of the air floating video display apparatus 1000 (the side opposite to the user 230), for example, near the rear-side window. In this case, the opening/closing action of the light-shielding plate of the opening/closing door 1410 may be performed by a motor (not shown) under the control of the controller 1110 in FIG. 3 based on the detection result of the illuminance sensor. By controlling the opening/closing action of the light-shielding plate of the opening/closing door 1410 in this manner, the visibility of the air floating video 3 can be favorably maintained even if the user 230 does not manually open and close the light-shielding plate of the opening/closing door 1410.

Further, the light-shielding plate of the opening/closing door 1410 may be configured to be manually attachable/detachable. Depending on the purpose of use and installation environment of the air floating video display apparatus 1000, the user can select whether the rear-side window is brought into an open state or a light-shielding state. If it is planned to use the air floating video display apparatus 1000 while keeping the rear-side window in the light-shieling state for a long period of time, the attachable/detachable light-shielding plate may be fixed in the light-shielding state. Meanwhile, if it is planned to use the air floating video display apparatus 1000 while keeping the rear-side window in the open state for a long period of time, the attachable/detachable light-shielding plate may be detached. The light-shielding plate may be attached and detached using screws, a hook structure, or a fitting structure.

Note that, even in the example of the air floating video display apparatus 1000 in FIG. 4I, depending on the polarization distribution of the video light output from the display apparatus 1 and the performance of the polarization separator 101B, there is a possibility that a part of the video light output from the display apparatus 1 is reflected by the polarization separator 101B and travels toward the transparent plate 100B. Depending on the coating property of the surface of the transparent plate 100B, the light may be reflected again on the surface of the transparent plate 100B and visually recognized by the user as stray light. Therefore, in order to prevent the stray light, the configuration in which the transparent plate 100B is not provided in the window on the rear side of the air floating video display apparatus 1000 is also possible. The above-described opening/closing door 1410 may be provided on the window that is not provided with the transparent plate 100B. In order to prevent the stray light, it is desirable that the inner surface of the light-shielding plate 1410 inside the housing has a coating or a material with low light reflectance.

Figure 4J:
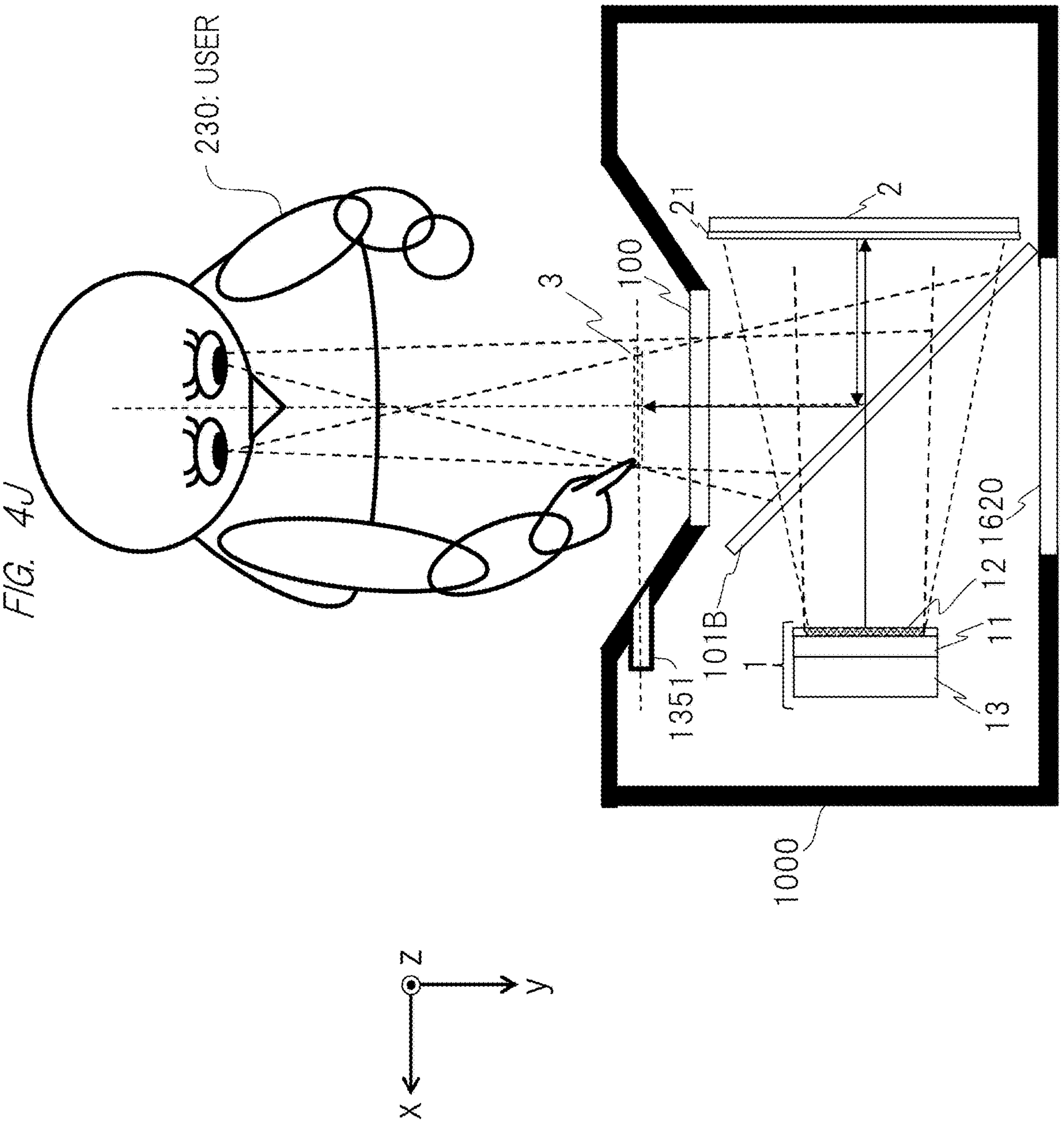
FIG. 4J is a diagram showing an example of the configuration of the air floating video display apparatus according to one embodiment of the present invention.

FIG. 4J is a diagram showing an example of the configuration of the air floating video display apparatus. The air floating video display apparatus 1000 in FIG. 4J is different from the air floating video display apparatus in FIG. 4H in that an electronically-controlled transmittance variable unit 1620 is arranged on the rear-side window instead of arranging the transparent plate 100B made of glass or plastic. Since the other configuration is the same as that of the air floating video display apparatus in FIG. 4H, the repetitive description will be omitted. An example of the electronically-controlled transmittance variable unit 1620 is a liquid crystal shutter or the like. Namely, the liquid crystal shutter can control the light transmittance by controlling the voltage applied to the liquid crystal element sandwiched between two polarization plates. Therefore, by controlling the liquid crystal shutter to increase the transmittance, the scenery beyond the rear-side window can be seen through the air floating video 3 on the background. Meanwhile, by controlling the liquid crystal shutter to reduce the transmittance, the scenery beyond the rear-side window cannot be seen through the air floating video 3 on the background. Further, since the halftone control is possible in the liquid crystal shutter, it can be set to, for example, a state of transmittance of 50%. For example, the controller 1110 can control the transmittance of the electronically-controlled transmittance variable unit 1620 in response to the operation input via the operation input unit 1107 in FIG. 3. With this configuration, in such a case where it is desired to see the scenery beyond the rear-side window as the background of the air floating video 3, but the scenery beyond the rear-side window on the background is too bright and the visibility of the air floating video 3 is lowered, the visibility of the air floating video 3 can be adjusted by controlling the transmittance of the electronically-controlled transmittance variable unit 1620.

Note that it is also possible to measure the brightness of the space beyond the rear-side window by providing an illuminance sensor on the back side of the air floating video display apparatus 1000 (the side opposite to the user 230), for example, near the rear-side window. In this case, the controller 1110 in FIG. 3 can control the transmittance of the electronically-controlled transmittance variable unit 1620 based on the detection result of the illuminance sensor. In this way, since the transmittance of the electronically-controlled transmittance variable unit 1620 can be adjusted based on the brightness of the space beyond the rear-side window even if the user 230 does not perform the operation input via the operation input unit 1107 in FIG. 3, it is possible to favorably maintain the visibility of the air floating video 3.

Furthermore, in the above example, the case where a liquid crystal shutter is used as the electronically-controlled transmittance variable unit 1620 has been described. Alternatively, electronic paper may be used as another example of the electronically-controlled transmittance variable unit 1620. Even in the case where electronic paper is used, the same effect as that described above can be obtained. Moreover, power consumption required to maintain the halftone state is very small in the electronic paper. Therefore, it is possible to realize the air floating video display apparatus with lower power consumption as compared with the case where a liquid crystal shutter is adopted.

Figure 4K:
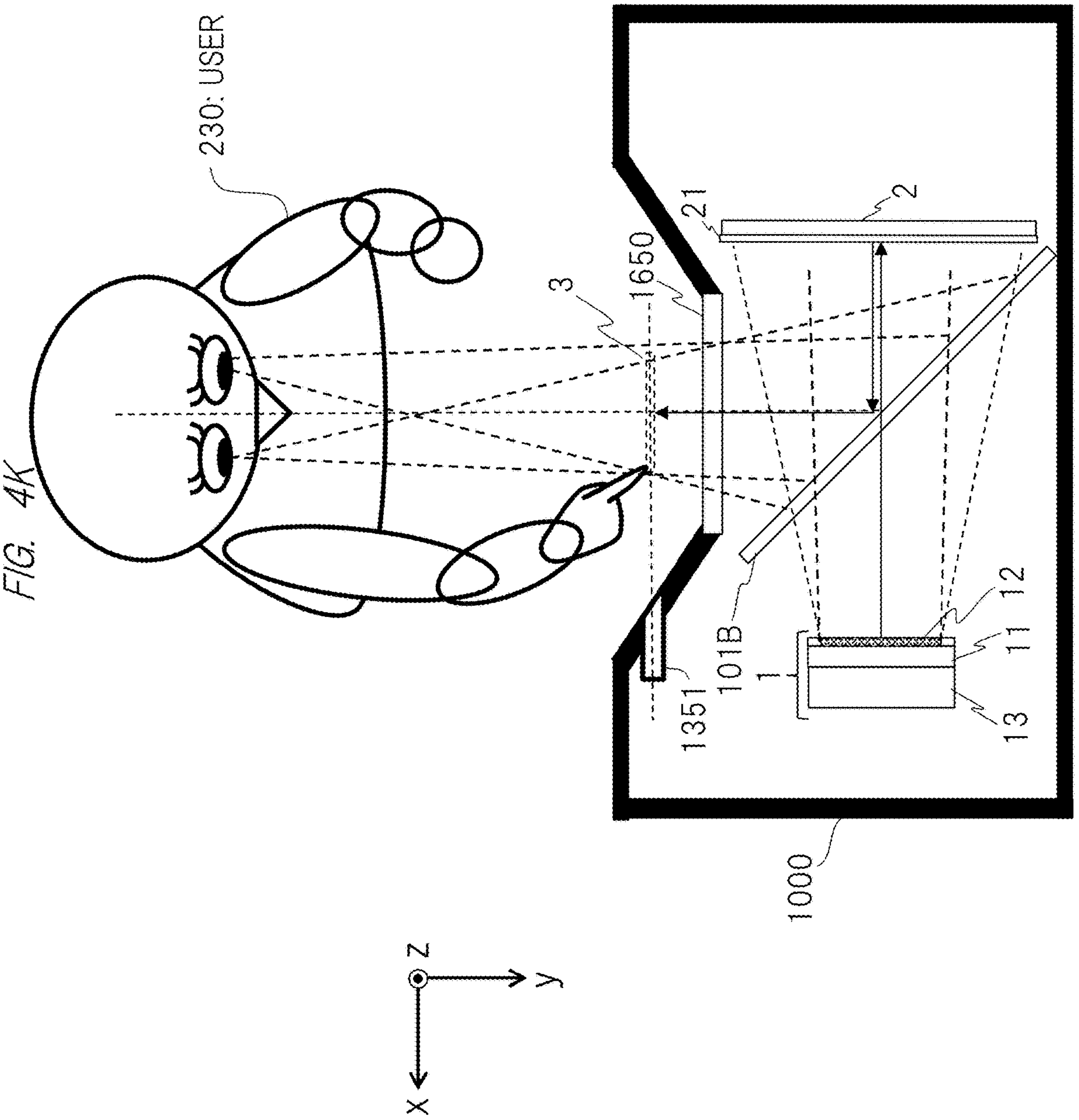
FIG. 4K is a diagram showing an example of the configuration of the air floating video display apparatus according to one embodiment of the present invention.

FIG. 4K is a diagram showing an example of the configuration of the air floating video display apparatus. The air floating video display apparatus 1000 in FIG. 4K is different from the air floating video display apparatus in FIG. 4G in that a transmissive self-luminous video display apparatus 1650 is provided instead of the transparent member 100. Since the other configuration is the same as that of the air floating video display apparatus in FIG. 4G, the repetitive description will be omitted.

In the air floating video display apparatus 1000 in FIG. 4K, after the video light flux passes through the display surface of the transmissive self-luminous video display apparatus 1650, the air floating video 3 is formed outside the air floating video display apparatus 1000. Namely, when a video is being displayed on the transmissive self-luminous video display apparatus 1650 which is a two-dimensional flat display, the air floating video 3 can be displayed as a projected video on the front side of the user with respect to the video on the transmissive self-luminous video display apparatus 1650. At this time, the user 230 can visually recognize two videos at different depth positions at the same time. The transmissive self-luminous video display apparatus 1650 can be configured using existing techniques of a transmissive organic EL panel disclosed in, for example, Japanese Unexamined Patent Application Publication No. 2014-216761. Although the transmissive self-luminous video display apparatus 1650 is not shown in FIG. 3, it can be configured as a component of the air floating video display apparatus 1000 in FIG. 3 so as to be connected to the other processing units such as the controller 1110.

Here, for example, if the performance that both the background and objects such as characters are displayed on the transmissive self-luminous video display apparatus 1650 and then the objects such as characters only are moved to the air floating video 3 on the front side is executed, it is possible to provide the user 230 with a more effective video experience with surprising effects.

Further, if the inside of the air floating video display apparatus 1000 is set to the light-shielding state, the background of the transmissive self-luminous video display apparatus 1650 becomes sufficiently dark. Therefore, in the case where no video is displayed on the display apparatus 1 or the light source of the display apparatus 1 is turned off and the video is displayed only on the transmissive self-luminous video display apparatus 1650, the transmissive self-luminous video display apparatus 1650 appears to the user 230 as if it is an ordinary two-dimensional flat display rather than a transmissive display (since the air floating video 3 in the embodiment of the present invention is displayed as a real optical image in a space without a screen, the position where the air floating video 3 is to be displayed becomes an empty space when the light source of the display apparatus 1 is turned off). Therefore, if the characters and objects are suddenly displayed in the air as the air floating video 3 when the video is being displayed using the transmissive self-luminous video display apparatus 1650 as a general two-dimensional flat display, it is possible to provide the user 230 with a more effective video experience with surprising effects.

Note that the darker the inside of the air floating video display apparatus 1000 becomes, the more the transmissive self-luminous video display apparatus 1650 appears like a two dimensional flat display. Therefore, an absorptive polarization plate (not shown) that transmits the polarized wave of the video light reflected by the polarization separator 101B and absorbs the polarized wave whose phase is different by 90° from this polarized wave may be provided on the inner surface of the transmissive self-luminous video display apparatus 1650 inside the air floating video display apparatus 1000 (the incident surface of the video light reflected by the polarization separator 101B to the transmissive self-luminous video display apparatus 1650, that is, the surface of the transmissive self-luminous video display apparatus 1650 on the side opposite to the air floating video 3). In this way, although the influence on the video light that forms the air floating video 3 is not so great, the light that enters the interior of the air floating video display apparatus 1000 from the outside via the transmissive self-luminous video display apparatus 1650 can be significantly reduced, and the interior of the air floating video display apparatus 1000 can be favorably made darker.

Figure 4L:
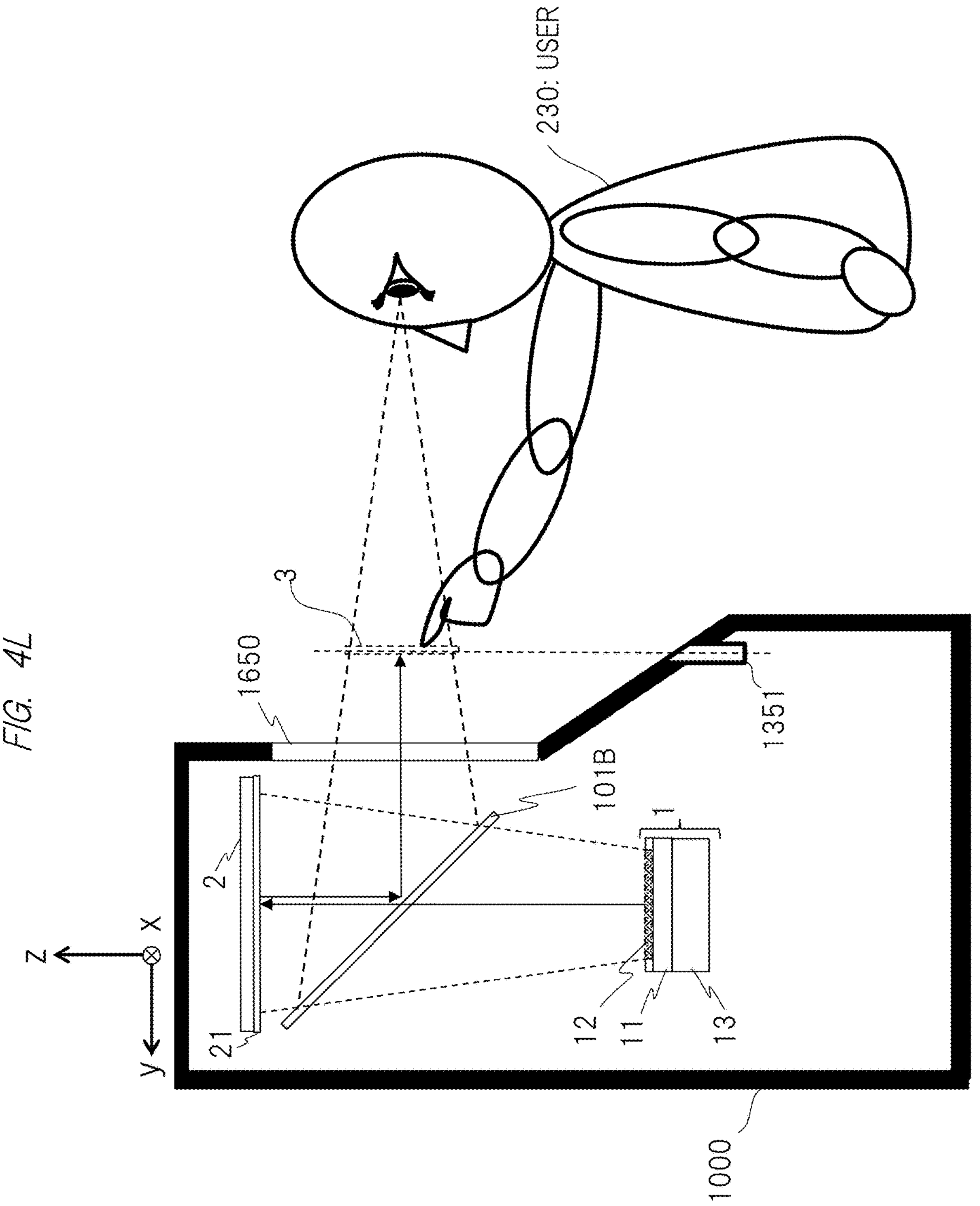
FIG. 4L is a diagram showing an example of the configuration of the air floating video display apparatus according to one embodiment of the present invention.

FIG. 4L is a diagram showing an example of the configuration of the air floating video display apparatus. The air floating video display apparatus 1000 in FIG. 4L is a modification of the air floating video display apparatus in FIG. 4K. The arrangement direction of the configuration in the air floating video display apparatus 1000 is different from that of the air floating video display apparatus shown in FIG. 4K, and is similar to that of the air floating video display apparatus shown in FIG. 4F. Since the functions, operations, and the like of each configuration are the same as those of the air floating video display apparatus in FIG. 4K, the repetitive description will be omitted.

In the air floating video display apparatus in FIG. 4L as well, after the light flux of the video light passes through the transmissive self-luminous video display apparatus 1650, the air floating video 3 is formed on the side of the user 230 with respect to the transmissive self-luminous video display apparatus 1650.

In both the example of the air floating video display apparatus in FIG. 4K and the example of the air floating video display apparatus in FIG. 4L, the air floating video 3 is displayed to be overlapped in front of the video of the transmissive self-luminous video display apparatus 1650 when viewed from the user 230. Here, the position of the air floating video 3 and the position of the video of the transmissive self-luminous video display apparatus 1650 are designed to be different in the depth direction. Therefore, when the user moves his or her head (position of the viewpoint), the depth of the two videos can be recognized based on the parallax. Therefore, by displaying two videos with different depth positions, a three-dimensional video experience can be more suitably provided to the user with naked eyes without the need for stereoscopic glasses or the like.

Figure 4M:
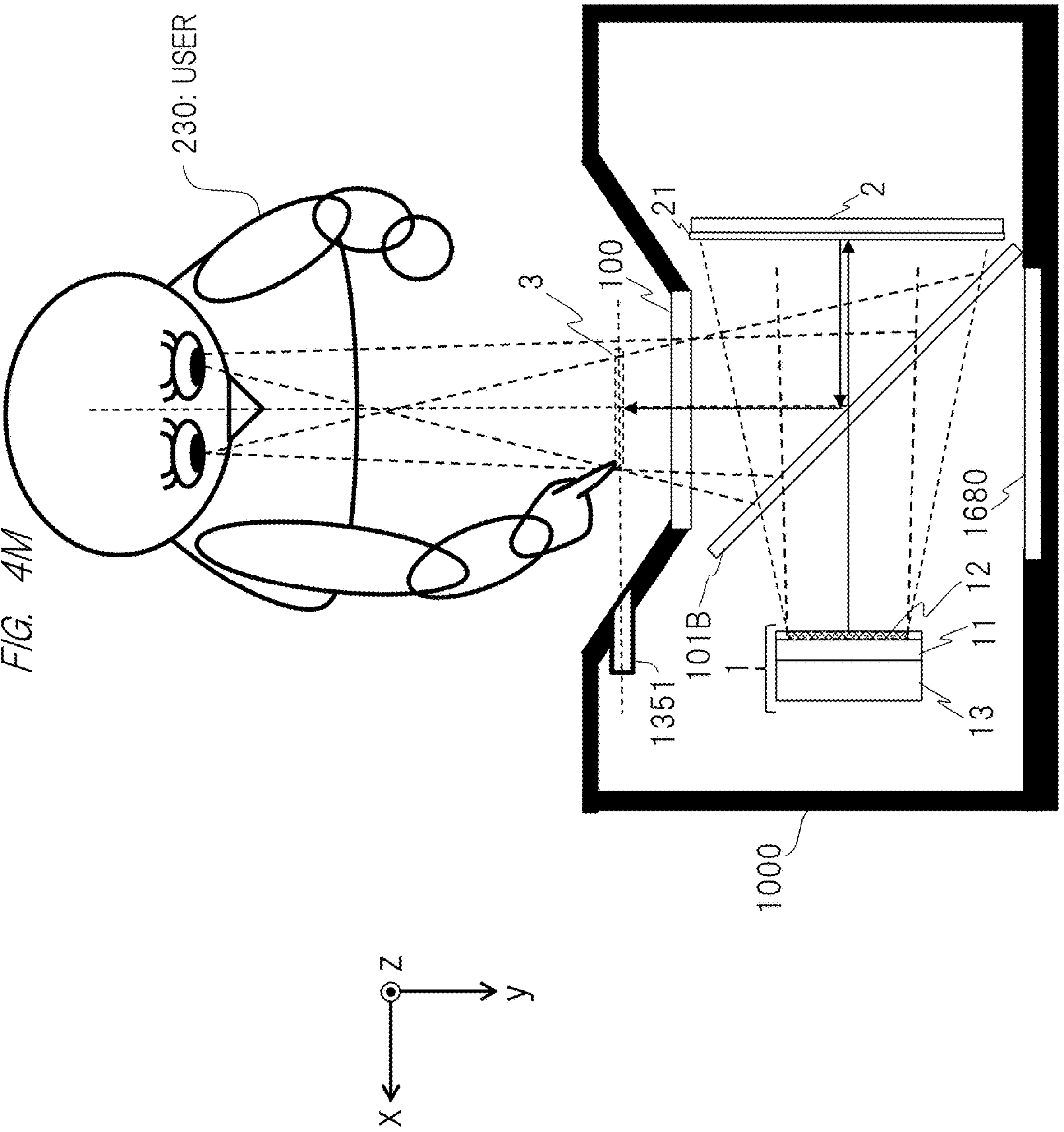
FIG. 4M is a diagram showing an example of the configuration of the air floating video display apparatus according to one embodiment of the present invention.

FIG. 4M is a diagram showing an example of the configuration of the air floating video display apparatus. In the air floating video display apparatus 1000 in FIG. 4M, a second display apparatus 1680 is provided on the rear side when viewed from the user with respect to the polarization separator 101B of the air floating video display apparatus in FIG. 4G. Since the other configuration is the same as that of the air floating video display apparatus in FIG. 4G, the repetitive description will be omitted.

In the configuration example shown in FIG. 4M, the second display apparatus 1680 is provided on the rear side of the display position of the air floating video 3, and the video display surface is directed toward the air floating video 3. With this configuration, when viewed from the user 230, two videos such as the video of the second display apparatus 1680 and the air floating video 3 which are displayed at two different depth positions can be visually recognized to be overlapped with each other. Namely, it can be said that the second display apparatus 1680 is arranged so as to display the video in the direction toward the user 230 who visually recognizes the air floating video 3. Although not shown in FIG. 3, the second display apparatus 1680 can be configured as a component of the air floating video display apparatus 1000 in FIG. 3 so as to be connected to other processors such as the controller 1110.

Note that the video light from the second display apparatus 1680 of the air floating video display apparatus 1000 in FIG. 4M is visually recognized by the user 230 after passing through the polarization separator 101B. Therefore, in order for the video light of the second display apparatus 1680 to pass through the polarization separator 101B more suitably, the video light output from the second display apparatus 1680 is desirably the light of a polarized wave having a vibration direction capable of passing through the polarization separator 101B more suitably. Namely, it is desirably the light of a polarized wave having the same vibration direction as the polarized wave of the video light output from the display apparatus 1. For example, when the video light output from the display apparatus 1 is S-polarized light, it is desirable that the video light output from the second display apparatus 1680 is also S-polarized light. Also, when the video light output from the display apparatus 1 is P-polarized light, it is desirable that the video light output from the second display apparatus 1680 is also P-polarized light.

The example of the air floating video display apparatus in FIG. 4M also has the same effect as those of the example of the air floating video display apparatus in FIG. 4K and the example of the air floating video display apparatus in FIG. 4L in that the second video is displayed behind the air floating video 3. However, unlike the example of the air floating video display apparatus in FIG. 4K and the example of the air floating video display apparatus in FIG. 4L, the light flux of the video light for forming the air floating video 3 does not pass through the second display apparatus 1680 in the example of the air floating video display apparatus in FIG. 4M. Therefore, the second display apparatus 1680 does not need to be a transmissive self-luminous video display apparatus, and may be a liquid crystal display that is a two-dimensional flat display. The second display apparatus 1680 may also be an organic EL display. Therefore, in the example of the air floating video display apparatus in FIG. 4M, the air floating video display apparatus 1000 can be realized at a lower cost than those in the example of the air floating video display apparatus in FIG. 4K and the example of the air floating video display apparatus in FIG. 4L.

Here, depending on the polarization distribution of the video light output from the display apparatus 1 and the performance of the polarization separator 101B, there is a possibility that a part of the video light output from the display apparatus 1 is reflected by the polarization separator 101B and travels toward the second apparatus 1680. This light (part of video light) may be reflected again on the surface of the second display apparatus 1680 and visually recognized by the user as stray light.

Therefore, in order to prevent the stray light, an absorptive polarization plate may be provided on the surface of the second display apparatus 1680. In this case, as the absorptive polarization plate, an absorptive polarization plate that transmits the polarized wave of the video light output from the second display apparatus 1680 and absorbs the polarized wave whose phase is different by 90° from the polarized wave of the video light output from the second display apparatus 1680 can be provided. Note that, when the second display apparatus 1680 is a liquid crystal display, an absorptive polarization plate is present also on the video emission side inside the liquid crystal display. However, when a cover glass (cover glass on the video display side) is present on the emission surface of the absorptive polarization plate on the video output side inside the liquid crystal display, it is not possible to prevent the stray light generated by the reflection of the cover glass by the light from outside of the liquid crystal display. Therefore, it is necessary to separately provide the above-mentioned absorptive polarization plate on the surface of the cover glass.

Note that, when a video is being displayed on the second display apparatus 1680 which is a two-dimensional flat display, the air floating video 3 can be displayed as a video on the front side of the user with respect to the video on the second display apparatus 1680. At this time, the user 230 can visually recognize two videos at different depth positions at the same time. By displaying the character on the air floating video 3 and displaying the background on the second display apparatus 1680, it is possible to provide an effect as if the user 230 is stereoscopically viewing the space in which the character exists.

Also, if the performance that both the background and objects such as characters are displayed on the second display apparatus 1680 and then the objects such as characters only are moved to the air floating video 3 on the front side is executed, it is possible to provide the user 230 with a more effective video experience with surprising effects.

<Display Apparatus>

Next, the display apparatus 1 of the present embodiment will be described with reference to the drawings. The display apparatus 1 of the present embodiment includes a video display element 11 (liquid crystal display panel) and the light source apparatus 13 constituting a light source thereof, and FIG. 5 shows the light source apparatus 13 together with the liquid crystal display panel as a developed perspective view.

Figure 5:
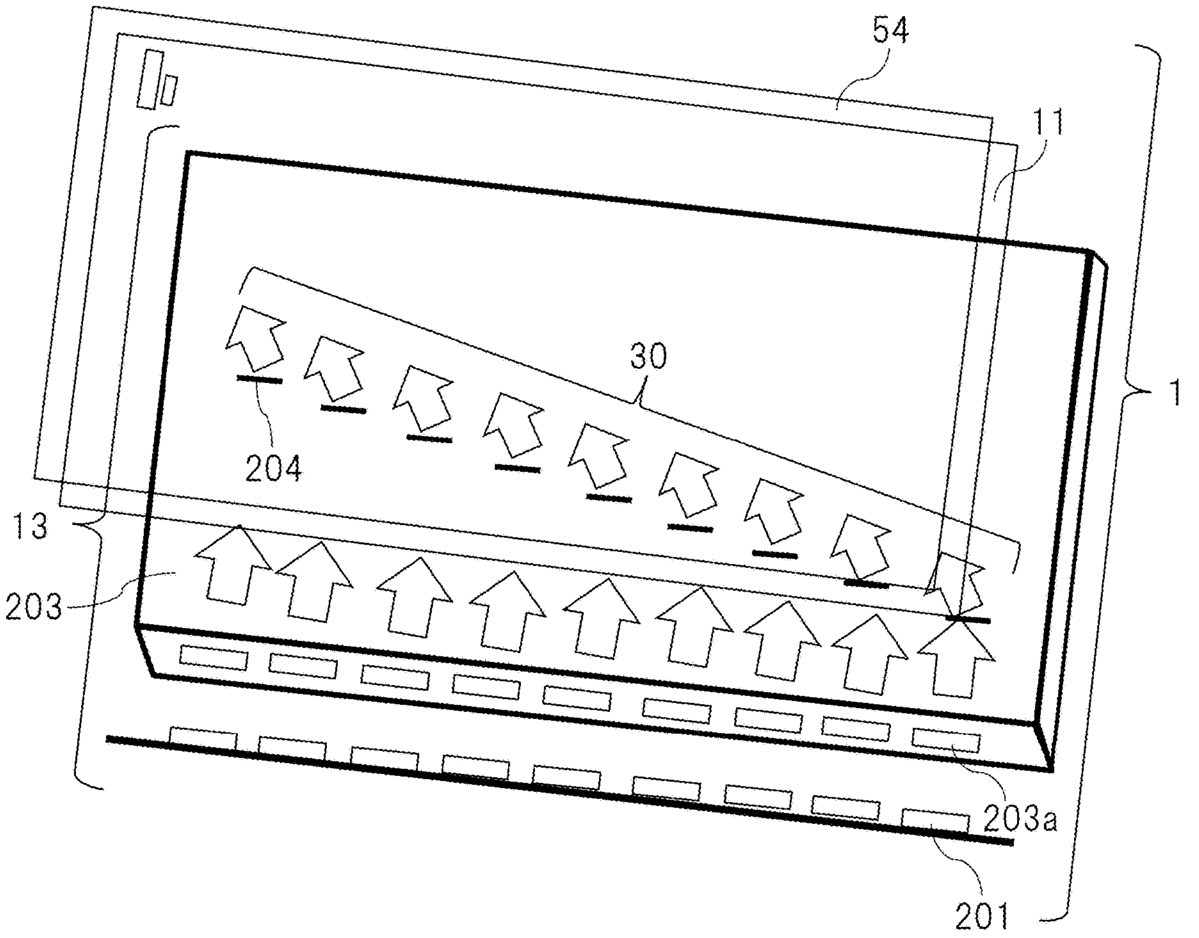
FIG. 5 is a cross-sectional view showing an example of a specific configuration of a light source apparatus according to one embodiment of the present invention.

In the liquid crystal display panel (video display element 11), as indicated by arrows 30 in FIG. 5, an illumination light flux having narrow-angle diffusion characteristics, that is, characteristics similar to laser light with strong directivity (straightness) and a polarization plane aligned in one direction is received from the light source apparatus 13 as a backlight apparatus. The liquid crystal display panel (video display element 11) modulates the received illumination light flux in accordance with an input video signal. The modulated video light is reflected by the retroreflection plate 2 and transmitted through the transparent member 100, thereby forming an air floating image as a real image (see FIG. 1).

Further, in FIG. 5, the display apparatus 1 includes the liquid crystal display panel 11, a light direction conversion panel 54 configured to control the directional characteristics of the light flux emitted from the light source apparatus 13, and a narrow-angle diffusion plate as needed (not shown). Namely, polarization plates are provided on both surfaces of the liquid crystal display panel 11, and video light of a specific polarized wave is emitted at the light intensity modulated by the video signal (see the arrows 30 in FIG. 5). Thus, a desired video is projected as the light of a specific polarized wave having high directivity (straightness) toward the retroreflection plate 2 via the light direction conversion panel 54, reflected by the retroreflection plate 2, and then transmitted toward the eyes of an observer outside the store (space), thereby forming the air floating video 3. Note that a protective cover 50 (see FIG. 6 and FIG. 7) may be provided on the surface of the light direction conversion panel 54 described above.

<Example of Display Apparatus (1)>

Figure 6:
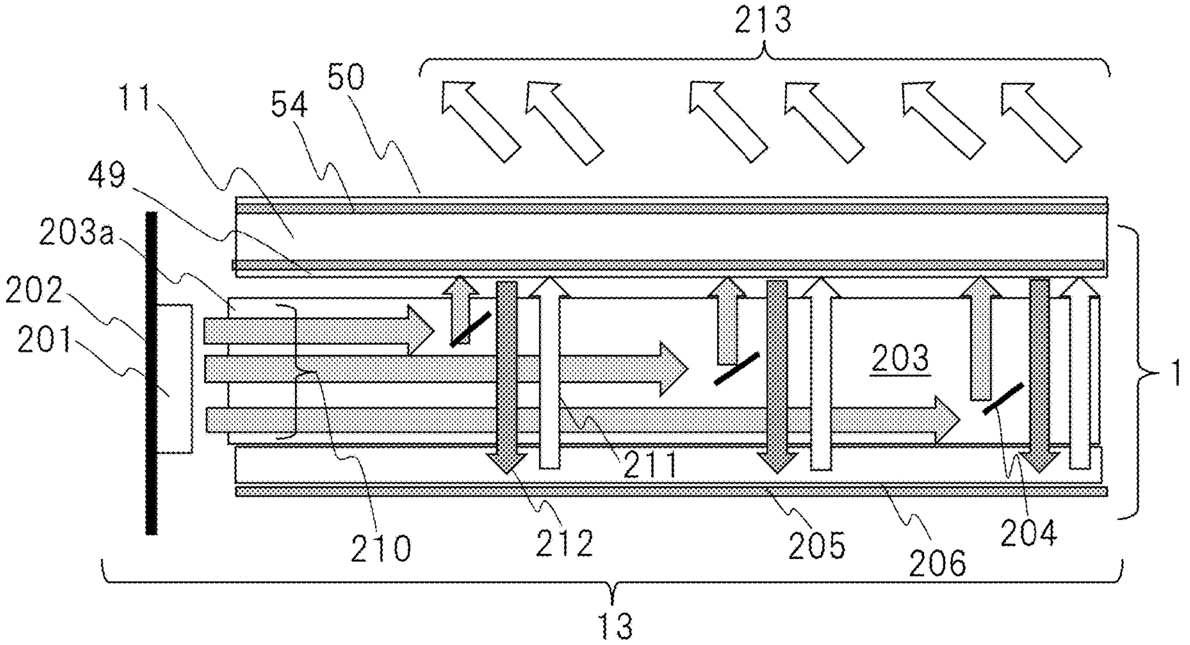
FIG. 6 is a cross-sectional view showing an example of the specific configuration of the light source apparatus according to one embodiment of the present invention.

FIG. 6 shows an example of a specific configuration of the display apparatus 1. In FIG. 6, the liquid crystal display panel 11 and the light direction conversion panel 54 are arranged on the light source apparatus 13 in FIG. 5. The light source apparatus 13 is formed of, for example, plastic or the like on a case shown in FIG. 5, and is configured to accommodate the LED element 201 and a light guide 203 therein. Also, as shown in FIG. 5 and the like, in order to convert the divergent light from each LED element 201 into a substantially parallel light flux, the end surface of the light guide 203 is provided with a lens shape in which the cross-sectional area gradually increases toward the opposite surface with respect to the light receiving portion and which has a function of gradually reducing the divergence angle when making total reflection plural times during the propagation therein. The liquid crystal display panel 11 constituting the display apparatus 1 is attached to the upper surface of the display apparatus 1. Further, the LED (Light Emitting Diode) element 201 which is a semiconductor light source and an LED substrate 202 on which a control circuit thereof is mounted are attached to one side surface (an end surface on the left side in this example) of the case of the light source apparatus 13. A heat sink which is a member for cooling heat generated in the LED element and the control circuit may be attached to an outer surface of the LED substrate 202.

Also, to a frame (not shown) of the liquid crystal display panel attached to the upper surface of the case of the light source apparatus 13, the liquid crystal display panel 11 attached to the frame, an FPC (Flexible Printed Circuits) board (not shown) electrically connected to the liquid crystal display panel 11, and the like are attached. Namely, the liquid crystal display panel 11 which is a video display element generates a display video by modulating the intensity of transmitted light based on a control signal from a control circuit (video controller 1160 in FIG. 3) constituting an electronic device together with the LED element 201 which is a solid-state light source. At this time, since the generated video light has a narrow diffusion angle and only a specific polarization component, it is possible to obtain a novel and unconventional video display apparatus which is close to a surface-emitting laser video source driven by a video signal. Note that, at present, it is impossible to obtain a laser light flux having the same size as the image obtained by the above-described display apparatus 1 by using a laser apparatus for both technical and safety reasons. Therefore, in the present embodiment, for example, light close to the above-described surface-emitting laser video light is obtained from a light flux from a general light source including an LED element.

Subsequently, the configuration of the optical system accommodated in the case of the light source apparatus 13 will be described in detail with reference to FIG. 6 and FIG. 7.

Figure 7:
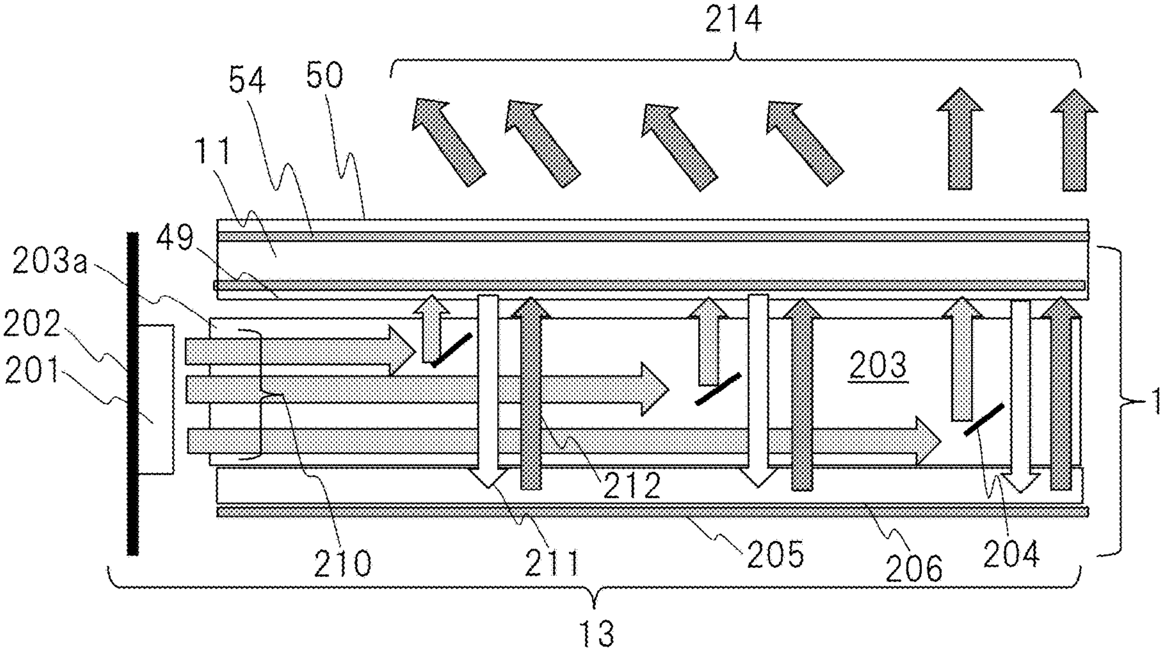
FIG. 7 is a cross-sectional view showing an example of the specific configuration of the light source apparatus according to one embodiment of the present invention.

Since FIG. 6 and FIG. 7 are cross-sectional views, only one of a plurality of LED elements 201 constituting the light source is shown, and the light from these elements is converted into substantially collimated light by the shape of a light-receiving end surface 203*a* of the light guide 203. Therefore, the light receiving portion on the end surface of the light guide and the LED element are attached while maintaining a predetermined positional relationship.

Note that each of the light guides 203 is formed of, for example, a translucent resin such as acrylic. Also, the LED light-receiving surface at one end of the light guide 203 has, for example, a conical convex outer peripheral surface obtained by rotating a parabolic cross section, the top thereof has a concave portion in which a convex portion (i.e., a convex lens surface) is formed at the central region, and the central region of the flat surface portion thereof has a convex lens surface protruding outward (or may be a concave lens surface recessed inward) (not shown). Note that the outer shape of the light receiving portion of the light guide to which the LED element 201 is attached is a paraboloid shape that forms a conical outer peripheral surface, and is set within a range of an angle at which light emitted from the LED element in the peripheral direction can be totally reflected inside the paraboloid, or has a reflection surface formed thereon.

On the other hand, each of the LED elements 201 is arranged at a predetermined position on the surface of the LED substrate 202 which is a circuit board for the LED elements. The LED substrate 202 is arranged and fixed to the LED collimator (the light-receiving end surface 203*a*) such that each of the LED elements 201 on the surface thereof is located at the central portion of the concave portion described above.

With such a configuration, the light emitted from the LED elements 201 can be extracted as substantially parallel light by the shape of the light-receiving end surface 203*a* of the light guide 203, and the utilization efficiency of the generated light can be improved.

As described above, the light source apparatus 13 is configured by attaching a light source unit, in which a plurality of LED elements 201 as light sources are arranged, to the light-receiving end surface 203*a* which is a light receiving portion provided on the end surface of the light guide 203, and the divergent light flux from the LED elements 201 is converted into substantially parallel light by the lens shape of the light-receiving end surface 203*a* on the end surface of the light guide, is guided through the inside of the light guide 203 (in the direction parallel to the drawing) as indicated by arrows, and is emitted toward the liquid crystal display panel 11 arranged substantially parallel to the light guide 203 (in the upward direction in the drawing) by a light flux direction converter 204. The uniformity of the light flux that enters the liquid crystal display panel 11 can be controlled by optimizing the distribution (density) of the light flux direction converter 204 by the shape inside the light guide or the shape of the surface of the light guide.

The above-described light flux direction converter 204 emits the light flux propagating through the inside of the light guide toward the liquid crystal display panel 11 (in the upward direction in the drawing) arranged substantially in parallel to the light guide 203 by the shape of the surface of the light guide or by providing a portion having a different refractive index inside the light guide. At this time, if the relative luminance ratio when comparing the luminance at the center of the screen with the luminance of the peripheral portion of the screen in a state in which the liquid crystal display panel 11 squarely faces the center of the screen and the viewpoint is placed at the same position as the diagonal dimension of the screen is 20% or more, there is no problem in practical use, and if the relative luminance ratio exceeds 30%, the characteristics will be even better.

Note that FIG. 6 is a cross-sectional layout drawing for describing the configuration and action of the light source of the present embodiment that performs polarization conversion in the light source apparatus 13 including the light guide 203 and the LED element 201 described above. In FIG. 6, the light source apparatus 13 is composed of, for example, the light guide 203 which is formed of plastic or the like and is provided with the light flux direction converter 204 on its surface or inside, the LED element 201 as a light source, a reflection sheet 205, a retardation plate 206, and a lenticular lens, and the liquid crystal display panel 11 including polarization plates on its light source light incident surface and video light emission surface is attached to the upper surface of the light source apparatus 13.

Also, a film-shaped or sheet-shaped reflective polarization plate 49 is provided on the light source light incident surface (lower surface in the drawing) of the liquid crystal display panel 11 corresponding to the light source apparatus 13, by which one polarized wave (e.g., a P-wave) 212 of the natural light flux 210 emitted from the LED element 201 is selectively reflected. The reflected light is reflected again by the reflection sheet 205 provided on one surface (lower side in the drawing) of the light guide 203, and is directed toward the liquid crystal display panel 11. Then, a retardation plate (λ/4 plate) is provided between the reflection sheet 205 and the light guide 203 or between the light guide 203 and the reflective polarization plate 49, and the light flux is reflected by the reflection sheet 205 to be made to pass through the retardation plate twice, so that the reflected light flux is converted from the P-polarized light into the S-polarized light and the utilization efficiency of the light source light as video light can be improved. The video light flux (arrows 213 in FIG. 6) whose light intensity is modulated by the video signal in the liquid crystal display panel 11 enters the retroreflection plate 2. An air floating image which is a real image can be obtained after the reflection on the retroreflection plate 2.

As with FIG. 6, FIG. 7 is a cross-sectional layout drawing for describing the configuration and action of the light source of the present embodiment that performs polarization conversion in the light source apparatus 13 including the light guide 203 and the LED element 201. The light source apparatus 13 is similarly composed of, for example, the light guide 203 which is formed of plastic or the like and is provided with the light flux direction converter 204 on its surface or inside, the LED element 201 as a light source, the reflection sheet 205, the retardation plate 206, and the lenticular lens. The liquid crystal display panel 11 including polarization plates on its light source light incident surface and video light emission surface is attached as the video display element to the upper surface of the light source apparatus 13.

Also, the film-shaped or sheet-shaped reflective polarization plate 49 is provided on the light source light incident surface (lower surface in the drawing) of the liquid crystal display panel 11 corresponding to the light source apparatus 13, by which one polarized wave (e.g., a S-wave) 211 of the natural light flux 210 emitted from the LED element 201 is Selectively reflected. Namely, in the example in FIG. 7, the selective reflection property of the reflective polarization plate 49 is different from that in FIG. 6. The reflected light is reflected by the reflection sheet 205 provided on one surface (lower side in the drawing) of the light guide 203, and is directed toward the liquid crystal display panel 11. Then, a retardation plate (λ/4 plate) is provided between the reflection sheet 205 and the light guide 203 or between the light guide 203 and the reflective polarization plate 49, and the light flux is reflected by the reflection sheet 205 to be made to pass through the retardation plate twice, so that the reflected light flux is converted from the S-polarized light into the P-polarized light and the utilization efficiency of the light source light as video light can be improved. The video light flux (arrows 214 in FIG. 7) whose light intensity is modulated by the video signal in the liquid crystal display panel 11 enters the retroreflection plate 2. An air floating image which is a real image can be obtained after the reflection on the retroreflection plate 2.

In the light source apparatuses shown in FIG. 6 and FIG. 7, in addition to the action of the polarization plate provided on the light incident surface of the corresponding liquid crystal display panel 11, the polarization component on one side is reflected by the reflective polarization plate, and thus the contrast ratio theoretically obtained is the product of the reciprocal of the cross transmittance of the reflective polarization plate and the reciprocal of the cross transmittance obtained by the two polarization plates attached to the liquid crystal display panel. Therefore, high contrast performance can be obtained. In practice, it has been experimentally confirmed that the contrast performance of the display image is improved by 10 times or more. As a result, a high-quality video comparable to the video of a self-luminous organic EL can be obtained.

<Example of Display Apparatus (2)>

Figure 8:
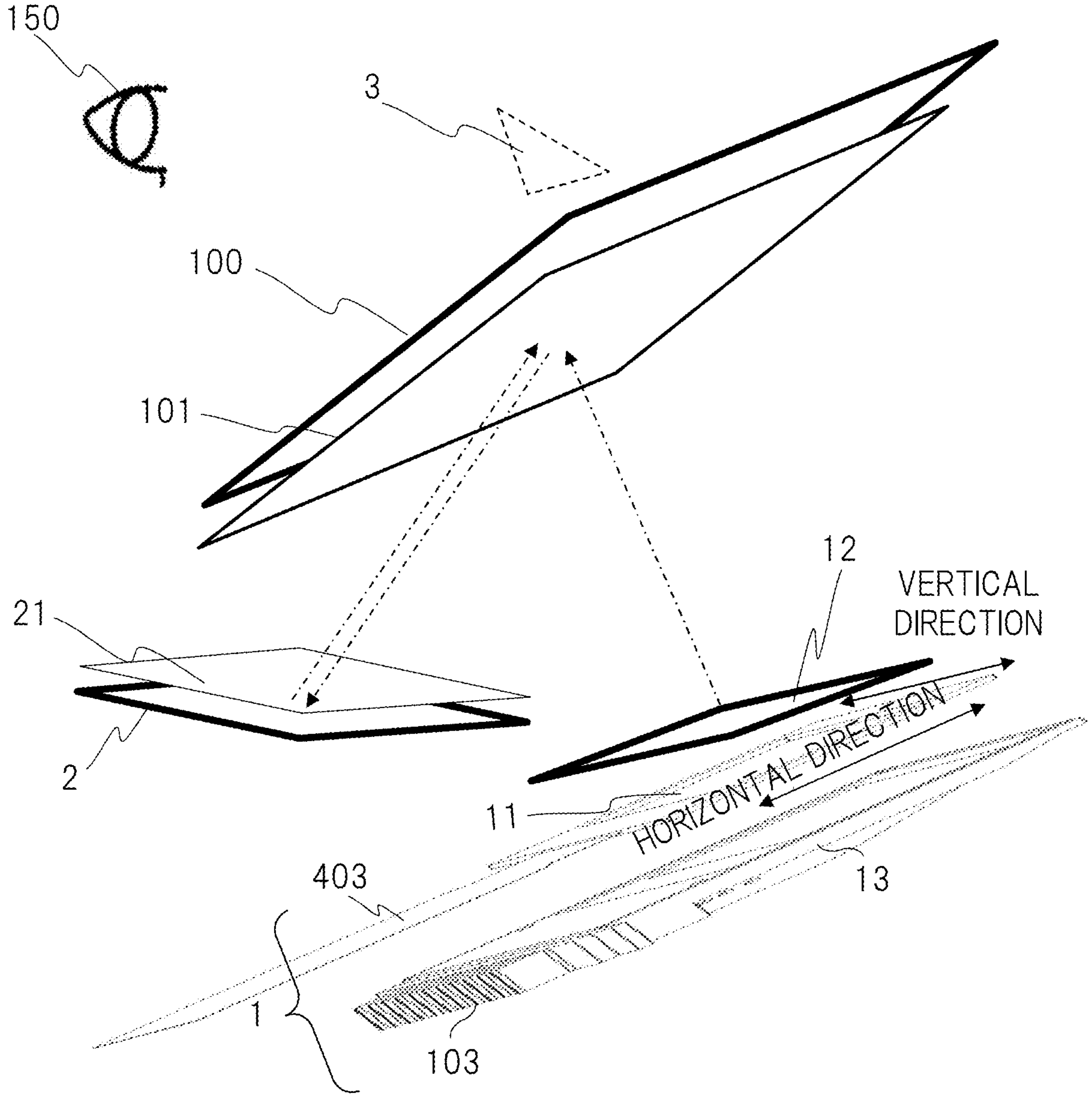
FIG. 8 is a layout drawing showing a main part of the air floating video display apparatus according to one embodiment of the present invention.

FIG. 8 shows another example of a specific configuration of the display apparatus 1. The light source apparatus 13 is configured by accommodating an LED, a collimator, a synthetic diffusion block, a light guide, and the like in a case made of, for example, plastic, and the liquid crystal display panel 11 is attached to the upper surface thereof. Further, LED (Light Emitting Diode) elements **14*a* and 14*b* which are semiconductor light sources and an LED substrate on which a control circuit thereof is mounted are attached to one side surface of the case of the light source apparatus 13, and a heat sink 103** which is a member for cooling the heat generated in the LED elements and the control circuit is attached to an outer surface of the LED substrate.

Also, to a frame of the liquid crystal display panel attached to the upper surface of the case, the liquid crystal display panel 11 attached to the frame, an FPC (Flexible Printed Circuits) board 403 electrically connected to the liquid crystal display panel 11, and the like are attached. Namely, the liquid crystal display panel 11 which is a liquid crystal display element generates a display video by modulating the intensity of transmitted light based on a control signal from a control circuit (not shown here) constituting an electronic device together with the LED elements **14*a* and 14*b*** which are solid-state light sources.

<Example of Display Apparatus (3)>

Next, another example of the specific configuration of the display apparatus 1 (example of display apparatus (3)) will be described with reference to FIG. 9. The light source apparatus of the display apparatus 1 converts a divergent light flux of the light from the LED (in which P-polarized light and S-polarized light are mixed) into a substantially parallel light flux by a collimator 18, and the converted light flux is reflected by the reflection surface of the reflective light guide 304 toward the liquid crystal display panel 11. Such reflected light enters the reflective polarization plate 49 arranged between the liquid crystal display panel 11 and the reflective light guide 304. The reflective polarization plate 49 transmits the light of a specific polarized wave (for example, P-polarized light) and allows the transmitted polarized light to enter the liquid crystal display panel 11. Here, the polarized wave (for example, S-polarized wave) other than the specific polarized wave is reflected by the reflective polarization plate 49 and directed toward the reflective light guide 304 again.

The reflective polarization plate 49 is installed to be inclined with respect to the liquid crystal display panel 11 so as not to be perpendicular to the principal light ray of the light from the reflection surface of the reflective light guide 304. Then, the principal light ray of the light reflected by the reflective polarization plate 49 enters the transmission surface of the reflective light guide 304. The light that has entered the transmission surface of the reflective light guide 304 is transmitted through the back surface of the reflective light guide 304, is transmitted through a λ/4 plate 270 as a retardation plate, and is reflected by a reflection plate 271. The light reflected by the reflection plate 271 is transmitted through the λ/4 plate 270 again and is transmitted through the transmission surface of the reflective light guide 304. The light transmitted through the transmission surface of the reflective light guide 304 enters the reflective polarization plate 49 again.

At this time, since the light that enters the reflective polarization plate 49 again has passed through the λ/4 plate 270 twice, the polarization thereof is converted into a polarized wave (for example, P-polarized light) that can pass through the reflective polarization plate 49. Therefore, the light whose polarization has been converted passes through the reflective polarization plate 49 and enters the liquid crystal display panel 11. Regarding the polarization design related to polarization conversion, the polarization may be reversed from that in the above description (the S-polarized light and the P-polarized light may be reversed).

As a result, the light from the LED is aligned into a specific polarized wave (e.g., a P-polarized light) and enters the liquid crystal panel 11. Then, after the luminance is modulated in accordance with the video signal, the video is displayed on the panel surface. As in the above-described example, a plurality of LEDs constituting the light source are provided (however, only one LED is shown in FIG. 9 due to the vertical cross section), and these LEDs are attached at predetermined positions with respect to the collimators 18.

Note that each of the collimators 18 is formed of, for example, a translucent resin such as acrylic or glass. Further, the collimator 18 may have a conical convex outer peripheral surface obtained by rotating a parabolic cross section. Also, a concave portion in which a convex portion (i.e., a convex lens surface) is formed may be provided at the central portion of the top of the collimator 18 (on the side facing the LED substrate 102). In addition, a convex lens surface protruding outward (or may be a concave lens surface recessed inward) is provided at the central portion of the flat surface portion of the collimator 18 (on the opposite side of the top mentioned above). Note that the paraboloid that forms the conical outer peripheral surface of the collimator 18 is set within a range of an angle at which light emitted from the LED in the peripheral direction can be totally reflected inside the paraboloid, or has a reflection surface formed thereon.

Note that each of the LEDs is arranged at a predetermined position on the surface of the LED substrate 102 which is a circuit board for the LEDs. The LED substrate 102 is arranged and fixed to the collimator 18 such that each of the LEDs on the surface thereof is located at the central portion at the top of the conical convex portion (concave portion when there is the concave portion at the top).

With such a configuration, of the light emitted from the LED, in particular, the light emitted from the central portion thereof is condensed into parallel light by the convex lens surface forming the outer shape of the collimator 18. Also, the light emitted from the other portion toward the peripheral direction is reflected by the paraboloid forming the conical outer peripheral surface of the collimator 18, and is similarly condensed into parallel light. In other words, with the collimator 18 having a convex lens formed at the central portion thereof and a paraboloid formed in the peripheral portion thereof, it is possible to extract substantially all of the light generated by the LED as parallel light, and to improve the utilization efficiency of the generated light.

Figure 9:
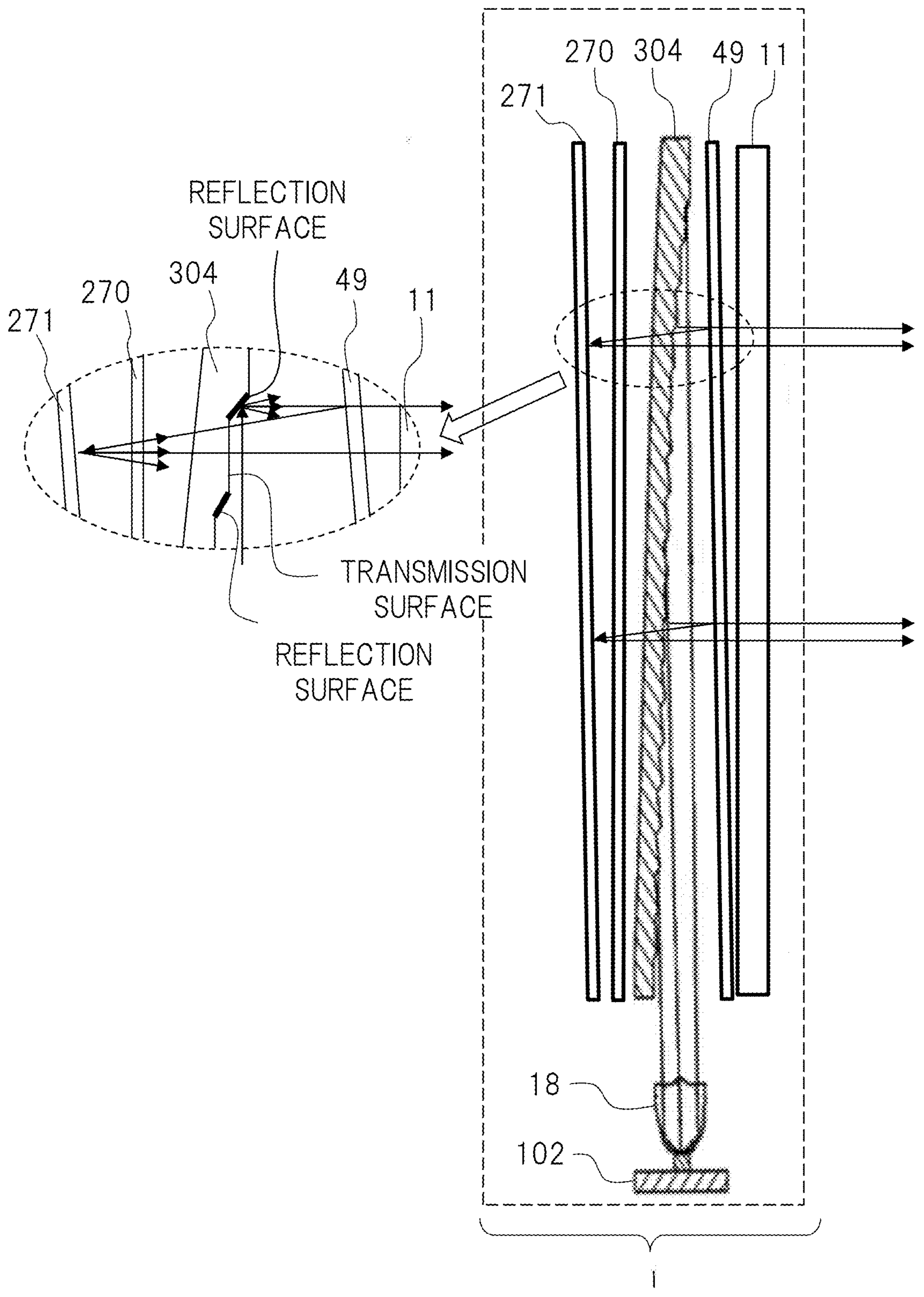
FIG. 9 is a cross-sectional view showing a configuration of a display apparatus according to one embodiment of the present invention.

Furthermore, the light converted into substantially parallel light by the collimator 18 shown in FIG. 9 is reflected by the reflective light guide 304. The light of a specific polarized wave of such light is transmitted through the reflective polarization plate 49 by the action of the reflective polarization plate 49, and the light of the other polarized wave reflected by the action of the reflective polarization plate 49 is transmitted through the light guide 304 again. The light is reflected by the reflection plate 271 located at a position opposite to the liquid crystal display panel 11 with respect to the reflective light guide 304. At this time, the polarization of the light is converted by passing through the λ/4 plate 270, which is a retardation plate, twice. The light reflected by the reflection plate 271 is transmitted through the light guide 304 again and enters the reflective polarization plate 49 provided on the opposite surface. Since the incident light has been subjected to polarization conversion, it is transmitted through the reflective polarization plate 49 and enters the liquid crystal display panel 11 with the aligned polarization direction. As a result, all of the light from the light source can be used, and the utilization efficiency of light in geometrical optics is doubled. Further, the degree of polarization (extinction ratio) of the reflective polarization plate is also multiplied with the extinction ratio of the entire system, so that the contrast ratio of the overall display apparatus is significantly improved by using the light source apparatus of the present embodiment. Also, by adjusting the surface roughness of the reflection surface of the reflective light guide 304 and the surface roughness of the reflection plate 271, the reflection diffusion angle of light on each reflection surface can be adjusted. It is preferable that the surface roughness of the reflection surface of the reflective light guide 304 and the surface roughness of the reflection plate 271 are adjusted for each design such that the uniformity of the light entering the liquid crystal display panel 11 becomes more favorable.

Note that the λ/4 plate 270 which is the retardation plate in FIG. 9 does not necessarily have the phase difference of λ/4 with respect to the polarized light that has vertically entered the λ/4 plate 270. In the configuration of FIG. 9, any retardation plate may be used as long as it can change the phase by 90° (λ/2) when the polarized light passes through it twice. The thickness of the retardation plate may be adjusted in accordance with the incident angle distribution of polarized light.

<Example of Display Apparatus (4)>

Further, another example (example of display apparatus (4)) of the configuration of the optical system of the light source apparatus or the like of the display apparatus will be described with reference to FIG. 10. This is a configuration example in which a diffusion sheet is used instead of the reflective light guide 304 in the light source apparatus in the example of display apparatus (3). Specifically, two optical sheets (optical sheet 207A and optical sheet 207B) for converting the diffusion characteristics in the vertical direction and the horizontal direction of the drawing are provided on the light emission side of the collimator 18, and the light from the collimator 18 is made to enter between the two optical sheets (diffusion sheets).

Note that, this optical sheet may be composed of one sheet rather than two sheets. When composed of one sheet, the vertical and horizontal diffusion characteristics are adjusted by the fine shapes of the front surface and the back surface of the one optical sheet. Alternatively, a plurality of diffusion sheets may be used to share the function. Here, in the example in FIG. 10, it is preferable that the reflection diffusion characteristics by the front surface shapes and the back surface shapes of the optical sheet 207A and the optical sheet 207B are optimally designed with using the number of LEDs, the divergence angle from the LED substrate (optical element) 102, and optical specifications of the collimator 18 as design parameters such that the surface density of the light flux emitted from the liquid crystal display panel 11 is uniform. In other words, the diffusion characteristics are adjusted by the surface shapes of the plurality of diffusion sheets instead of the light guide.

Figure 10:
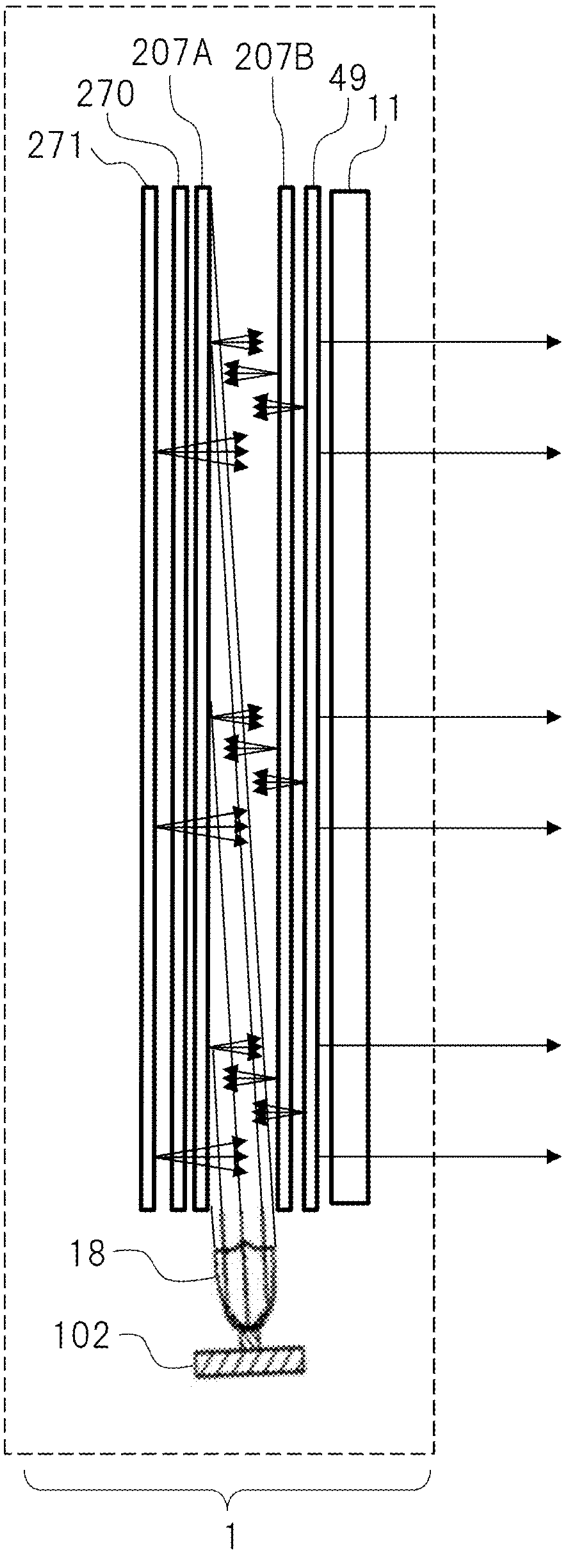
FIG. 10 is a cross-sectional view showing a configuration of the display apparatus according to one embodiment of the present invention.

In the example in FIG. 10, the polarization conversion is performed in the same manner as in the example of display apparatus (3) described above. Namely, in the example in FIG. 10, the reflective polarization plate 49 may be configured to have the property of reflecting the S-polarized light (and transmitting the P-polarized light). In that case, of the light emitted from the LED as a light source, the P-polarized light is transmitted and the transmitted light enters the liquid crystal display panel 11. Of the light emitted from the LED as a light source, the S-polarized light is reflected and the reflected light is transmitted through the retardation plate 270 shown in FIG. 10. The light that has passed through the retardation plate 270 is reflected by the reflection plate 271. The light reflected by the reflection plate 271 is converted into the P-polarized light by passing through the retardation plate 270 again. The light that has been subjected to the polarization conversion is transmitted through the reflective polarization plate 49 and enters the liquid crystal display panel 11.

Note that the λ/4 plate 270 which is the retardation plate in FIG. 10 does not necessarily have the phase difference of λ/4 with respect to the polarized light that has vertically entered the λ/4 plate 270. In the configuration of FIG. 10, any retardation plate may be used as long as it can change the phase by 90° (λ/2) when the polarized light is transmitted through it twice. The thickness of the retardation plate may be adjusted in accordance with the incident angle distribution of polarized light. Also in FIG. 10, regarding the polarization design related to polarization conversion, the polarization may be reversed from that in the above description (the S-polarized light and the P-polarized light may be reversed).

Figure 12:
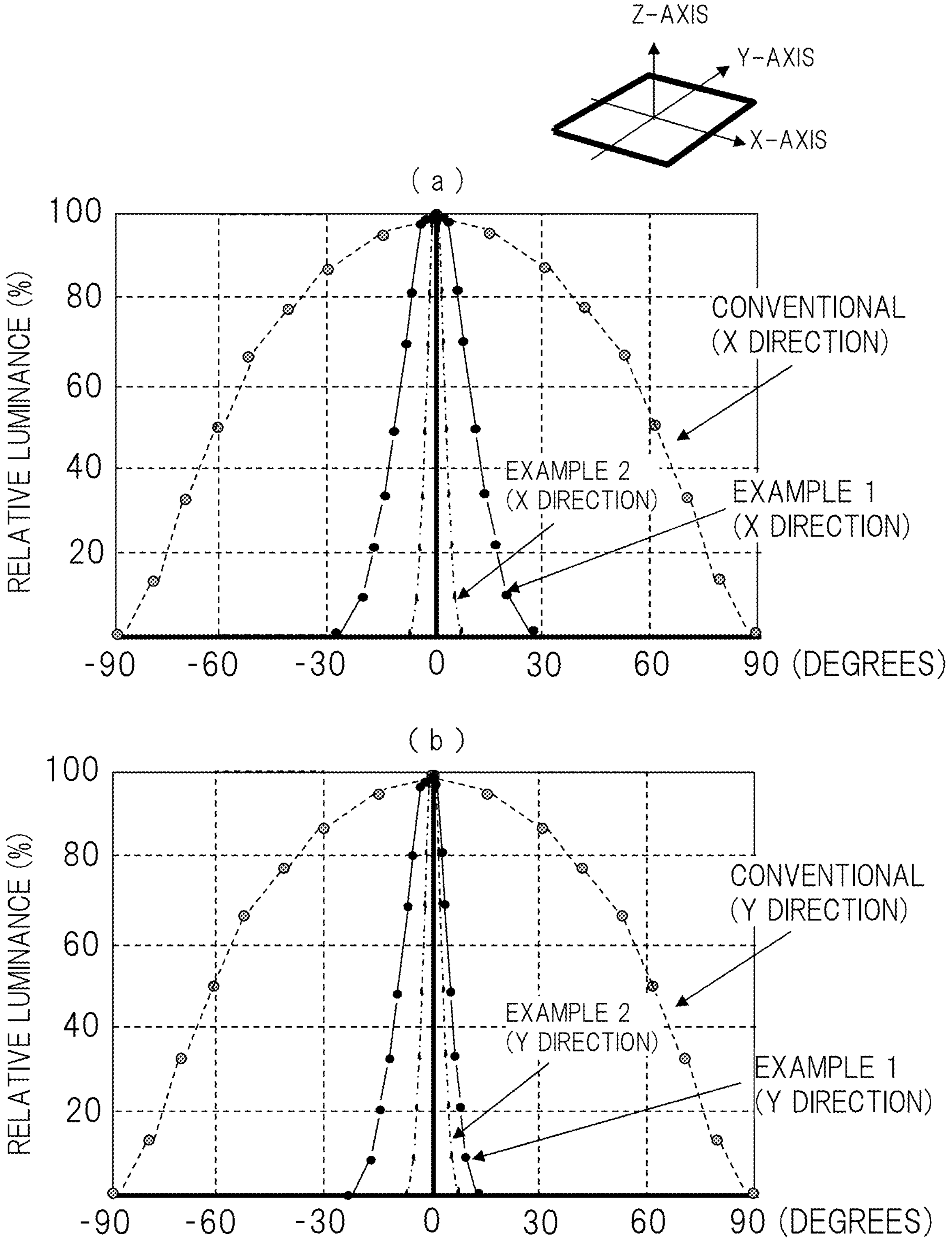
FIG. 12 is an explanatory diagram for describing diffusion characteristics of the video display apparatus according to one embodiment of the present invention.

In an apparatus for use in a general TV set, the light emitted from the liquid crystal display panel 11 has similar diffusion characteristics in both the horizontal direction of the screen (indicated by the X axis in FIG. 12(*a*)) and the vertical direction of the screen (indicated by the Y axis in FIG. 12(*b*)). On the other hand, in the diffusion characteristics of the light flux emitted from the liquid crystal display panel of the present embodiment, for example, as shown in Example 1 in FIG. 12, the viewing angle at which the luminance becomes 50% of that in front view (angle of 0 degrees) is 13 degrees, and this is ⅕ of 62 degrees in the apparatus for use in a general TV set. Similarly, the reflection angle of the reflective light guide, the area of the reflection surface, and the like are optimized such that the viewing angle in the vertical direction is made uneven in the upper and lower sides and the viewing angle on the upper side is suppressed to about ⅓ of the viewing angle on the lower side. As a result, the amount of video light toward the viewing direction is significantly improved as compared with the conventional liquid crystal TV, and the luminance is 50 times or more.

Further, in the viewing angle characteristics shown in Example 2 in FIG. 12, the viewing angle at which the luminance becomes 50% of that in front view (angle of 0 degrees) is 5 degrees, and this is 1/12 of 62 degrees in the apparatus for use in a general TV set. Similarly, the reflection angle of the reflective light guide, the area of the reflection surface, and the like are optimized such that the viewing angle in the vertical direction is made even in the upper and lower sides and the viewing angle is suppressed to about 1/12 of the apparatus for use in a general TV set. As a result, the amount of video light toward the viewing direction is significantly improved as compared with the conventional liquid crystal TV, and the luminance is 100 times or more.

As described above, by setting the viewing angle to a narrow angle, the amount of light flux toward the viewing direction can be concentrated, so that the utilization efficiency of light is significantly improved. As a result, even if a liquid crystal display panel for use in a general TV set is used, it is possible to realize a significant improvement in luminance with the same power consumption by controlling the light diffusion characteristics of the light source apparatus, and to provide the video display apparatus suitable for the information display system for bright outdoor use.

Figure 11:
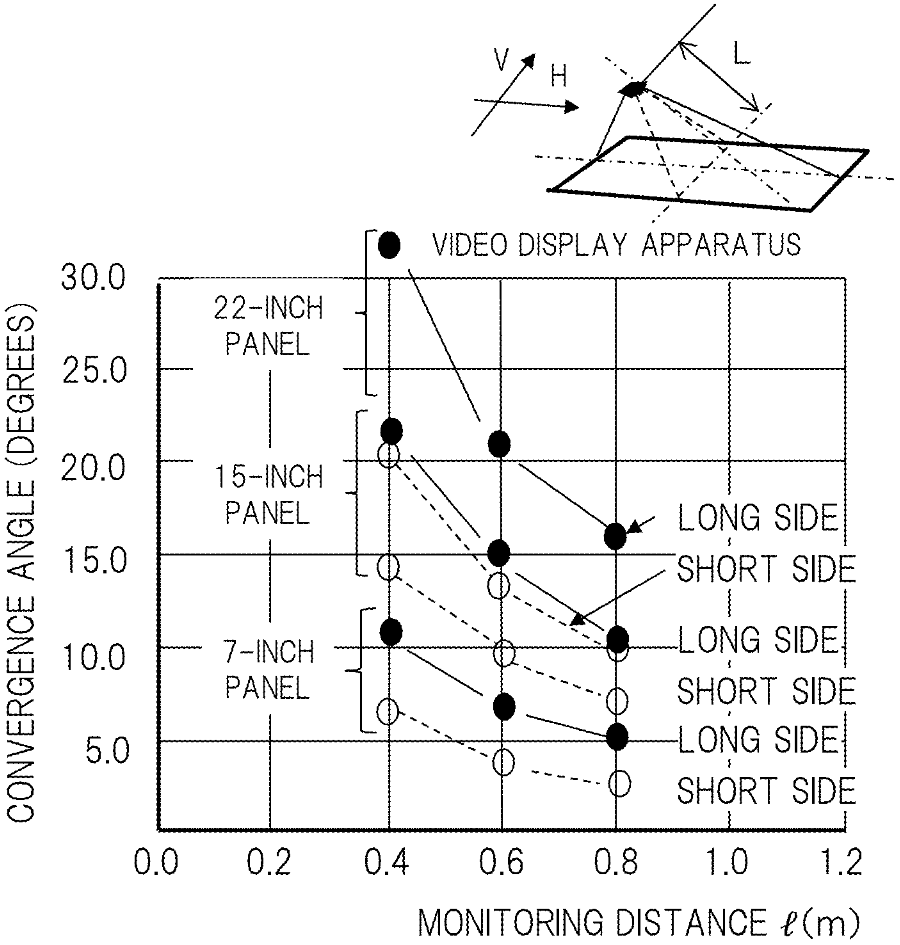
FIG. 11 is an explanatory diagram for describing light source diffusion characteristics of the video display apparatus according to one embodiment of the present invention.

When using a large liquid crystal display panel, the overall brightness of the screen is improved by directing the light in the periphery of the screen inward, that is, toward the observer who is squarely facing the center of the screen. FIG. 11 shows the convergence angle of the long side and the short side of the panel when the distance L from the observer to the panel and the panel size (screen ratio 16:10) are used as parameters. In the case of monitoring the screen as a vertically long screen, the convergence angle may be set in accordance with the short side. For example, in the case in which a 22-inch panel is used vertically and the monitoring distance is 0.8 m, the video light from the four corners of the screen can be effectively directed toward the observer by setting the convergence angle to 10 degrees.

Similarly, in the case in which a 15-inch panel is used vertically and the monitoring distance is 0.8 m, the video light from the four corners of the screen can be effectively directed toward the observer by setting the convergence angle to 7 degrees. As described above, the overall brightness of the screen can be improved by adjusting the video light in the periphery of the screen so as to be directed to the observer located at the optimum position to monitor the center of the screen depending on the size of the liquid crystal display panel and whether the liquid crystal display panel is used vertically or horizontally.

As a basic configuration, as shown in FIG. 9, a light flux having narrow-angle directional characteristics is made to enter the liquid crystal display panel 11 by the light source apparatus, and the luminance is modulated in accordance with a video signal, whereby the air floating video obtained by reflecting the video information displayed on the screen of the liquid crystal display panel 11 by the retroreflection plate is displayed outdoors or indoors through the transparent member 100.

By using the display apparatus and the light source apparatus according to the embodiment of the present invention described above, it is possible to realize the air floating video display apparatus with high light utilization efficiency.

<Example of Video Display Processing in Air Floating Video Display Apparatus>

Next, an example of the problem to be solved by the image processing of the present embodiment will be described with reference to FIG. 13A. In the air floating video display apparatus 1000, the rear side of the air floating video 3 is inside of the housing of the air floating video display apparatus 1000 when viewed from the user, and the user visually recognizes that the background of the air floating video 3 is black when it is sufficiently dark.

Here, an example of displaying a character "panda" 1525 in the air floating video 3 will be described with reference to FIG. 13A. First, in an image including a pixel region in which an image of the character "panda" 1525 is drawn and a transparent information region 1520 which is a background image as shown in FIG. 13A(1), the video controller 1160 in FIG. 3 separately recognizes the pixel region in which the image of the character "panda" 1525 is drawn and the transparent information region 1520 which is a background image.

As a method of separately recognizing the character image and the background image, for example, a background image layer and a character image layer in front of the background image layer are configured such that they can be processed as different layers in image processing by the video controller 1160, and the character image and the background image can be separately recognized based on the overlapping relationship when these layers are combined.

Here, the video controller 1160 recognizes the black of the pixel drawing an object such as the character image as different information from the transparent information pixel. However, if it is assumed that the luminance of both the black of the pixel drawing the object and the transparent information pixel is 0, there is no difference in luminance between the pixel drawing the black of the image of the character "panda" 1525 and the pixel of the transparent information region 1520 which is a background image, when displaying the air floating video 3. Therefore, in the air floating video 3, as shown in FIG. 13A(2), neither the pixel drawing the black in the image of the character "panda" 1525 nor the pixel of the transparent information region 1520 has luminance, and they are recognized by the user as the same black space. In other words, the part drawing the black of the image of the character "panda" 1525 which is an object blends into the background, and only the non-black part of the character "panda" 1525 is recognized as a video floating in the display region of the air floating video 3.

An example of image processing in the present embodiment will be described with reference to FIG. 13B. FIG. 13B is a diagram illustrating an example of image processing that more preferably solves the problem that the black image region of the object blends into the background described in FIG. 13A. In each of FIG. 13B(1) and FIG. 13(2), the display state of the air floating video 3 is shown on the upper side, and input/output characteristics of the image processing for the object image are shown on the lower side. Note that the image of the object (character "panda" 1525) and data corresponding thereto may be read from the storage 1170 or the memory 1109 in FIG. 3. Alternatively, they may be input from the video signal input section 1131, or may be acquired via the communication unit 1132.

Here, in the state of FIG. 13B(1), the input/output characteristics of the image processing for the object image are not particularly adjusted and are in a linear state. In this case, the display state is similar to that shown in FIG. 13A(2), and the black image region of the object has blended into the background. On the other hand, in FIG. 13B(2), the video controller 1160 of the present embodiment adjusts the input/output characteristics of image processing for the image of the object (character "panda" 1525) as shown on the lower side.

Namely, the video controller 1160 performs image processing with the input/output characteristics that convert the input image of the object (character "panda" 1525) having the pixel with low luminance into the output image having the pixel with increased luminance. The image of the object (character "panda" 1525) is subjected to the image processing with the input/output characteristics, and then the video including the image of the object (character "panda" 1525) is input and displayed on the display apparatus 1. Then, in the display state of the air floating video 3, as shown in the upper side of FIG. 13B(2), the luminance of the pixel region in which black is drawn in the image of the character "panda" 1525 increases. As a result, in the region in which the image of the character "panda" 1525 is drawn, even the region in which black is drawn can be distinctively recognized by the user without blending into the black background, and the object can be displayed more favorably.

In other words, by using the image processing shown in FIG. 13B(2), the region in which the image of the character "panda" 1525 which is an object is displayed can be separately recognized from the black background which is inside of the housing of the air floating video display apparatus 1000 seen through the window, and the visibility of the object is improved. Therefore, for example, even the object in which the pixel with a luminance value of 0 is included in the pixels constituting the object before the above-described image processing (that is, at the time when the image of the object and the data corresponding thereto are read from the storage 1170 or the memory 1109 in FIG. 3, when the image of the object is input from the video signal input unit 1131, when data of the object is acquired via the communication unit 1132, or the like) is converted into the object in which the luminance value of the pixel in the low luminance region is increased through the image processing with the input/output characteristics by the video controller 1160, is displayed on the display apparatus 1, and then converted into the air floating video 3 by the optical system of the air floating video display apparatus 1000.

Namely, the object is converted into the state in which the pixels constituting the object do not include the pixel with the luminance value of 0 by the image processing with the input/output characteristics, is displayed on the display apparatus 1, and then converted into the air floating video 3 by the optical system of the air floating video display apparatus 1000.

Note that, as a method of performing the image processing with the input/output characteristics in FIG. 13B(2) to only the region of the image of the object (character "panda" 1525), for example, a background image layer and a character image layer in front of the background image layer are configured such that they can be processed as different layers in the image processing by the video controller 1160, the image processing with the input/output characteristics in FIG. 13B(2) is performed to the character image layer, and the image processing is not performed to the background image layer.

Thereafter, by combining these layers, the image processing to increase the luminance of the low luminance region in the input image is performed to only the character image as shown in FIG. 13B(2). Alternatively, as another method, after combining the layer of the character image and the layer of the background image, the image processing for the input/output characteristics shown in FIG. 13B(2) may be applied to only the region of the character image.

Further, the input/output video characteristics used in the image processing to increase the luminance of the low luminance region of the input video are not limited to the example shown in FIG. 13B(2). Any image processing can be used as long as it can increase the luminance of the low luminance region, and the so-called brightness adjustment is also possible. Alternatively, video processing for improving the visibility by controlling the gain that changes the weighting of Retinex processing disclosed in International Publication No. 2014/162533 may be performed.

According to the image processing of FIG. 13B(2) described above, the region drawing black in the region where images such as character and object are drawn can be recognized by the user without blending into the black background, and it is possible to realize a more favorable display.

Figure 13A:
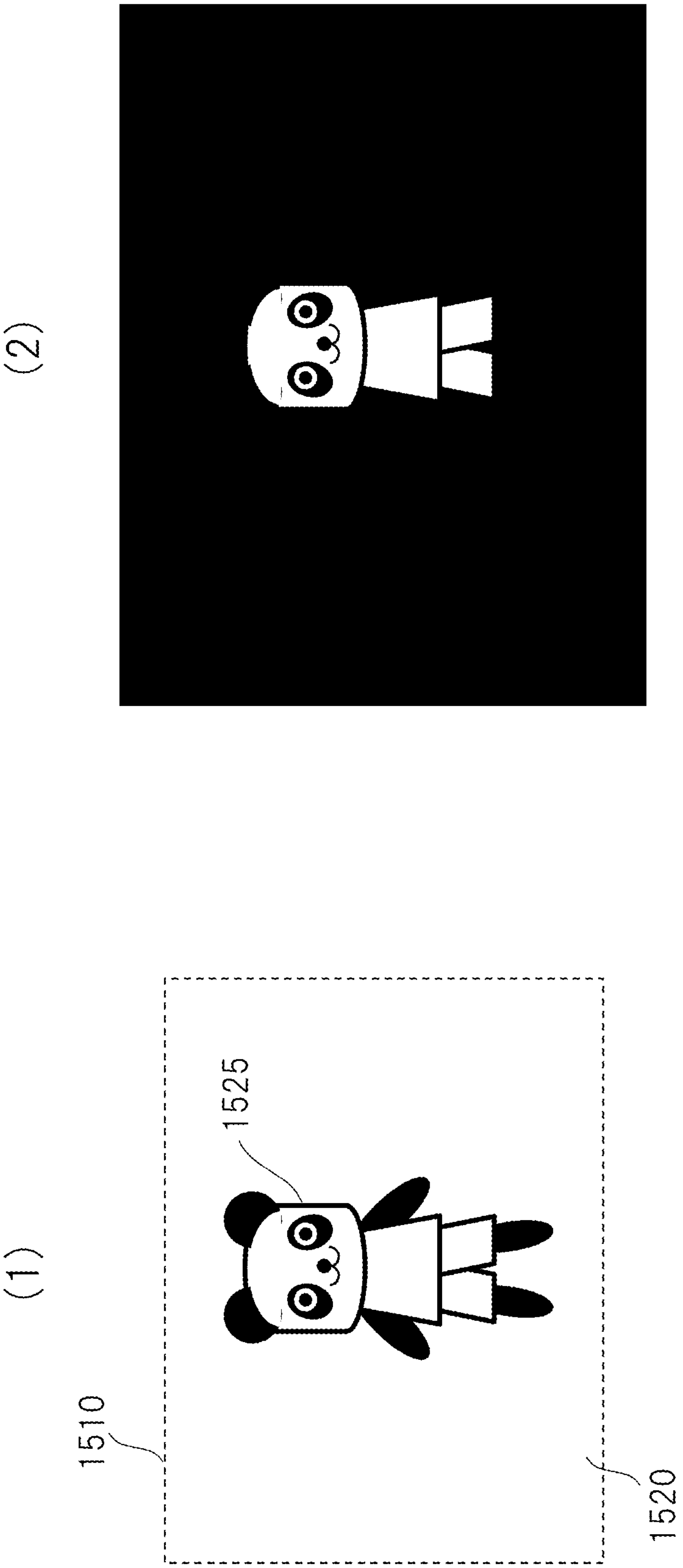
FIG. 13A is an explanatory diagram of an example of a problem to be solved by image processing according to one embodiment of the present invention.
Figure 13B:
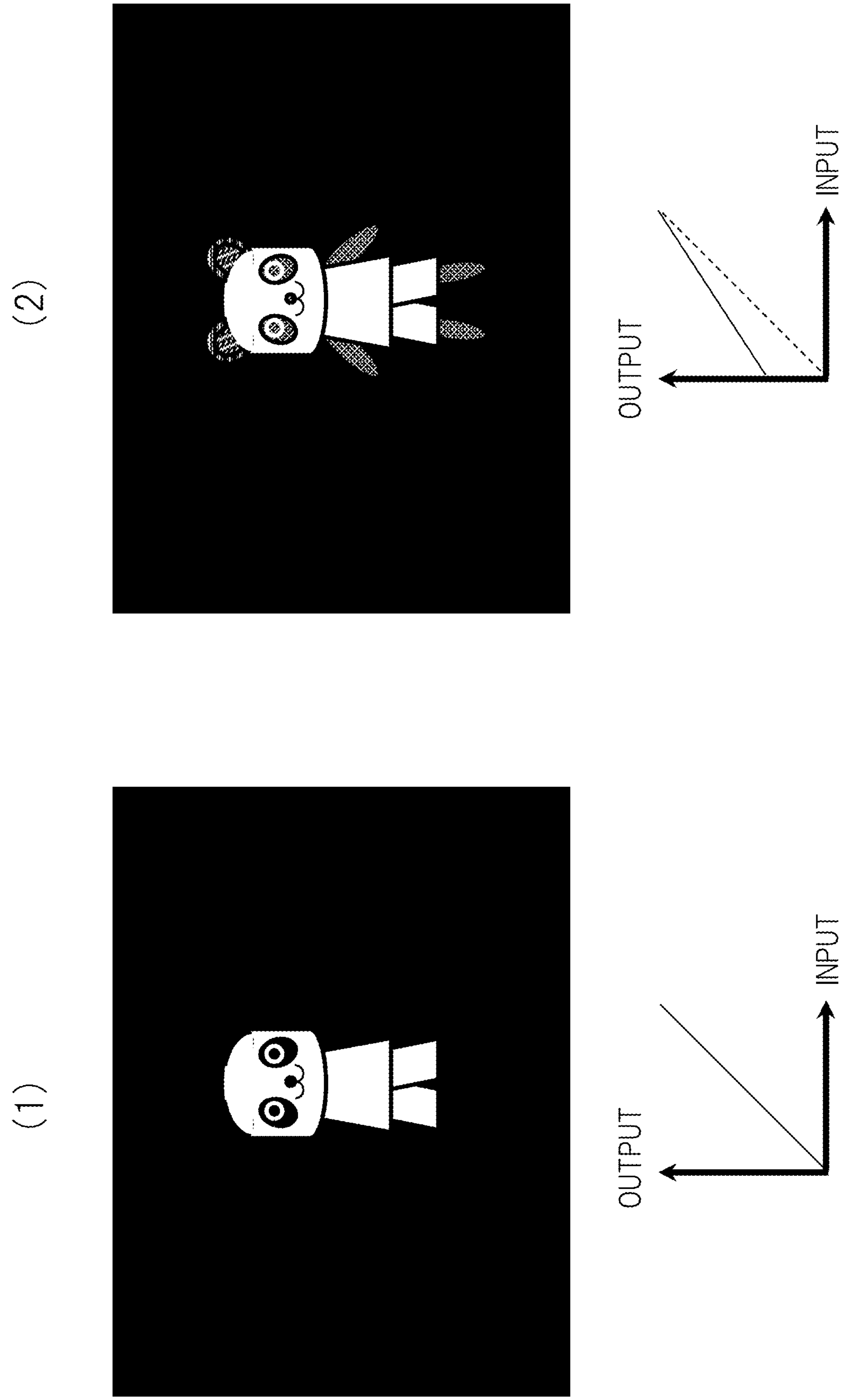
FIG. 13B is an explanatory diagram of an example of image processing according to one embodiment of the present invention.

Note that the problems and more favorable image processing for the air floating video display apparatus in which black is seen in the background (for example, the air floating video display apparatus 1000 in FIG. 4A to FIG. 4G and the air floating video display apparatus 1000 in FIG. 4I and FIG. 4J in the state where the rear-side window is in the light-shielding state) have been described in the examples of FIG. 13A and FIG. 13B. However, the image processing is also effective in the apparatus other than these air floating video display apparatuses.

Specifically, in the air floating video display apparatus 1000 in FIG. 4H and the air floating video display apparatus 1000 in FIG. 4I and FIG. 4J in which the rear-side window is not in the light-shielding state, the background of the air floating video 3 is not black, but is the scenery on the rear side of the air floating video display apparatus 1000 beyond the window. In this case as well, the problem described in FIG. 13A and FIG. 13B similarly exists.

Namely, the part drawing the black in the image of the character "panda" 1525 that is an object blends into the scenery on the rear side of the air floating video display apparatus 1000 beyond the window. In this case as well, by using the image processing shown in FIG. 13B(2), the part drawing the black in the image of the character "panda" 1525 that is an object can be separately recognized from the scenery on the rear side of the air floating video display apparatus 1000 beyond the window, and the visibility of the object is improved.

Namely, by using the image processing shown in FIG. 13B(2), the region in which the image of the character "panda" 1525 that is an object is displayed can be separately recognized from the scenery on the rear side of the air floating video display apparatus 1000 beyond the window, so that it is possible to recognize that the character "panda" 1525 that is an object is present in front of the scenery and the visibility of the object is improved.

In addition, when another video (video of the transmissive self-luminous video display apparatus 1650, video of the second display apparatus 1680, or the like) is displayed at the different depth position from the air floating video 3 in the air floating video display apparatus 1000 in FIG. 4K, FIG. 4L, and FIG. 4M as described above, the background of the air floating video 2 is not the black but is the different video. In this case as well, the problem described in FIG. 13A and FIG. 13B similarly exists.

Namely, the part drawing the black in the image of the character "panda" 1525 that is an object blends into the different video displayed at the different depth position from the air floating video 3. In this case as well, by using the image processing shown in FIG. 13B(2), the part drawing the black in the image of the character "panda" 1525 that is an object can be separately recognized from the different video, and the visibility of the object is improved.

Namely, by using the image processing shown in FIG. 13B(2), the region in which the image of the character "panda" 1525 that is an object is displayed can be separately recognized from the different video, so that it is possible to recognize that the character "panda" 1525 that is an object is present in front of the different video and the visibility of the object is improved.

Figure 13C:
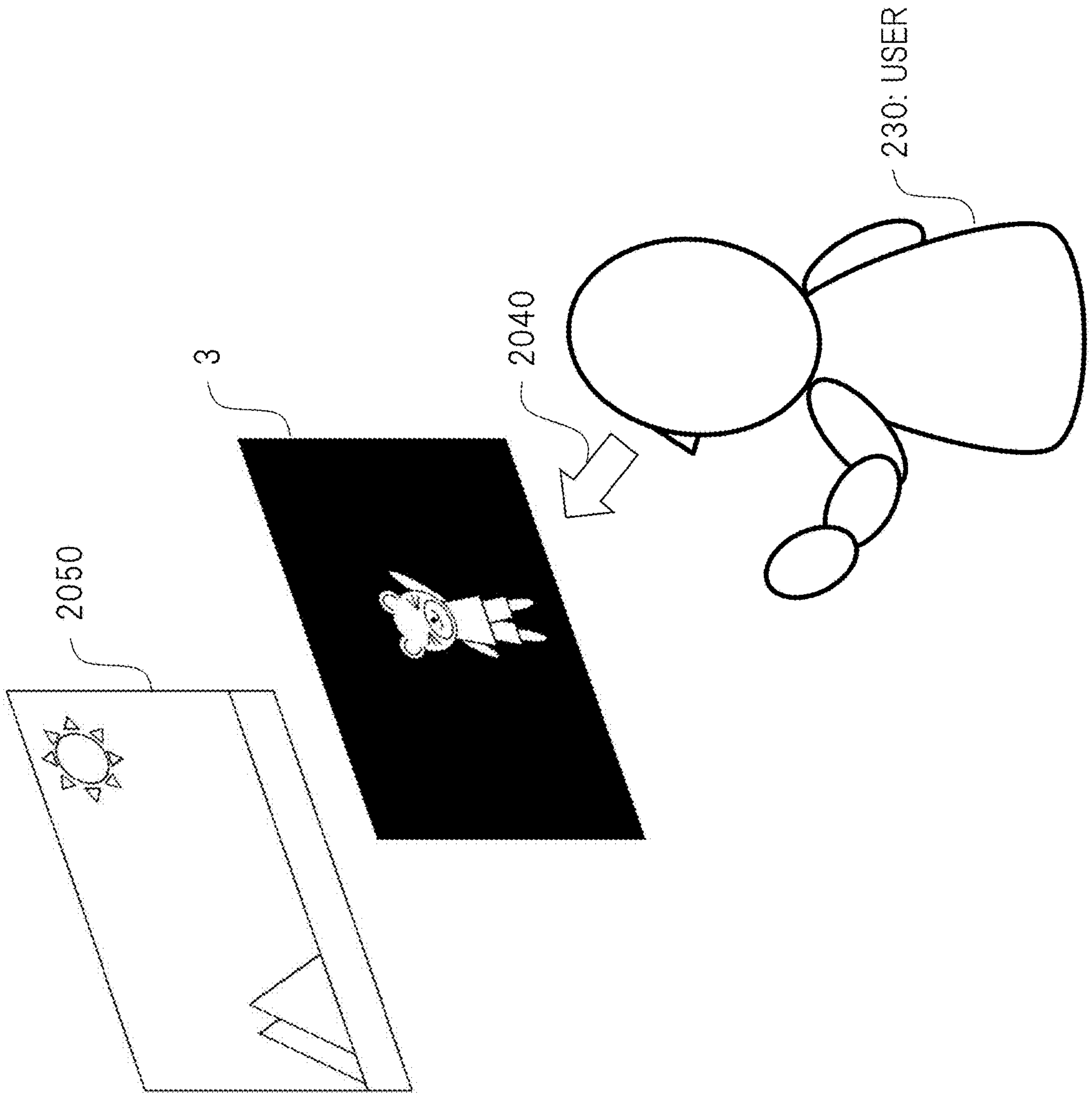
FIG. 13C is an explanatory diagram of an example of video display processing according to one embodiment of the present invention.

An example of the video display processing in the present embodiment will be described with reference to FIG. 13C. FIG. 13C is a video display example in which the air floating video 3 and a second image 2050 which is another video are simultaneously displayed in the video display examples of the present embodiment. The second image 2050 may correspond to the displayed video of the transmissive self-luminous video display apparatus 1650 in FIG. 4K or FIG. 4L. Also, the second image 2050 may correspond to the displayed video on the second display apparatus 1680 in FIG. 4M.

Namely, the video display example in FIG. 13C is a specific example of the video display of the air floating video display apparatus 1000 in FIG. 4K, FIG. 4L, and FIG. 4M. In the example of this drawing, a bear character is displayed in the air floating video 3. The region in the air floating video 3 other than the bear character is displayed in black, and is transparent as an air floating video. Further, the second image 2050 is a background image in which a plain, a mountain, and the sun are drawn.

Here, in FIG. 13C, the air floating video 3 and the second image 2050 are displayed at different depth positions. When the user 230 visually recognizes the two videos such as the air floating video 3 and the second image 2050 in the line of sight direction of the arrow 2040, the user 230 can visually recognize the two videos overlapped with each other. Specifically, the bear character in the air floating video 3 appears to be overlapped in front of the background of the plain, mountain, and sun drawn in image 2050.

Here, since the air floating video 3 is formed as a real image in the air, if the user 230 moves his/her viewpoint a little, the depth of the air floating video 3 and the second image 2050 can be recognized based on the parallax. Therefore, the user 230 can obtain a stronger sense of floating in the air with respect to the air floating video 3 while visually recognizing the two videos in the overlapped state.

Figure 13D:
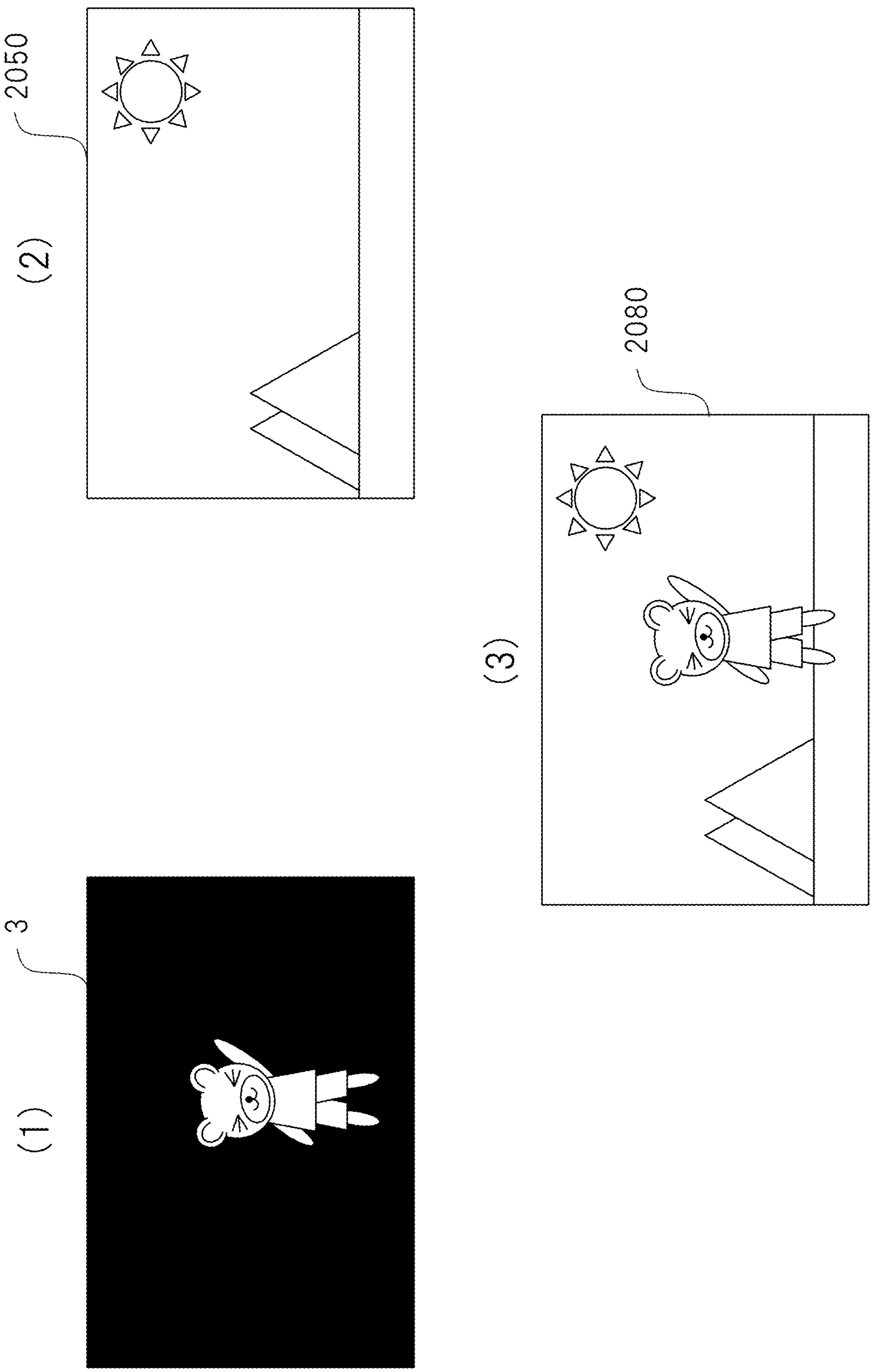
FIG. 13D is an explanatory diagram of an example of video display processing according to one embodiment of the present invention.

An example of the video display processing in the present embodiment will be described with reference to FIG. 13D. FIG. 13D(1) is a diagram of the air floating video 3 viewed from the line of sight direction of the user 230 in the example of the video display in the present embodiment in FIG. 13C. Here, a bear character is displayed in the air floating video 3. The region in air floating video 3 other than the bear character is displayed in black, and is transparent as an air floating video.

FIG. 13D(2) is a diagram of the second image 2050 viewed from the line of sight direction of the user 230 in the example of the video display in the present embodiment in FIG. 13C. In the example of this drawing, the second image 2050 is a background image in which a plain, a mountain, and the sun are drawn.

FIG. 13D(3) is a diagram showing a state in which the second image 2050 and the air floating video 3 appear to be overlapped with each other in the line of sight direction of the user 230 in the example of the video display in the present embodiment in FIG. 13C. Specifically, the bear character in the air floating video 3 appears to be overlapped in front of the background of the plain, mountain, and sun drawn in the second image 2050.

Here, in order to ensure the visibility of the air floating video 3 more favorably when displaying the air floating video 3 and the second image 2050 at the same time, it is desirable to pay attention to the balance in the brightness therebetween. If the second image 2050 is too bright compared to the brightness of the air floating video 3, the displayed video of the air floating video 3 will become transparent, and the second image 2050 which is the background seen through the air floating video 3 will be strongly visually recognized.

Therefore, the output of the light source of the air floating video 3, the luminance of the displayed video of the display apparatus 1, the output of the light source of the display apparatus that displays the second image 2050, and the luminance of the displayed video of the display apparatus are preferably set such that at least the brightness per unit area of the air floating video 3 at the display position of the air floating video 3 is greater than the brightness per unit area of the video light that reaches the display position of the air floating video 3 from the second image 2050.

Note that, since it is necessary to satisfy this condition only when displaying the air floating video 3 and the second image 2050 at the same time, the control to reduce the brightness of the second image 2050 by reducing the output of the light source of the display apparatus that displays the second image 2050 and/or the luminance of the displayed video of the display apparatus may be performed when the first display mode in which only the second image 2050 is displayed without displaying the air floating video 3 is switched to the second display mode in which the air floating video 3 and the second image 2050 are displayed at the same time. The controller 1110 in FIG. 3 can realize such control by controlling the display apparatus 1 and the display apparatus that displays the second image 2050 (transmissive self-luminous video display apparatus 1650 in FIG. 4K or FIG. 4L or second display apparatus 1680 in FIG. 4M).

Note that, in the case where the control to reduce the brightness of the second image 2050 is performed when the first display mode described above is switched to the second display mode described above, the brightness may be uniformly reduced over the entire screen of the second image 2050. Alternatively, instead of uniformly reducing the brightness over the entire screen of the second image 2050, only the part of the second image 2050 corresponding to the object displayed in the air floating video 3 is made to have the highest brightness reduction effect, and the brightness reduction effect may be gradually reduced in the surrounding region thereof. This is because, if the brightness of the second image 2050 is reduced only in the part where the air floating video 3 is visually recognized so as to be overlapped with the second image 2050, the visibility of the air floating video 3 can be sufficiently ensured.

Here, since the air floating video 3 and the second image 2050 are displayed at different depth positions, the overlapping position of the air floating video 3 with respect to the second image 2050 changes due to parallax when the user 230 slightly changes the viewpoint. Therefore, in the case where the brightness is reduced unevenly for the entire screen of the second image 2050 when the first display mode described above is switched to the second display mode described above, it is not desirable to sharply reduce the brightness based on the outline of the object displayed in the air floating video 3, and it is desirable to perform the gradation processing of brightness reduction effect, in which the brightness reduction effect is gradually varied depending on the positions as described above.

Note that, in the air floating video display apparatus 1000 in which the position of the object displayed in air floating video 3 is approximately at the center of air floating video 3, the position where the brightness reduction effect is highest in the gradation processing of brightness reduction effect may be set to the central position of the air floating video 3.

With the video display processing according to the present embodiment described above, the user 230 can visually recognize the air floating video 3 and the second image 2050 more favorably.

Note that the control not to display the second image 2050 may be performed when displaying the air floating video 3. Since the visibility of the air floating video 3 becomes higher when the second image 2050 is not displayed, this control is suitable for the air floating video display apparatus 1000 required to display the air floating video 3 such that the user can visually recognize the air floating video 3 without fail.

Second Embodiment

Another configuration example of the air floating video display apparatus will be described as the second embodiment. Note that, in the air floating video display apparatus according to this embodiment, the optical system stored in the air floating video display apparatus described in the first embodiment is changed to the optical system shown in FIG. 14(1) or FIG. 14(2). In this embodiment, differences from the first embodiment will be described, and repetitive descriptions of the same configuration as that of the first embodiment will be omitted. Note that, in the following description of this embodiment, the specific polarized light and the other polarized light are polarized lights of polarized waves whose phases differ from each other by 90°.

Figure 14:
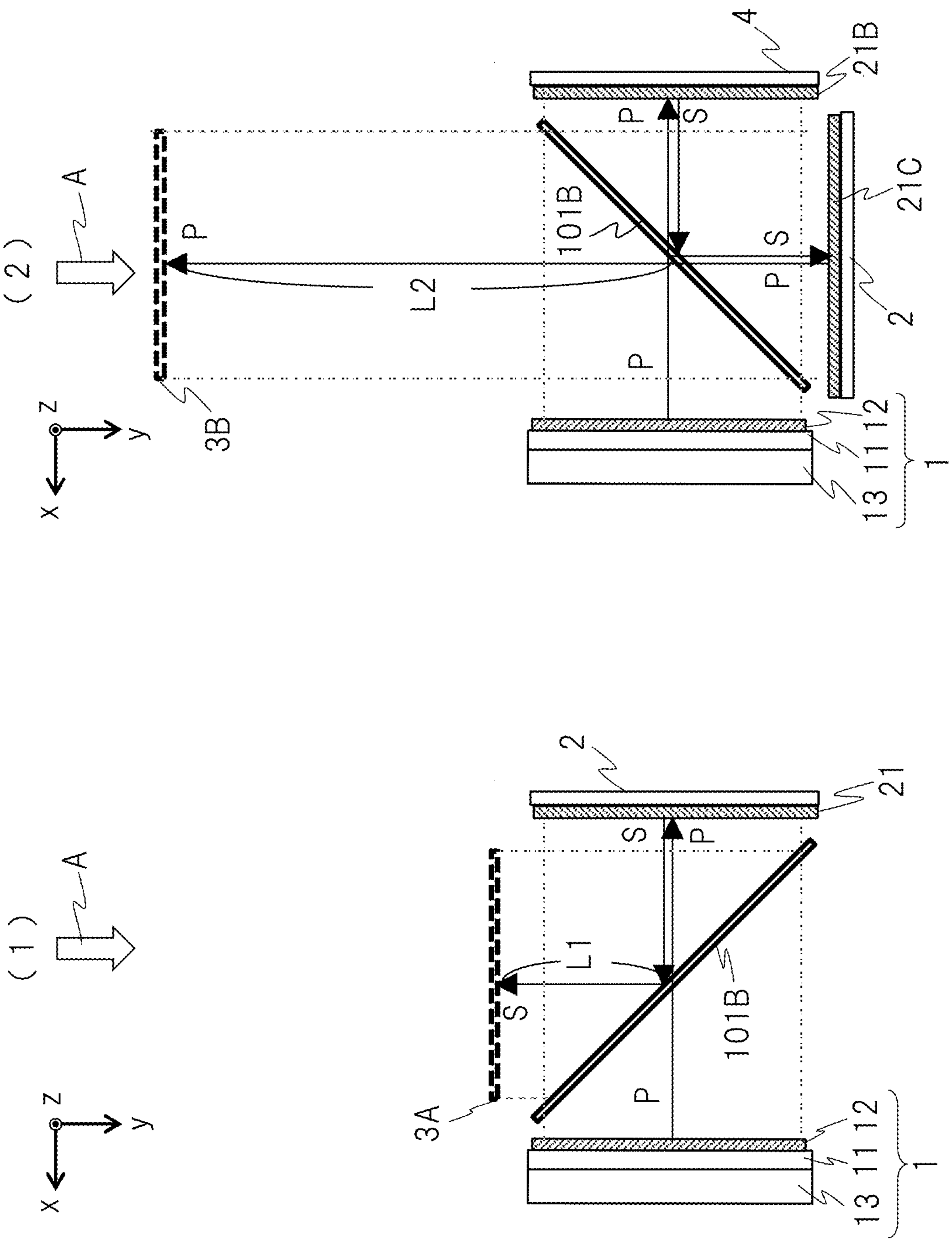
FIG. 14 is a diagram showing an example of a configuration of a main part and a configuration of a retroreflection portion of the air floating video display apparatus according to one embodiment of the present invention.

FIG. 14(1) is an example of the optical system and optical path according to this embodiment. In the optical system shown in FIG. 14(1), the display apparatus 1 is brought closer to the polarization separator 101B in the optical system of FIG. 2C, thereby making the entire optical system more compact. In FIG. 14(1), detailed descriptions of components denoted by the same reference characters as those in FIG. 2C will not be repeated.

In FIG. 14(1), as in FIG. 2C, the video light of a specific polarized light (P-polarized light in the drawing) emitted from the display apparatus 1 travels in a perpendicular direction from the video display surface of the display apparatus 1. Here, as in FIG. 2C, the polarization separator 101B selectively transmits the specific polarized light (P-polarized light in the drawing) emitted from the display apparatus 1 and reflects the other polarized light (S-polarized light in the drawing).

Therefore, the video light of the specific polarized light (P-polarized light in the drawing) traveling in the perpendicular direction from the video display surface of the display apparatus 1 passes through the polarization separator 101B and reaches the retroreflection plate 2 to which the λ/4 plate 21 is attached. The video light that has been retroreflected by the retroreflection plate 2 and travels again toward the polarization separator 101B is converted from the specific polarized light (P-polarized light in the drawing) at the time of emission from the display apparatus 1 into the other polarized light (S-polarized light in the drawing) by passing through the λ/4 plate 21 twice. Since the video light that travels again toward the polarization separator 101B is the other polarized light (S-polarized light in the drawing), it is reflected by the polarization separator 101B toward the position where the user should be. The traveling direction of the video reflected by the polarization separator 101B is determined based on the angle at which the polarization separator 101B is arranged.

In the example of FIG. 14(1), the video light traveling toward the polarization separator 101B is reflected at a right angle by the polarization separator 101B and travels as shown in the drawing. The video light reflected by the polarization separator 101B forms an air floating video 3A. The air floating video 3A can be visually recognized favorably by the user in the direction indicated by the arrow A.

Because of the characteristics of retroreflection by the retroreflection plate 2, the optical path length of the video light emitted from the display apparatus 1 to reach the retroreflection plate 2 is equal to the optical path length of the video light emitted from the retroreflection plate 2 to reach the position where the air floating video 3A is formed. This relationship determines the position where the air floating video 3A is formed in the traveling direction of the video light reflected by the polarization separator 101B.

In the example of FIG. 14(1), the display apparatus 1, the polarization separator 101B, and the retroreflection plate 2 are arranged closer together than those in the example of FIG. 2C. This allows the entire optical system to be configured more compactly. However, the amount by which the air floating video 3A projects from the optical system of FIG. 14(1) is not very large. For example, as an index of the amount by which the air floating video 3A projects from the optical system, the distance from the position where light ray at the central part of the video light is reflected by the polarization separator 101B to the position where the video light forms the air floating video 3A (L1 in the example of FIG. 14(1)) is shown in the drawing.

In addition, in the polarization design of the optical system of FIG. 14(1), the characteristics of P-polarized light and S-polarized light may be interchanged. Specifically, the specific polarized light of the video light emitted from the display apparatus 1 may be made S-polarized light, and the reflection characteristics of the polarization separator 101B may be interchanged between P-polarized light and S-polarized light. In this case, the P-polarized light and S-polarized light shown in the drawing are both reversed, but optical designs such as the optical path can be realized in exactly the same way.

Next, FIG. 14(2) shows another example of an optical system and optical path according to this embodiment. In the optical system of FIG. 14(2), the configuration of the optical system of FIG. 14(1) is modified in order to increase the amount by which the air floating video projects from the optical system while still achieving the same compactness as the optical system of FIG. 14(1). In FIG. 14(2), detailed descriptions of components denoted by the same reference characters as those in FIG. 14(1) will not be repeated.

In FIG. 14(2), as in FIG. 14(1), video light of a specific polarized light (P-polarized light in the drawing) emitted from the display apparatus 1 travels in a perpendicular direction from the video display surface of the display apparatus 1. Here, the polarization characteristics of the polarization separator 101B differ by 90 degrees from that in FIG. 14(1). The video light of the specific polarized light (P-polarized light in the drawing) traveling in the perpendicular direction from the video display surface of the display apparatus 1 passes through the polarization separator 101B.

Here, unlike FIG. 14(1), ahead of the video light that has passed through the polarization separator 101B, a specular reflection plate 4 to which a λ/4 plate 21B is attached is arranged instead of the retroreflection plate 2 to which the λ/4 plate 21 is attached. Here, the reflection at the specular reflection plate 4 is specular reflection (referred to also as regular reflection), and is not retroreflection.

Therefore, the video light that has passed through the polarization separator 101B is specularly reflected by the specular reflection plate 4 to which the λ/4 plate 21B is attached. The video light that has been specularly reflected by the specular reflection plate 4 and travels again toward the polarization separator 101B is converted from the specific polarized light (P-polarized light in the drawing) at the time of emission from the display apparatus 1 into the other polarized light (S-polarized light in the drawing) by passing through the λ/4 plate 21B twice. The video light that travels again toward the polarization separator 101B is the other polarized light (S-polarized in the drawing), and is thus reflected by the polarization separator 101B.

Here, since the orientation of the polarization separator 101B in FIG. 14(2) is different from that in FIG. 14(1), the video light reflected by the polarization separator 101B travels in the opposite direction relative to the position where the user should be. Ahead of the video light traveling after being reflected by the polarization separator 101B, the retroreflection plate 2 to which a λ/4 plate 21C is attached is arranged. The video light is retroreflected by the retroreflection plate 2. The video light that has been retroreflected by the retroreflection plate 2 and travels again toward the polarization separator 101B is converted from the other polarized light (S-polarized light in the drawing) into the specific polarized light (P-polarized light in the drawing) again by passing through the λ/4 plate 21C twice.

The video light that travels again toward the polarization separator 101B is the specific polarized light (P-polarized light in the drawing), and thus passes through the polarization separator 101B and continues to travel toward the position where the user should be. The video light that has passed through the polarization separator 101B forms an air floating video 3B. The air floating video 3B can be visually recognized favorably by the user in the direction indicated by the arrow A.

Also in FIG. 14(2), as in FIG. 14(1), because of the characteristics of the retroreflection by the retroreflection plate 2, the optical path length of the video light emitted from the display apparatus 1 to reach the retroreflection plate 2 is equal to the optical path length of the video light emitted from the retroreflection plate 2 to reach the position where the air floating video 3B is formed. This relationship determines the position where the air floating video 3B is formed in the traveling direction of the video light that has passed through the polarization separator 101B.

The optical path length of the video light emitted from the display apparatus 1 to reach the retroreflection plate 2 in FIG. 14(2) is longer than the optical path length of the video light emitted from the display apparatus 1 to reach the retroreflection plate 2 in FIG. 14(1). This is because an optical path going back and forth between the polarization separator 101B and the specular reflection plate 4, which does not exist in the optical system of FIG. 14(1), is added to the optical path length of the video light emitted from the display apparatus 1 to reach the retroreflection plate 2 in the optical system of FIG. 14(2).

As a result, the distance from the position where light ray at the central part of the video light passes through the polarization separator 101B to the position where the video light forms the air floating video 3B (L2 in the example of FIG. 14(2)) in the optical system of FIG. 14(2) becomes much longer than the distance from the position where light ray at the central part of the video light is reflected by the polarization separator 101B to the position where the video light forms the air floating video 3A (L1 in the example of FIG. 14(1)) in the optical system of FIG. 14(1).

In addition, in the polarization design of the optical system of FIG. 14(2) as well, the characteristics of P-polarized light and S-polarized light may be interchanged. Specifically, the specific polarized light of the video light emitted from the display apparatus 1 may be made S-polarized light, and the reflection characteristics of the polarization separator 101B may be interchanged between P-polarized light and S-polarized light. In this case, the P-polarized light and S-polarized light shown in the drawing are both reversed, but optical designs such as the optical path can be realized in exactly the same way.

With the optical systems of FIG. 14(1) and FIG. 14(2) according to the second embodiment of the present invention described above, a more compact optical system can be realized. In particular, the optical system of FIG. 14(2) makes it possible to increase the amount by which the air floating video projects from the optical system, while still achieving a more compact optical system.

When incorporating the optical system of FIG. 14(1) or FIG. 14(2) into an air floating video display apparatus, this can be realized by replacing the optical system in the air floating video display apparatus described in the first embodiment with the optical system of FIG. 14(1) or FIG. 14(2). Specifically, the optical system of FIG. 14(1) may be replaced with the optical system of the air floating video display apparatus of FIG. 4E, FIG. 4F, FIG. 4G, FIG. 4H, FIG. 4I, FIG. 4J, FIG. 4K, FIG. 4L, or FIG. 4M. In this case, since the optical system becomes compact, it is possible to make the housing of the air floating video display apparatus in each drawing smaller.

More specifically, the optical system of FIG. 14(2) may be replaced with the optical system of the air floating video display apparatus of FIG. 4E, FIG. 4F, FIG. 4G, FIG. 4K, or FIG. 4L. In this case, it is possible to further increase the amount by which the air floating video projects from the optical system. Also, since the optical system becomes more compact, it is possible to make the housing of the air floating video display apparatus of each drawing smaller.

Third Embodiment

As the third embodiment of the present invention, an air floating video display apparatus configured to display air floating videos in multiple layers having different projection amounts from an optical system will be described as another configuration example of the air floating video display apparatus. In this embodiment, differences from the first or second embodiment will be described, and repetitive descriptions of the same configuration as that of the first or second embodiment will be omitted. Note that, in the following description of this embodiment, the specific polarized light and the other polarized light are polarized lights of polarized waves whose phases differ from each other by 90°.

Figure 15A:
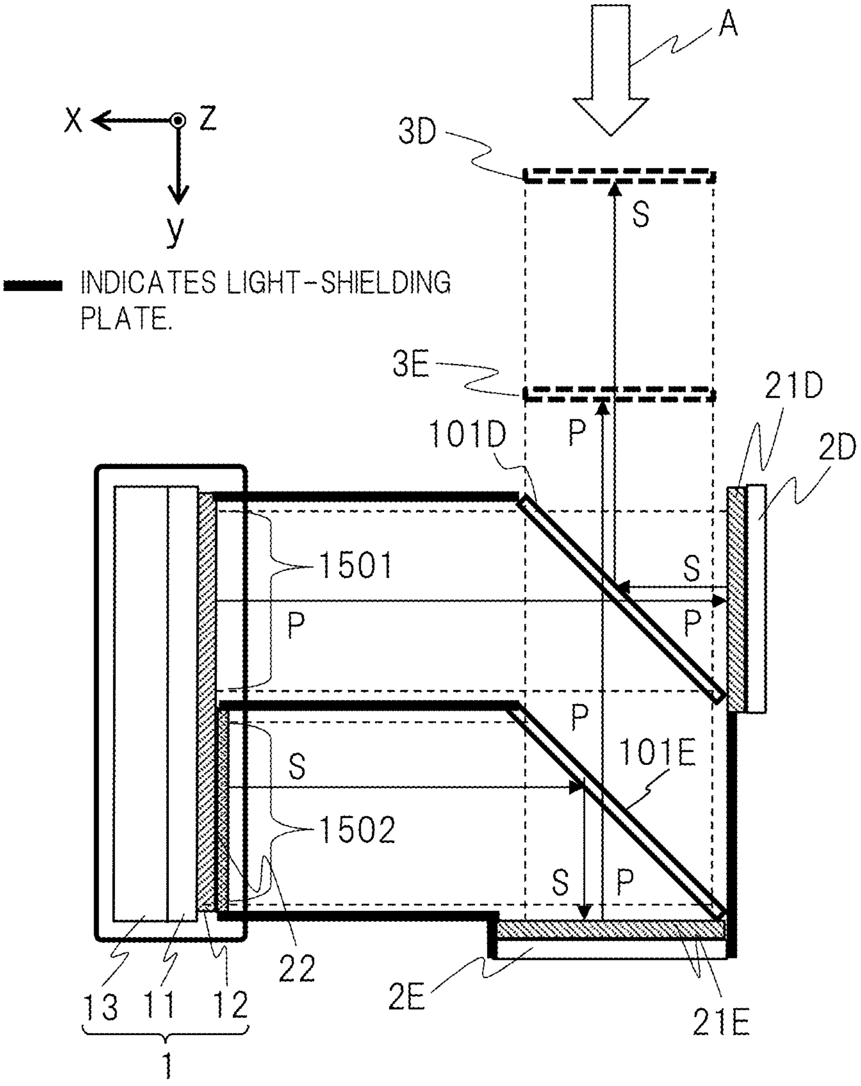
FIG. 15A is a diagram showing an example of a configuration of a main part and a configuration of a retroreflection portion of the air floating video display apparatus according to one embodiment of the present invention.

FIG. 15A shows a configuration example of an optical system and an example of an optical path in an air floating video display apparatus configured to display air floating videos in multiple layers. In the optical system of FIG. 15A, only one display apparatus 1 is provided as the display apparatus serving as a video source. In the example of FIG. 15A, two display regions of a display region 1501 and a display region 1502 are provided on the display screen of the display apparatus 1. The optical system of FIG. 15A displays an air floating video 3D corresponding to the display region 1501. The optical system of FIG. 15A displays an air floating video 3E corresponding to the display region 1502.

In the example of FIG. 15A, when a user views the air floating video 3D and the air floating video 3E in the direction indicated by the arrow A, the air floating video 3D appears to be displayed in front of the air floating video 3E. Since the air floating video 3D and the air floating video 3E appear to overlap as viewed from the user, these air floating videos are visually recognized as air floating videos in two layers in depth.

Next, the detailed configuration of the optical system in FIG. 15A, which realizes the air floating videos in two layers in depth, will be described. Since the configuration of the display apparatus 1 is the same as that in the first embodiment, repetitive descriptions thereof will be omitted. First, a video light of a specific polarized light (P-polarized light in the drawing) is output from the display apparatus 1. The video light of the specific polarized light (P-polarized light in the drawing) is output at any position in the display region 1501 and the display region 1502, but a λ/2 plate 22 is attached so as to include the display region 1502 in the optical system of FIG. 15A, and thus the video light emitted from the display region 1502 travels after passing through the λ/2 plate 22 to be converted into the other polarized light (S-polarized light in the drawing).

Here, the video light of the specific polarized light (P-polarized light in the drawing) output from the display region 1501 travels as shown in the drawing and enters a polarization separator 101D. The polarization separator 101D selectively transmits the specific polarized light (P-polarized light in the drawing) and reflects the other polarized light (S-polarized light in the drawing).

Therefore, the video light of the specific polarized light (P-polarized light in the drawing) output from the display region 1501 passes through the polarization separator 101D and reaches a retroreflection plate 2D to which a λ/4 plate 21D is attached. The video light that has been retroreflected by the retroreflection plate 2D and travels again toward the polarization separator 101D is converted from the specific polarized light (P-polarized light in the drawing) at the time of emission from the display apparatus 1 into the other polarized light (S-polarized light in the drawing) by passing through the λ/4 plate 21D twice.

The video light that travels again toward the polarization separator 101D is the other polarized light (S-polarized light in the drawing), and is thus reflected by the polarization separator 101D toward the position where the user should be. The traveling direction of the video reflected by the polarization separator 101D is determined based on the angle at which the polarization separator 101D is arranged. In the example of FIG. 15A, the video light that travels toward the polarization separator 101D is reflected at a right angle by the polarization separator 101D and travels as shown in the drawing. The video light reflected by the polarization separator 101D forms the air floating video 3D.

Next, the video light output from the display region 1502 travels after passing through the λ/2 plate 22 to be converted into the other polarized light (S-polarized light in the drawing), and enters a polarization separator 101E. The polarization separator 101E selectively transmits a specific polarized light (P-polarized light in the drawing) and reflects the other polarized light (S-polarized light in the drawing). Therefore, the video light of the other polarized light (S-polarized light in the drawing) output from the display region 1502 and passing through the λ/2 plate 22 is reflected by the polarization separator 101E and reaches a retroreflection plate 2E to which a λ/4 plate 21E is attached. The traveling direction of the video reflected by the polarization separator 101E is determined based on the angle at which the polarization separator 101E is arranged. In the example of FIG. 15A, the video light traveling toward the polarization separator 101E is reflected at a right angle by the polarization separator 101E and travels as shown in the drawing. The video light that has been retroreflected by the retroreflection plate 2E and travels again toward the polarization separator 101E is converted from the other polarized light (S-polarized light in the drawing) into the specific polarized light (P-polarized light in the drawing) by passing through the λ/4 plate 21E twice.

The video light that travels again toward the polarization separator 101E is the specific polarized light (P-polarized light in the drawing), and thus passes through the polarization separator 101E. As shown in the drawing, the video light that has passed through the polarization separator 101E travels toward the polarization separator 101D. As described above, the polarization separator 101D selectively transmits the specific polarized light (P-polarized light in the drawing) and reflects the other polarized light (S-polarized light in the drawing). Therefore, the video light from the retroreflection plate 2E, which is the specific polarized light (P-polarized light in the drawing), passes through the polarization separator 101D and travels toward the position where the user should be. The video light that has passed through the polarization separator 101D forms the air floating video 3E.

In the example of FIG. 15A, a light-shielding plate is provided between the optical path of the video light output from the display region 1501 and the optical path of the video light output from the display region 1502 so as to prevent each video light from leaking into the optical path of the other video light.

In the example of FIG. 15A, the polarization separator 101D and the polarization separator 101E are both arranged with an inclination of 45 degrees with respect to the traveling direction of the video light from the display apparatus 1. As a result, the video light forming the air floating video 3D and the video light forming the air floating video 3E travel together in the same direction toward the position where the user should be. For this configuration, in the example of FIG. 15A, the air floating video 3D, the air floating video 3E, the polarization separator 101D, the polarization separator 101E, and the retroreflection plate 2E are arranged on the same straight line as viewed from the user (for example, in the example of FIG. 15A, the straight line of the optical path from the retroreflection plate 2E to the air floating video 3E or the straight line extending toward the user) when the user views the air floating video 3D and the air floating video 3E in the direction indicated by the arrow A (y direction).

Also, in this case, the display apparatus 1 and the retroreflection plate 2D are arranged at positions deviated from the same straight line. Further, in the example of FIG. 15A, installation positions of the polarization separator 101D and the polarization separator 101E are determined such that the center of the air floating video 3D in the left-right direction (x direction) and the center of the air floating video 3E in the left-right direction (x direction) coincide with each other when the user views the air floating video 3D and the air floating video 3E in the direction indicated by the arrow A (y direction). It is preferable that the center of the air floating video 3D in the left-right direction (x direction) and the center of the air floating video 3E in the left-right direction (x direction) coincide with each other as viewed from the user because the user can view the air floating videos more easily and the video content creator does not have to take the offset into consideration. In addition, this is preferable because the optical layout can be simplified.

In addition, in the polarization design optical system of FIG. 15A, the characteristics of P-polarized light and S-polarized light may be interchanged. Specifically, a specific polarized light of the video light emitted from the display region 1501 of the display apparatus 1 may be made S-polarized light, the other polarized light emitted from the display region 1502 of the display apparatus 1 and passing through the λ/2 plate 22 may be made P-polarized light, and the reflection characteristics of the polarization separator 101D and the polarization separator 101E may be interchanged between P-polarized light and S-polarized light. In this case, the P-polarized light and S-polarized light shown in the drawing are both reversed, but optical designs such as the optical path can be realized in exactly the same way.

With the optical system of FIG. 15A described above, it is possible to realize an optical system configured to form the air floating videos in two layers in depth using one display apparatus. Note that a configuration in which separate display apparatuses are provided for the display region 1501 and the display region 1502 is also possible. However, a configuration in which a plurality of display apparatuses are provided requires more corresponding circuits, which may lead to the increase in cost. Therefore, if the air floating videos in two layers in depth can be formed using only one display apparatus as shown in FIG. 15A, it is possible to realize the optical system configured to form the air floating videos in two layers in depth at lower cost.

When incorporating the optical system of FIG. 15A into an air floating video display apparatus, this can be realized by replacing the optical system in the air floating video display apparatus described in the first embodiment with the optical system of FIG. 15A. Specifically, the optical system of FIG. 15A may be replaced with the optical system of the air floating video display apparatus of FIG. 4E, FIG. 4F, FIG. 4G, FIG. 4K, or FIG. 4L. In this case, the air floating video display apparatus configured to form the air floating videos in two layers in depth can be realized in each drawing. In particular, in FIG. 4K and FIG. 4L, the air floating videos in two layers in depth can be formed on a near side as viewed from the user of the transmissive self-luminous video display apparatus 1650. In this case, the videos in three layers at different depths including the air floating videos in two layers in depth and the video of the transmissive self-luminous video display apparatus 1650 can be formed so as to be visually recognized from the user.

Figure 15B:
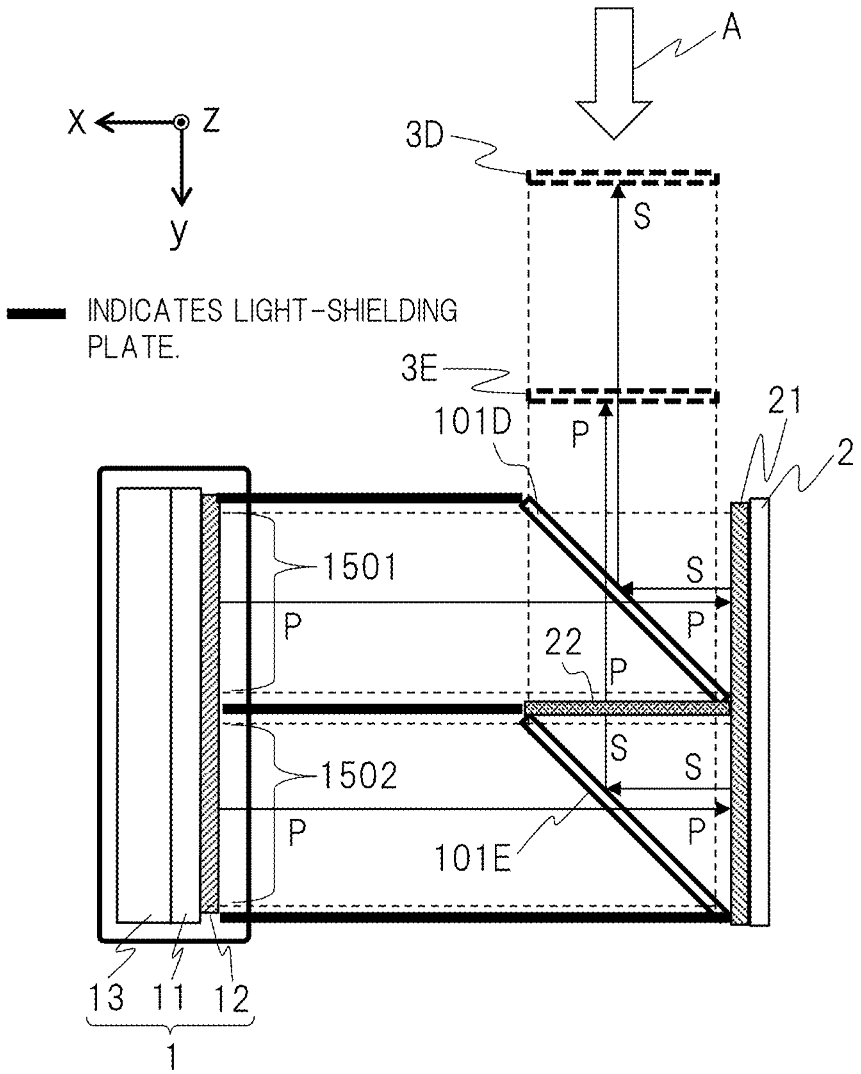
FIG. 15B is a diagram showing an example of a configuration of a main part and a configuration of a retroreflection portion of the air floating video display apparatus according to one embodiment of the present invention.

Next, another example of the optical system and optical path of the air floating video display apparatus configured to display air floating videos in multiple layers having different projection amounts from an optical system according to the third embodiment will be described with reference to FIG. 15B. The optical system of FIG. 15B is a modification in which a part of the configuration of the optical system of FIG. 15A is changed. Therefore, in the example of FIG. 15B, the differences from FIG. 15A will be described, and repetitive descriptions of the same configuration as that of FIG. 15A will be omitted.

In the optical system of FIG. 15B, as in FIG. 15A, two display regions of the display region 1501 and the display region 1502 are provided on the display screen of the display apparatus 1. However, no λ/2 plate is attached to the emission surface of the display region 1502. The characteristics and arrangement of the polarization separator 101D and the polarization separator 101E in the optical system of FIG. 15B are the same as those of the optical system of FIG. 15A. In the optical system of FIG. 15A, the retroreflection plate 2D to which the λ/4 plate 21D is attached and the retroreflection plate 2E to which the λ/4 plate 21E is attached are arranged separately. In contrast, in the optical system of FIG. 15B, only one retroreflection plate 2 to which the λ/4 plate 21 is attached is arranged. In the optical system of FIG. 15B, the λ/2 plate 22 is arranged on the optical path from the polarization separator 101E to the polarization separator 101D.

Here, in the optical system of FIG. 15B, the optical characteristics of the optical path of video light and each optical element through which the video light of a specific polarized light (P-polarized light in the drawing) emitted from the display region 1501 forms the air floating video 3D are the same except that the retroreflection plate 2D to which the λ/4 plate 21D is attached is replaced with the retroreflection plate 2 to which the λ/4 plate 21 is attached, and thus the description thereof will be omitted.

Here, in the optical system of FIG. 15B, the specific polarized light (P-polarized light in the drawing) emitted from the display region 1502 travels toward the polarization separator 101E and enters the polarization separator 101E. The polarization separator 101E selectively transmits the specific polarized light (P-polarized light in the drawing) and reflects the other polarized light (S-polarized light in the drawing). Therefore, the video light traveling toward the polarization separator 101E passes through the polarization separator 101E and travels toward the retroreflection plate 2. The video light that has been retroreflected by the retroreflection plate 2 and travels again toward the polarization separator 101E is converted from the specific polarized light (P-polarized light in the drawing) into the other polarized light (S-polarized light in the drawing) by passing through the λ/4 plate 21 twice.

The video light that travels again toward the polarization separator 101E is the other polarized light (S-polarized light in the drawing), and is thus reflected by the polarization separator 101E and travels toward the λ/2 plate 22. The video light that has entered the λ/2 plate 22 is converted from the other polarized light (S-polarized light in the drawing) into the specific polarized light (P-polarized light in the drawing) by passing through the λ/2 plate 22. The video light that has passed through the λ/2 plate 22 travels toward the polarization separator 101D. The polarization separator 101D selectively transmits the specific polarized light (P-polarized light in the drawing) and reflects the other polarized light (S-polarized light in the drawing). Therefore, the video light from the λ/2 plate 22, which is the specific polarized light (P-polarized light in the drawing), passes through the polarization separator 101D and travels toward the position where the user should be. The video light that has passed through the polarization separator 101D forms the air floating video 3E.

In the example of FIG. 15B, a light-shielding plate is provided between the optical path of the video light output from the display region 1501 and the optical path of the video light output from the display region 1502 so as to prevent each video light from leaking into the optical path of the other video light.

In the example of FIG. 15B, the polarization separator 101D and the polarization separator 101E are both arranged with an inclination of 45 degrees with respect to the traveling direction of the video light from the display apparatus 1. As a result, the video light forming the air floating video 3D and the video light forming the air floating video 3E travel together in the same direction toward the position where the user should be.

For this configuration, in the example of FIG. 15B, the air floating video 3D, the air floating video 3E, the polarization separator 101D, the λ/2 plate 22, and the polarization separator 101E are arranged on the same straight line as viewed from the user (for example, in the example of FIG. 15B, the straight line of the optical path from the polarization separator 101E to the air floating video 3E or the straight line extending toward the user) when the user views the air floating video 3D and the air floating video 3E in the direction indicated by the arrow A (y direction). Also, in this case, the display apparatus 1 and the retroreflection plate 2 are arranged at positions deviated from the same straight line.

Further, in the example of FIG. 15B, installation positions of the polarization separator 101D and the polarization separator 101E are determined such that the center of the air floating video 3D in the left-right direction (x direction) and the center of the air floating video 3E in the left-right direction (x direction) coincide with each other when the user views the air floating video 3D and the air floating video 3E in the direction indicated by the arrow A (y direction). It is preferable that the center of the air floating video 3D in the left-right direction (x direction) and the center of the air floating video 3E in the left-right direction (x direction) coincide with each other as viewed from the user because the user can view the air floating videos more easily and the video content creator does not have to take the offset into consideration. In addition, this is preferable because the optical layout can be simplified.

In addition, in the polarization design optical system of FIG. 15B, the characteristics of P-polarized light and S-polarized light may be interchanged. Specifically, a specific polarized light of the video light emitted from the display region 1501 of the display apparatus 1 may be made S-polarized light, a specific polarized light of the video light emitted from the display region 1502 may be made S-polarized light, and the reflection characteristics of the polarization separator 101D and the polarization separator 101E may be interchanged between P-polarized light and S-polarized light. In this case, the P-polarized light and S-polarized light shown in the drawing are both reversed, but optical designs such as the optical path can be realized in exactly the same way.

In the optical system of FIG. 15B described above, the optical path length of the video light emitted from the display region 1501 to the position where the air floating video 3D is formed is the same as that in the optical system of FIG. 15A. Also, in the optical system of FIG. 15B, the optical path length of the video light emitted from the display region 1502 to the position where the air floating video 3E is formed is the same as that in the optical system of FIG. 15A. Therefore, the position where the air floating video 3D is formed and the position where the air floating video 3E is formed are also the same as those in the optical system of FIG. 15A.

Note that the example of FIG. 15B shows the case where the optical path length of the video light emitted from the display region 1501 to the position where the air floating video 3D is formed is also the same as the optical path length of the video light emitted from the display region 1502 to the position where the air floating video 3E is formed. The retroreflection plate 2D and the retroreflection plate 2E arranged separately in the optical system of FIG. 15A are composed of the single retroreflection plate 2 in the optical system of FIG. 15B. Since the retroreflection plates are components with high processing costs, the cost reduction can be achieved by configuring it as a single plate. Therefore, in the optical system of FIG. 15B, it is possible to realize the optical system configured to form air floating videos in two layers in depth at a lower cost than that in the optical system of FIG. 15A.

Figure 16A:
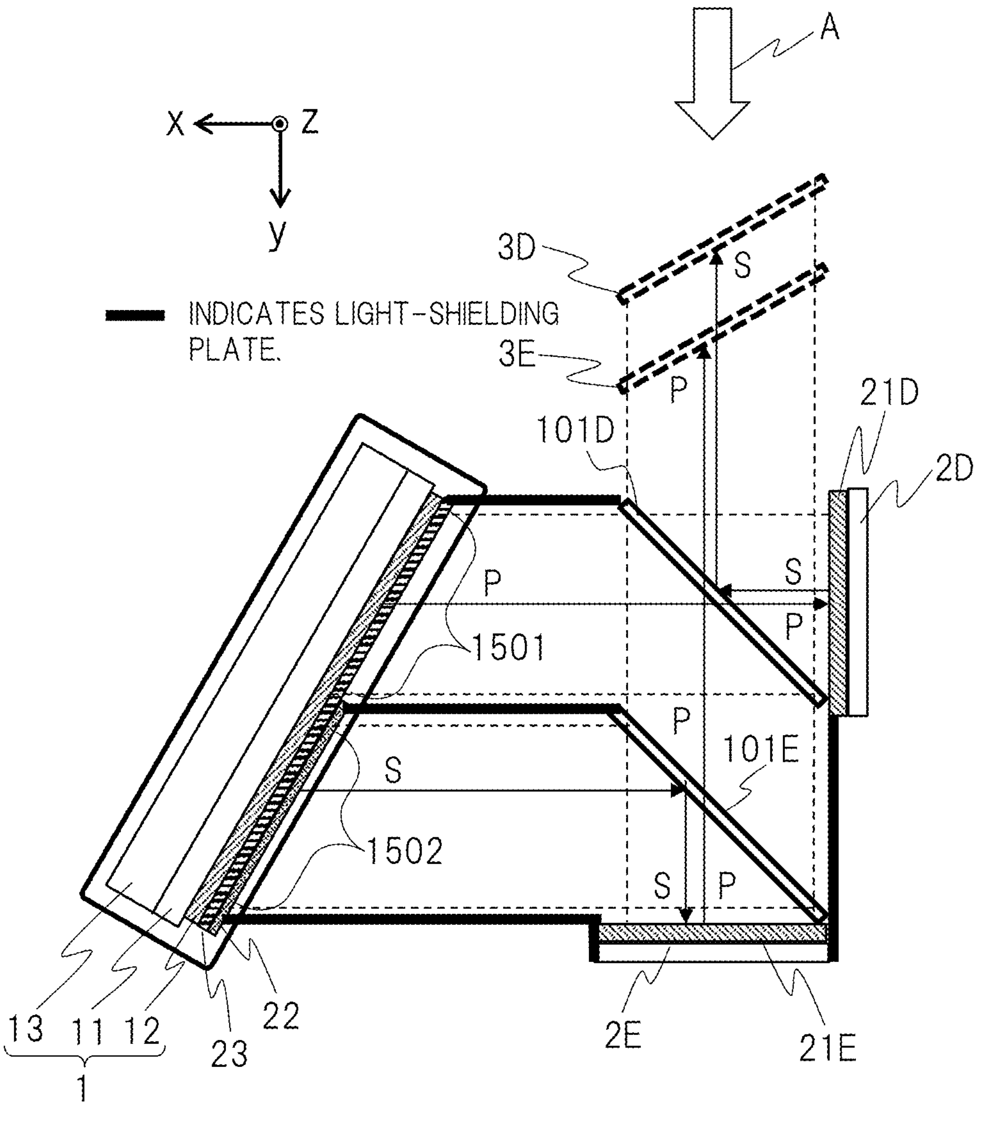
FIG. 16A is a diagram showing an example of a configuration of a main part and a configuration of a retroreflection portion of the air floating video display apparatus according to one embodiment of the present invention.

Next, another example of the optical system and optical path of the air floating video display apparatus configured to display air floating videos in multiple layers having different projection amounts from an optical system according to the third embodiment will be described with reference to FIG. 16A. The optical system of FIG. 16A is a modification in which a part of the configuration of the optical system of FIG. 15A is changed. Therefore, in the example of FIG. 16A, the differences from FIG. 15A will be described, and repetitive descriptions of the same configuration as that of FIG. 15A will be omitted.

In the optical system of FIG. 16A, the display apparatus 1 is arranged so as to be inclined around the position between the display region 1501 and the display region 1502 on the display screen of the display apparatus 1, relative to that in the arrangement of the optical system of FIG. 15A. In the example of the drawing, the display apparatus 1 is inclined at 30 degrees. In the example of the drawing, the length of the display screen of the display apparatus 1 is increased in accordance with the inclination. The inclination of the display apparatus 1 is set such that the optical path length of the video light emitted from the display region 1501 to the retroreflection plate 2D is shorter than that in the arrangement of the optical system of FIG. 15A. As a result, the air floating video 3D is formed on the far side as viewed from the user in comparison with that of the optical system of FIG. 15A. In addition, the inclination of the display apparatus 1 makes the optical path length of the video light emitted from the display region 1502 to the retroreflection plate 2E longer than that in the arrangement of the optical system of FIG. 15A. The air floating video 3E is formed on the near side as viewed from the user in comparison with that of the optical system of FIG. 15A.

Therefore, in the optical system of FIG. 16A, the distance in the depth direction between the air floating video 3D and the air floating video 3E in two layers can be made shorter than that in the optical system of FIG. 15A. More specifically, in the example of FIG. 16A, due to the inclination of the display apparatus 1, the optical path length of the video light emitted from the display region 1501 to the retroreflection plate 2D is shorter than the optical path length of the video light emitted from the display region 1502 to the retroreflection plate 2E. Note that, by arranging the display apparatus 1 so as to be inclined relative to that in the arrangement of the optical system of FIG. 15A, the air floating video 3D and the air floating video 3E formed in two layers are both arranged so as to be inclined relative to those in the arrangement of the optical system of FIG. 15A. When the inclination of the display apparatus 1 relative to that of the optical system of FIG. 15A is 30 degrees, the inclination of the air floating video 3D and the air floating video 3E in two layers is also 30 degrees.

Here, in the optical system of FIG. 16A, an angle control sheet 23 may be attached to the surface of the absorptive polarization plate 12 in accordance with the inclined arrangement of the display apparatus 1. The angle control sheet 23 is a sheet configured to control the light traveling direction to be shifted by a predetermined angle. Specifically, this can be realized by a linear Fresnel lens sheet. When the light intensity is strongest in the normal direction to the surface of the liquid crystal display panel 11 in the angular distribution of the video light from the liquid crystal display panel 11, the light utilization efficiency of the optical system can be improved by controlling the light traveling angle so as to offset the inclination of the display apparatus 1.

When the display apparatus 1 is inclined at 30 degrees, the angle control sheet 23 capable of changing the light traveling angle by 30 degrees may be used to offset the inclination. When using the angle control sheet 23, the λ/2 plate 22 may be attached to the surface of the angle control sheet 23 for the display region 1502. Note that the angle control sheet 23 may be used only when it is necessary to improve the light utilization efficiency of the optical system, and the optical system of FIG. 16A can be configured without using the angle control sheet 23.

In the optical system of FIG. 16A, details of the optical path of the video light and each optical element through which the video lights emitted from the display region 1501 and the display region 1502 form the air floating video 3D and the air floating video 3E are the same as those of the optical system of FIG. 15A, and repetitive descriptions thereof will be omitted.

In addition, in the polarization design of the optical system of FIG. 16A, the characteristics of P-polarized light and S-polarized light may be interchanged. Specifically, a specific polarized light of the video light emitted from the display region 1501 of the display apparatus 1 may be made S-polarized light, the other polarized light emitted from the display region 1502 of the display apparatus 1 and passing through the λ/2 plate 22 may be made P-polarized light, and the reflection characteristics of the polarization separator 101D and the polarization separator 101E may be interchanged between P-polarized light and S-polarized light. In this case, the P-polarized light and S-polarized light shown in the drawing are both reversed, but optical designs such as the optical path can be realized in exactly the same way.

Note that, in the example of FIG. 16A as well, the air floating video 3D, the air floating video 3E, the polarization separator 101D, the polarization separator 101E, and the retroreflection plate 2E are arranged on the same straight line as viewed from the user (for example, in the example of FIG. 16A, the straight line of the optical path from the retroreflection plate 2E to the air floating video 3E or the straight line extending toward the user) when the user views the air floating video 3D and the air floating video 3E in the direction indicated by the arrow A (y direction). Also, in this case, the display apparatus 1 and the retroreflection plate 2D are arranged at positions deviated from the same straight line.

By using the optical system of FIG. 16A described above, it is possible to realize the air floating video display apparatus in which the distance in the depth direction between the air floating videos in two layers is made shorter.

Figure 16B:
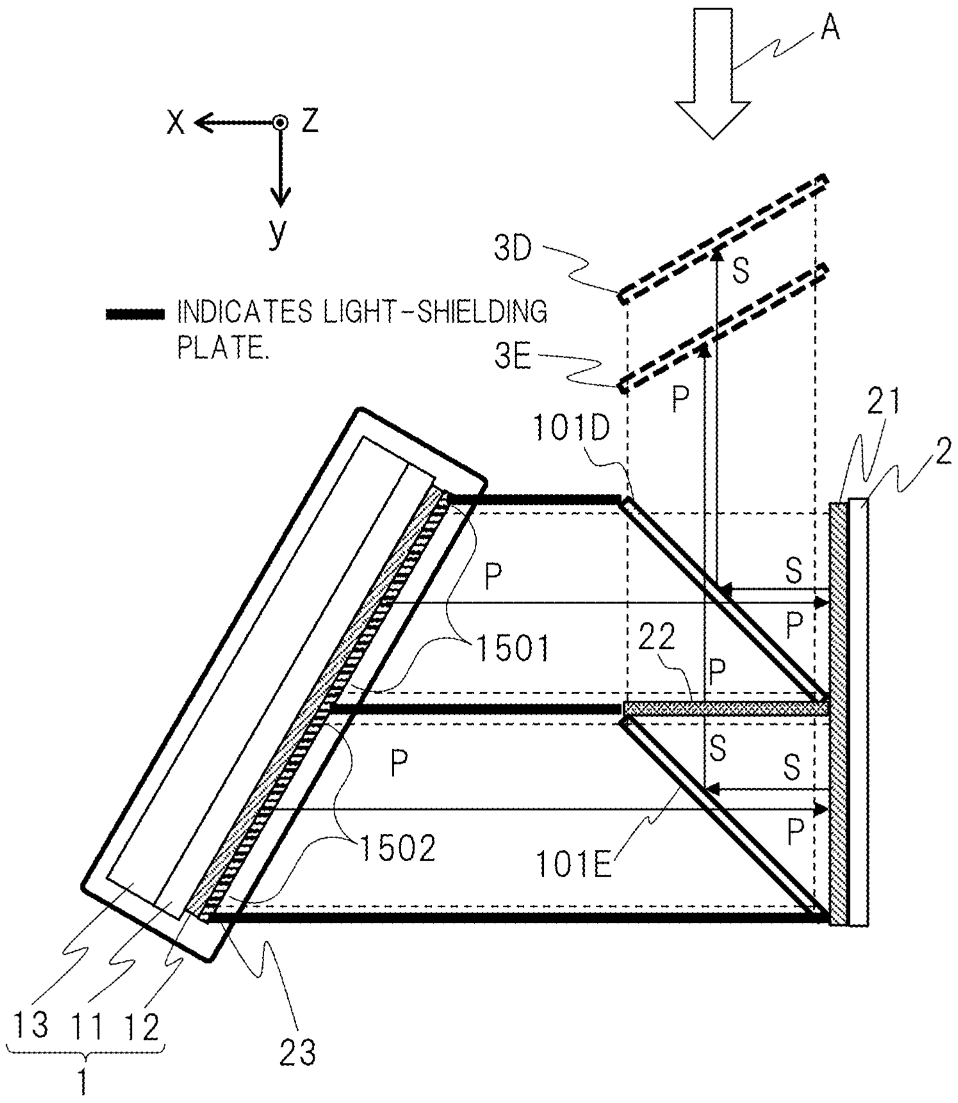
FIG. 16B is a diagram showing an example of a configuration of a main part and a configuration of a retroreflection portion of the air floating video display apparatus according to one embodiment of the present invention.

Next, another example of the optical system and optical path of the air floating video display apparatus configured to display air floating videos in multiple layers having different projection amounts from an optical system according to the third embodiment will be described with reference to FIG. 16B. The optical system of FIG. 16B is a modification in which a part of the configuration of the optical system of FIG. 15B is changed. Therefore, in the example of FIG. 16B, the differences from FIG. 15B will be described, and repetitive descriptions of the same configuration as that of FIG. 15B will be omitted.

In the optical system of FIG. 16B, the display apparatus 1 is arranged so as to be inclined around the position between the display region 1501 and the display region 1502 on the display screen of the display apparatus 1, relative to that in the arrangement of the optical system of FIG. 15B. In the example of the drawing, the display apparatus 1 is inclined at 30 degrees. In the example of the drawing, the length of the display screen of the display apparatus 1 is increased in accordance with the inclination. The inclination of the display apparatus 1 is set such that the optical path length of the video light emitted from the display region 1501 to the retroreflection plate 2 is shorter than that in the arrangement of the optical system of FIG. 15B. As a result, the air floating video 3D is formed on the far side as viewed from the user in comparison with that of the optical system of FIG. 15B. In addition, the inclination of the display apparatus 1 is determined such that the optical path length of the video light emitted from the display region 1502 to the retroreflection plate 2 becomes longer than that in the arrangement of the optical system of FIG. 15B. The air floating video 3E is formed on the near side as viewed from the user in comparison with that of the optical system of FIG. 15B.

Therefore, in the optical system of FIG. 16B, the distance in the depth direction between the air floating video 3D and the air floating video 3E in two layers can be made shorter than that in the optical system of FIG. 15B. More specifically, in the example of FIG. 16B, due to the inclination of the display apparatus 1, the optical path length of the video light emitted from the display region 1501 to the retroreflection plate 2 is shorter than the optical path length of the video light emitted from the display region 1502 to the retroreflection plate 2.

Note that, by arranging the display apparatus 1 so as to be inclined relative to that in the arrangement of the optical system of FIG. 15B, the air floating video 3D and the air floating video 3E formed in two layers are both arranged so as to be inclined relative to those in the arrangement of the optical system of FIG. 15B. When the inclination of the display apparatus 1 relative to that of the optical system of FIG. 15B is 30 degrees, the inclination of the air floating video 3D and the air floating video 3E in two layers is also 30 degrees.

Here, in the optical system of FIG. 16B, the angle control sheet 23 may be attached to the surface of the absorptive polarization plate 12 in accordance with the inclined arrangement of the display apparatus 1 as in the optical system of FIG. 16A. When the light intensity is strongest in the normal direction to the surface of the liquid crystal display panel 11 in the angular distribution of the video light from the liquid crystal display panel 11, the light utilization efficiency of the optical system can be improved by controlling the light traveling angle so as to offset the inclination of the display apparatus 1. When the display apparatus 1 is inclined at 30 degrees, the angle control sheet 23 capable of changing the light traveling angle by 30 degrees may be used to offset the inclination. Note that the angle control sheet 23 may be used only when it is necessary to improve the light utilization efficiency of the optical system, and the optical system of FIG. 16B can be configured without using the angle control sheet 23.

In the optical system of FIG. 16B, details of the optical path of the video light and each optical element through which the video lights emitted from the display region 1501 and the display region 1502 form the air floating video 3D and the air floating video 3E are the same as those of the optical system of FIG. 15B, and repetitive descriptions thereof will be omitted.

In addition, in the polarization design of the optical system of FIG. 16B, the characteristics of P-polarized light and S-polarized light may be interchanged. Specifically, a specific polarized light of the video light emitted from the display region 1501 of the display apparatus 1 may be made S-polarized light, a specific polarized light of the video light emitted from the display region 1502 may be made P-polarized light, and the reflection characteristics of the polarization separator 101D and the polarization separator 101E may be interchanged between P-polarized light and S-polarized light. In this case, the P-polarized light and S-polarized light shown in the drawing are both reversed, but optical designs such as the optical path can be realized in exactly the same way.

By using the optical system of FIG. 16B described above, it is possible to realize the air floating video display apparatus in which the distance in the depth direction between the air floating videos in two layers is made shorter.

Next, another example of the optical system and optical path of the air floating video display apparatus configured to display air floating videos in multiple layers having different projection amounts from an optical system according to the third embodiment will be described with reference to FIG. 17A.

Figure 17A:
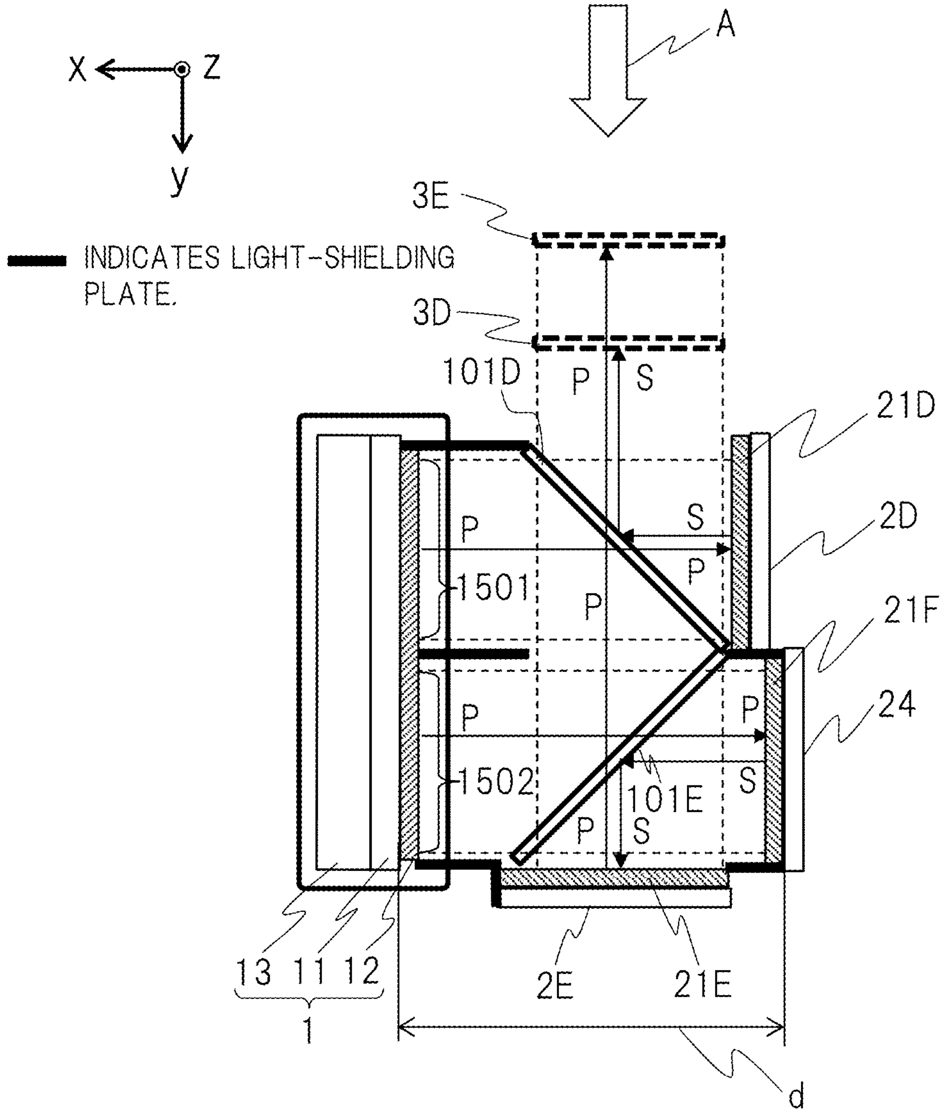
FIG. 17A is a diagram showing an example of a configuration of a main part and a configuration of a retroreflection portion of the air floating video display apparatus according to one embodiment of the present invention.

FIG. 17A shows a configuration example of an optical system and an example of an optical path in an air floating video display apparatus configured to display air floating videos in multiple layers. In the optical system of FIG. 17A, only one display apparatus 1 is provided as the display apparatus serving as a video source. In the example of FIG. 17A, two display regions of the display region 1501 and the display region 1502 are provided on the display screen of the display apparatus 1. The optical system of FIG. 17A displays the air floating video 3D corresponding to the display region 1501. The optical system of FIG. 17A displays the air floating video 3E corresponding to the display region 1502.

In the example of FIG. 17A, when a user views the air floating video 3D and the air floating video 3E in the direction indicated by the arrow A, the air floating video 3E appears to be displayed in front of the air floating video 3D. Since the air floating video 3E and the air floating video 3D appear to overlap as viewed from the user, these air floating videos are visually recognized as air floating videos in two layers in depth.

Next, the detailed configuration of the optical system in FIG. 17A will be described. Since the configuration of the display apparatus 1 is the same as that in the first embodiment, repetitive descriptions thereof will be omitted. First, a video light of specific polarized light (P-polarized light in the drawing) is output from the display apparatus 1. The video light of the specific polarized light (P-polarized light in the drawing) is output at any position in the display region 1501 and the display region 1502.

Here, the video light of the specific polarized light (P-polarized light in the drawing) output from the display region 1501 travels as shown in the drawing and enters the polarization separator 101D. The polarization separator 101D selectively transmits the specific polarized light (P-polarized light in the drawing) and reflects the other polarized light (S-polarized light in the drawing). Therefore, the video light of the specific polarized light (P-polarized light in the drawing) output from the display region 1501 passes through the polarization separator 101D and reaches the retroreflection plate 2D to which the λ/4 plate 21D is attached. The video light that has been retroreflected by the retroreflection plate 2D and travels again toward the polarization separator 101D is converted from the specific polarized light (P-polarized light in the drawing) at the time of emission from the display apparatus 1 into the other polarized light (S-polarized light in the drawing) by passing through the λ/4 plate 21D twice.

The video light that travels again toward the polarization separator 101D is the other polarized light (S-polarized light in the drawing), and is thus reflected by the polarization separator 101D toward the position where the user should be. The traveling direction of the video reflected by the polarization separator 101D is determined based on the angle at which the polarization separator 101D is arranged. In the example of FIG. 17A, the video light that travels toward the polarization separator 101D is reflected at a right angle by the polarization separator 101D and travels as shown in the drawing. The video light reflected by the polarization separator 101D forms the air floating video 3D.

Next, the video light of the specific polarized light (P-polarized light in the drawing) emitted from the display region 1501 travels as shown in the drawing and enters the polarization separator 101E. The polarization separator 101E selectively transmits a specific polarized light (P-polarized light in the drawing) and reflects the other polarized light (S-polarized light in the drawing). Therefore, the video light that travels toward the polarization separator 101E passes through the polarization separator 101E and travels toward a specular reflection plate 24 to which a λ/4 plate 21F is attached. The video light that has been specularly reflected by the specular reflection plate 24 and travels again toward the polarization separator 101E is converted from the specific polarized light (P-polarized light in the drawing) into the other polarized light (S-polarized light in the drawing) by passing through the λ/4 plate 21F twice.

The video light that travels again toward the polarization separator 101E is the other polarized light (S-polarized light in the drawing), and is thus reflected by the polarization separator 101E and reaches the retroreflection plate 2E to which the λ/4 plate 21E is attached. The traveling direction of the video reflected by the polarization separator 101E is determined based on the angle at which the polarization separator 101E is arranged. In the example of FIG. 17A, the video light that travels toward the polarization separator 101E is reflected at a right angle by the polarization separator 101E and travels as shown in the drawing. The video light that has been retroreflected by the retroreflection plate 2E and travels again toward the polarization separator 101E is converted from the other polarized light (S-polarized light in the drawing) into the specific polarized light (P-polarized light in the drawing) by passing through the λ/4 plate 21E twice.

The video light that travels again toward the polarization separator 101E is the specific polarized light (P-polarized light in the drawing), and thus passes through the polarization separator 101E. As shown in the drawing, the video light that has passed through the polarization separator 101E travels toward the polarization separator 101D. As described above, the polarization separator 101D selectively transmits the specific polarized light (P-polarized light in the drawing) and reflects the other polarized light (S-polarized light in the drawing). Therefore, the video light from the retroreflection plate 2E, which is the specific polarized light (P-polarized light in the drawing), passes through the polarization separator 101D and travels toward the position where the user should be. The video light that has passed through the polarization separator 101D forms the air floating video 3E.

In the example of FIG. 17A, a light-shielding plate is provided between the optical path of the video light output from the display region 1501 and the optical path of the video light output from the display region 1502 so as to prevent each video light from leaking into the optical path of the other video light.

In the example of FIG. 17A, the polarization separator 101D is arranged with an inclination of 45 degrees with respect to the traveling direction of the video light from the display apparatus 1. The polarization separator 101E is arranged in a direction different from that of the polarization separator 101D with an inclination of 45 degrees with respect to the traveling direction of the video light from the display apparatus 1.

As a result, the video light forming the air floating video 3E and the video light forming the air floating video 3D travel together in the same direction toward the position where the user should be. For this configuration, in the example of FIG. 17A, the air floating video 3E, the air floating video 3D, the polarization separator 101D, the polarization separator 101E, and the retroreflection plate 2E are arranged on the same straight line as viewed from the user (for example, in the example of FIG. 17A, the straight line of the optical path from the retroreflection plate 2E to the air floating video 3E or the straight line extending toward the user) when the user views the air floating video 3E and the air floating video 3D in the direction indicated by the arrow A (y direction).

Also, in this case, the display apparatus 1, the retroreflection plate 2D, and the specular reflection plate 24 are arranged at positions deviated from the same straight line. Further, in the example of FIG. 17A, installation positions of the polarization separator 101D and the polarization separator 101E are determined such that the center of the air floating video 3E in the left-right direction (x direction) and the center of the air floating video 3D in the left-right direction (x direction) coincide with each other when the user views the air floating video 3E and the air floating video 3D in the direction indicated by the arrow A (y direction).

It is preferable that the center of the air floating video 3E in the left-right direction (x direction) and the center of the air floating video 3D in the left-right direction (x direction) coincide with each other as viewed from the user because the user can view the air floating videos more easily and the video content creator does not have to take the offset into consideration. In addition, this is preferable because the optical layout can be simplified.

In addition, in the polarization design of the optical system of FIG. 17A, the characteristics of P-polarized light and S-polarized light may be interchanged. Specifically, a specific polarized light of the video light emitted from the display region 1501 of the display apparatus 1 may be made S-polarized light, a specific polarized light of the video light emitted from the display region 1502 of the display apparatus 1 may be made S-polarized light, and the reflection characteristics of the polarization separator 101D and the polarization separator 101E may be interchanged between P-polarized light and S-polarized light. In this case, the P-polarized light and S-polarized light shown in the drawing are both reversed, but optical designs such as the optical path can be realized in exactly the same way.

With the optical system of FIG. 17A described above, it is possible to realize an optical system configured to form the air floating videos in two layers in depth using one display apparatus. Note that a configuration in which separate display apparatuses are provided for the display region 1501 and the display region 1502 is also possible. However, a configuration in which a plurality of display apparatuses are provided requires more corresponding circuits, which may lead to the increase in cost. Therefore, if the air floating videos in two layers in depth can be formed using only one display apparatus as shown in FIG. 17A, it is possible to realize the optical system configured to form the air floating videos in two layers in depth at lower cost.

Here, the optical path length of the video light emitted from the display region 1501 of the display apparatus 1 to the position where the air floating video 3D is formed and the optical path length of the video light emitted from the display region 1501 of the display apparatus 1 to the position where the air floating video 3E is formed in the optical system of FIG. 17A will be described. These optical path lengths will be described using the optical path length of the light ray emitted in the normal direction from the center of the display region 1501 and the optical path length of the light ray emitted in the normal direction from the center of the display region 1502. The same applies to the following description.

First, in the optical system of FIG. 17A, the optical path length of the video light emitted from the display region 1501 of the display apparatus 1 to reach the polarization separator 101D is equal to the optical path length of the video light emitted from the display region 1502 of the display apparatus 1 to reach the polarization separator 101E. This is similar to those in the optical system of FIG. 15A and the optical system of FIG. 15B.

Here, in the optical system of FIG. 15A and the optical system of FIG. 15B, in order to ensure the sufficient projection amount from the optical system of the air floating video 3E formed by the video light emitted from the display region 1502 of the display apparatus 1, it is necessary to increase the optical path length of the video light emitted from the display region 1502 of the display apparatus 1 to the position where the air floating video 3E is formed, and as a result, it is necessary to ensure a relatively long distance from the display apparatus 1 to the polarization separators 101D and 101E.

In contrast, in the optical system of FIG. 17A, the polarization separator 101E is arranged so as to be shifted from the polarization separator 101D by 90 degrees, and an optical path going back and forth between the polarization separator 101E and the specular reflection plate 24 is added to the optical path of the video light emitted from the display region 1502 of the display apparatus 1 to the position where the air floating video 3E is formed. As a result, the optical path length of the video light emitted from the display region 1502 of the display apparatus 1 to the position where the air floating video 3E is formed in the optical system of FIG. 17A is longer than the optical path length of the video light emitted from the display region 1502 of the display apparatus 1 to the position where the air floating video 3E is formed in the optical system of FIG. 15A and the optical system of FIG. 15B.

Therefore, in the optical system of FIG. 17A, even when the distance from the display apparatus 1 to the polarization separators 101D and 101E is made shorter than that in the optical system of FIG. 15A and the optical system of FIG. 15B, it is possible to ensure a sufficient projection amount from the optical system of the air floating video 3E formed by the video light emitted from the display region 1502 of the display apparatus 1.

Here, in the optical system of FIG. 17A, the optical path length of the video light emitted from the display region 1502 of the display apparatus 1 to the position where the air floating video 3E is formed can be changed depending on the distance D between the specular reflection plate 24 and the display surface of the display apparatus 1. Therefore, in the air floating video display apparatus, the position of the specular reflection plate 24 may be determined such that the desired projection amount of the air floating video 3E is achieved. Furthermore, the distance between the air floating video 3E and the air floating video 3D will also change depending on this distance D. Therefore, in the air floating video display apparatus configured to display air floating videos in multiple layers having different projection amounts from an optical system, the position of the specular reflection plate 24 may be determined such that the distance between the air floating videos in multiple layers becomes the distance required for the product.

Here, as can be seen by the comparison with the optical system of FIG. 15A and the optical system of FIG. 15B, the volume of the optical system is smaller in the optical system of FIG. 17A because the distance from the display apparatus 1 to the polarization separator 101D and the polarization separator 101E can be made relatively short. Also, in the optical system of FIG. 17A, the distance between the air floating video 3E and the air floating video 3D can be set to be shorter than that in the optical system of FIG. 15A and the optical system of FIG. 15B depending on the position of the specular reflection plate 24. In other words, in the optical system of FIG. 17A, the optical system of the air floating video display apparatus configured to display air floating videos in multiple layers can be realized in a smaller size. Also, this is preferable because the air floating videos in multiple layers can be set at desired positions with a simple configuration.

When incorporating the optical system of FIG. 17A into an air floating video display apparatus, this can be realized by replacing the optical system in the air floating video display apparatus described in the first embodiment with the optical system of FIG. 17A. Specifically, the optical system of FIG. 17A may be replaced with the optical system of the air floating video display apparatus of FIG. 4E, FIG. 4F, FIG. 4G, FIG. 4K, or FIG. 4L.

In this case, the air floating video display apparatus configured to form the air floating videos in two layers in depth can be realized in each drawing. In particular, in FIG. 4K and FIG. 4L, the air floating videos in two layers in depth can be formed on a near side as viewed from the user of the transmissive self-luminous video display apparatus 1650. In this case, the videos in three layers at different depths including the air floating videos in two layers in depth and the video of the transmissive self-luminous video display apparatus 1650 can be formed so as to be visually recognized from the user.

Figure 17B:
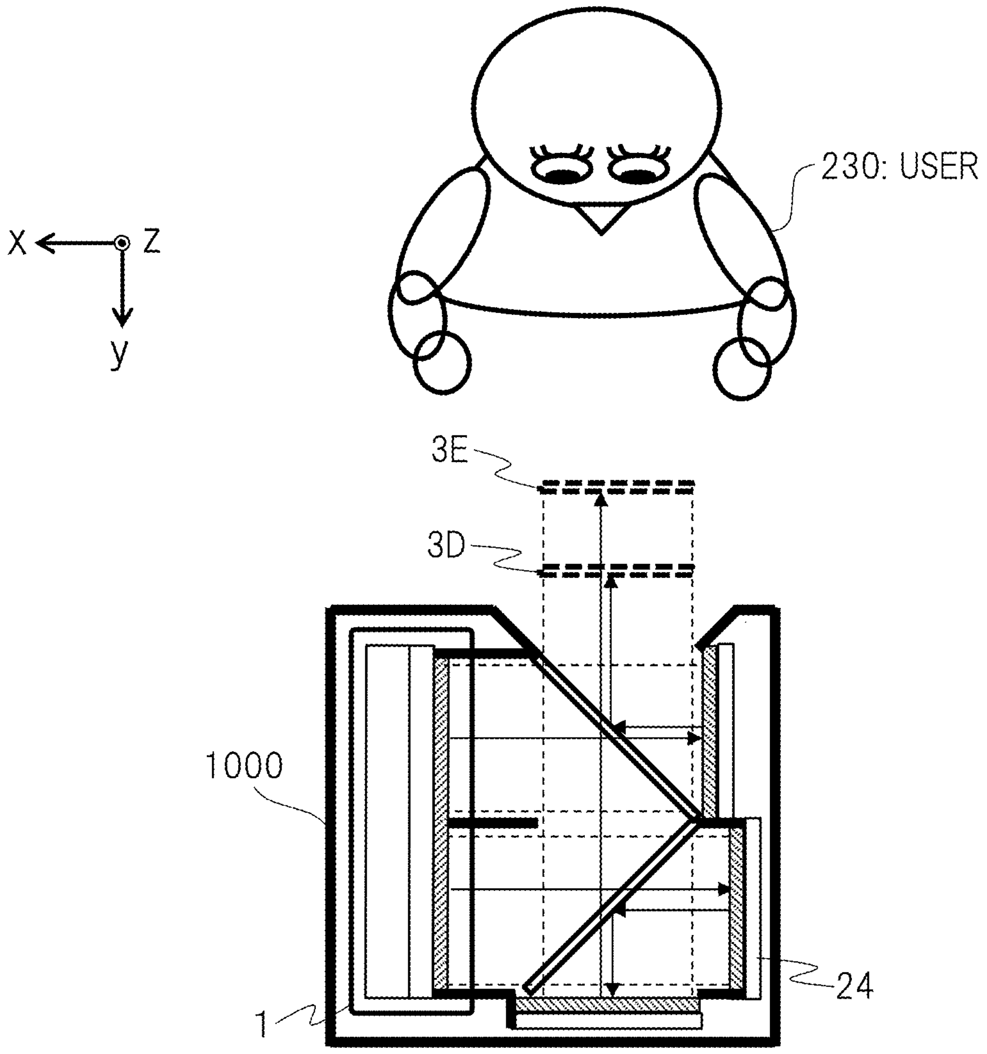
FIG. 17B is a diagram showing an example of a configuration of the air floating video display apparatus according to one embodiment of the present invention.

Next, an example of the air floating video display apparatus 1000 provided with the optical system of FIG. 17A will be described with reference to FIG. 17B. FIG. 17B shows an example of the configuration of the air floating video display apparatus 1000 configured to display air floating videos in multiple layers having different projection amounts. The optical system described in FIG. 17A is incorporated in the air floating video display apparatus 1000 shown in the drawing. In the example of FIG. 17B, the optical system is arranged such that the display apparatus 1 and the specular reflection plate 24 face each other in the left-right direction (x direction) of the user. In FIG. 17B, the reference characters of the other elements in the optical system of FIG. 17A are omitted. As shown in FIG. 17B, the air floating video display apparatus 1000 can display air floating videos in two layers such as the air floating video 3E and the air floating video 3D toward the user 230. In addition, since the optical system of FIG. 17A itself is relatively small, the air floating video display apparatus 1000 can also be realized in a relatively small size.

With the air floating video display apparatus 1000 of FIG. 17B described above, the air floating video display apparatus configured to display air floating videos in multiple layers having different projection amounts can be realized in a smaller size.

Next, another example of the air floating video display apparatus 1000 provided with the optical system of FIG. 17A will be described with reference to FIG. 17C.

Figure 17C:
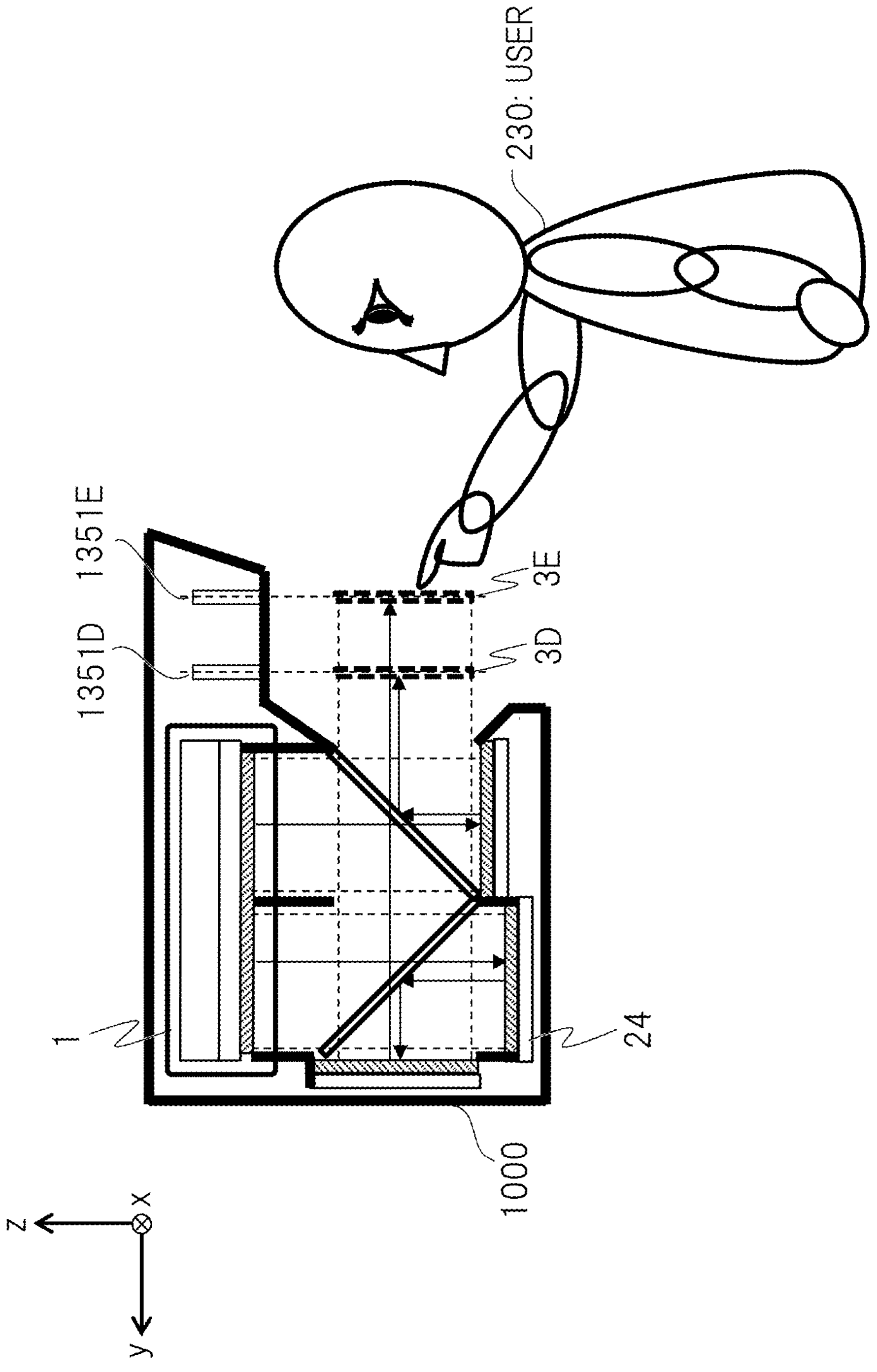
FIG. 17C is a diagram showing an example of a configuration of the air floating video display apparatus according to one embodiment of the present invention.

FIG. 17C shows an example of the configuration of the air floating video display apparatus 1000 configured to display air floating videos in multiple layers having different projection amounts. The optical system described in FIG. 17A is incorporated in the air floating video display apparatus 1000 shown in the drawing. In the example of FIG. 17C, the optical system is arranged such that the display apparatus 1 and the specular reflection plate 24 face each other in the up-down direction (z direction) as viewed from the user. In FIG. 17C, the reference characters of the other elements in the optical system of FIG. 17A are omitted.

As shown in FIG. 17C, the air floating video display apparatus 1000 can display air floating videos in two layers such as the air floating video 3E and the air floating video 3D toward the user 230. Here, in the example of FIG. 17C, aerial operation detection sensors may be provided such that user operations on each of the air floating video 3E and the air floating video 3D can be detected. Specifically, as shown in FIG. 17C, an aerial operation detection sensor 1351D for detecting the user operation on the air floating video 3D is provided. Also, an aerial operation detection sensor 1351E for detecting the user operation on the air floating video 3E is provided. For example, the aerial operation detection sensor 1351 in FIG. 3 may be replaced with these two sensors. The aerial operation detector 1350 in FIG. 3 may determine the presence or absence of the user operations on each of the air floating video 3E and the air floating video 3D based on signals from these sensors.

Here, when the user 230 is to operate the air floating video 3E displayed on the near side as viewed from the user with the finger, the user's finger will touch the air floating video 3E, but it is not necessary to touch the air floating video 3D. Therefore, when an operation input signal is not detected by the aerial operation detection sensor 1351D for detecting the user operation on the air floating video 3D, but an operation input signal is detected by the aerial operation detection sensor 1351E for detecting the user operation on the air floating video 3E, the aerial operation detector 1350 may determine that "the user is performing a user operation on the air floating video 3E."

In contrast, when the user 230 is to operate the air floating video 3D displayed on the far side as viewed from the user with the finger, the user's finger will touch the air floating video 3D, and there is a high possibility that the user's finger or arm will touch the air floating video 3E because the air floating video 3E is present on the near side.

Therefore, even when an operation input signal is detected by the aerial operation detection sensor 1351E, if an operation input signal is detected by the aerial operation detection sensor 1351D for detecting the user operation on the air floating video 3D, the aerial operation detector 1350 may determine that "the user is performing a user operation on the air floating video 3D." In this case, the operation input signal detected by the aerial operation detection sensor 1351E may be ignored.

Note that the configuration in which operational icons are simultaneously displayed on each of optical images in two layers having different depths by shifting the position of an operational icon in the x-z direction displayed on the air floating video 3E and the position of an operational icon in the x-z direction displayed on the air floating video 3D is also possible. In such a case, it is not always indispensable to perform the process of ignoring the operation input signal detected by the aerial operation detection sensor 1351E described above.

With the air floating video display apparatus 1000 of FIG. 17C described above, the air floating video display apparatus configured to display air floating videos in multiple layers having different projection amounts can be realized in a smaller size. Furthermore, with the air floating video display apparatus 1000 of FIG. 17C, it is possible to properly detect the user operations on each of the different air floating videos in multiple layers.

Next, another example of the air floating video display apparatus 1000 provided with the optical system of FIG. 17A will be described with reference to FIG. 17D.

Figure 17D:
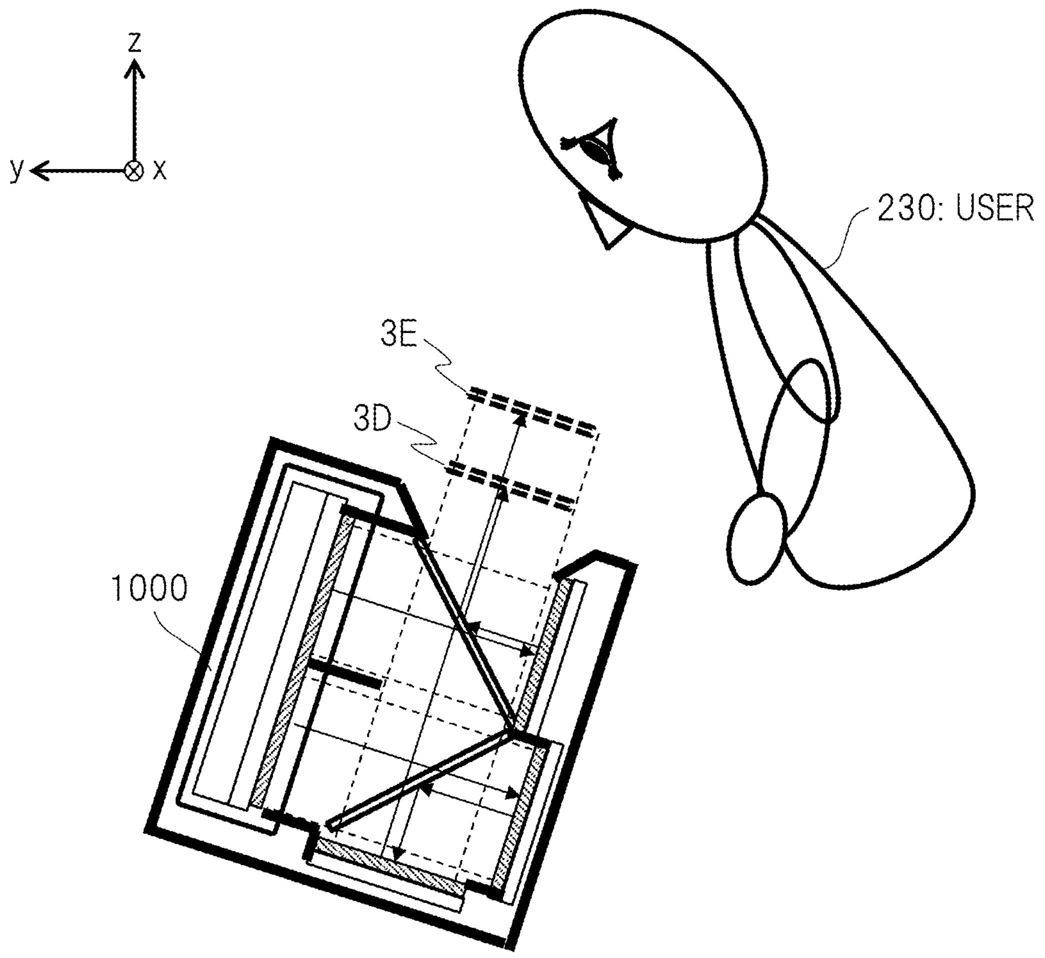
FIG. 17D is a diagram showing an example of a configuration of the air floating video display apparatus according to one embodiment of the present invention.

FIG. 17D shows an example of the configuration of the air floating video display apparatus 1000 configured to display air floating videos in multiple layers having different projection amounts. The optical system described in FIG. 17A is incorporated in the air floating video display apparatus 1000 shown in the drawing. In the example of FIG. 17D, the optical system is arranged such that the display apparatus and the specular reflection plate 24 face each other in the depth direction (y direction) as viewed from the user and the air floating video projects obliquely relative to the z direction corresponding to the vertical direction toward the user. In FIG. 17D, the reference characters of the other elements in the optical system of FIG. 17A are omitted. As shown in FIG. 17D, the air floating video display apparatus 1000 can display air floating videos in two layers such as the air floating video 3E and the air floating video 3D toward the user 230.

With the air floating video display apparatus 1000 of FIG. 17D, the air floating video display apparatus configured to display air floating videos in multiple layers having different projection amounts and used in a manner of the user looking down from the above can be realized.

Figure 18A:
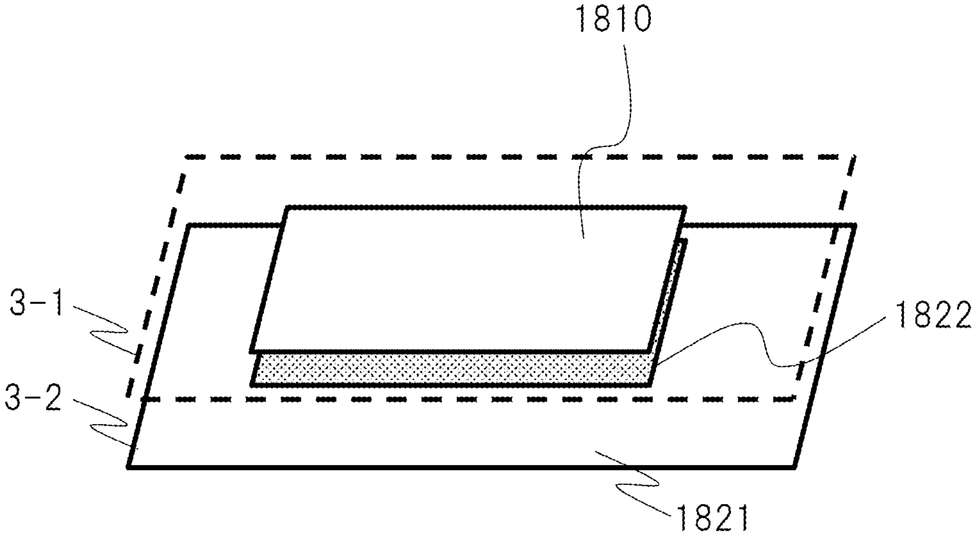
FIG. 18A is a diagram showing a display example of the air floating video display apparatus according to one embodiment of the present invention.

Next, a display example in an air floating video display apparatus configured to display air floating videos in multiple layers having different projection amounts will be described with reference to FIG. 18A. In FIG. 18A, an air floating video 3-1 and an air floating video 3-2 are air floating videos in multiple layers having different projection amounts. For the simplification of description, illustration of the hardware of the air floating video display apparatus itself will be omitted.

The air floating video 3-1 is displayed on the near side relative to the air floating video 3-2 as viewed from the user. The air floating video 3-2 is displayed on the far side relative to the air floating video 3-1 as viewed from the user. A display object 1810 is an object displayed in the display video of the air floating video 3-1. A display object 1821 is an object displayed in the display video of the air floating video 3-2. For example, if the air floating video display apparatus that performs the display of FIG. 18A is the air floating video display apparatus with the arrangement shown in FIG. 17D, multiple layers having different projection amounts will be displayed so as to overlap in a direction close to the vertical direction. Therefore, in the display example of FIG. 18A, a virtual shadow 1822 that appears to be caused by the display object 1810 of the air floating video 3-1 displayed on the near side relative to the air floating video 3-2 as viewed from the user is displayed in the display object 1821 of the air floating video 3-2 displayed on the far side relative to the air floating video 3-1 as viewed from the user. Here, as the virtual shadow, black display may be performed in the corresponding part, or the brightness of the video signal of the corresponding part may be reduced. Alternatively, the saturation of the video signal of the corresponding part may be reduced. These processes may be performed by the video controller 1160 in FIG. 3 or the like.

As shown in FIG. 18A, by displaying the virtual shadow of an object displayed in an air floating video on an object displayed in another air floating video at a different depth, it becomes easier to visually recognize the depth relationship between the two air floating videos, both of which are air floating videos, and the sense of reality of the air floating videos felt by the user can be improved more appropriately.

Also, as shown in FIG. 18A, when a display object is displayed in each of a plurality of air floating videos having different depths as viewed from the user, the display object 1810 of the air floating video 3-1 displayed on the near side as viewed from the user may be displayed brighter than the display object 1821 of the air floating video 3-2 displayed on the far side as viewed from the user. In this case, the brightness may be changed optically, or the brightness may be changed by video signal processing. By displaying in this way, even if a display object on the near side as viewed from the user and a display object on the far side as viewed from the user overlap, the display object on the near side that appears bright to the user is more easily recognized, and the display object on the far side that appears dark to the user is less easily recognized, thereby generating a pseudo-occlusion. By making the user recognize such a pseudo-occlusion between the objects in a plurality of air floating videos having different depths, the sense of reality of the air floating videos felt by the user can be improved more appropriately.

The display example of FIG. 18A described above can be used in, for example, the air floating video display apparatus provided with any of the optical systems shown in FIG. 15A to FIG. 17A.

With the display example shown in FIG. 18A described above, in an air floating video display apparatus configured to display air floating videos in multiple layers having different projection amounts, the sense of reality of the air floating videos felt by the user can be improved more appropriately.

Figure 18B:
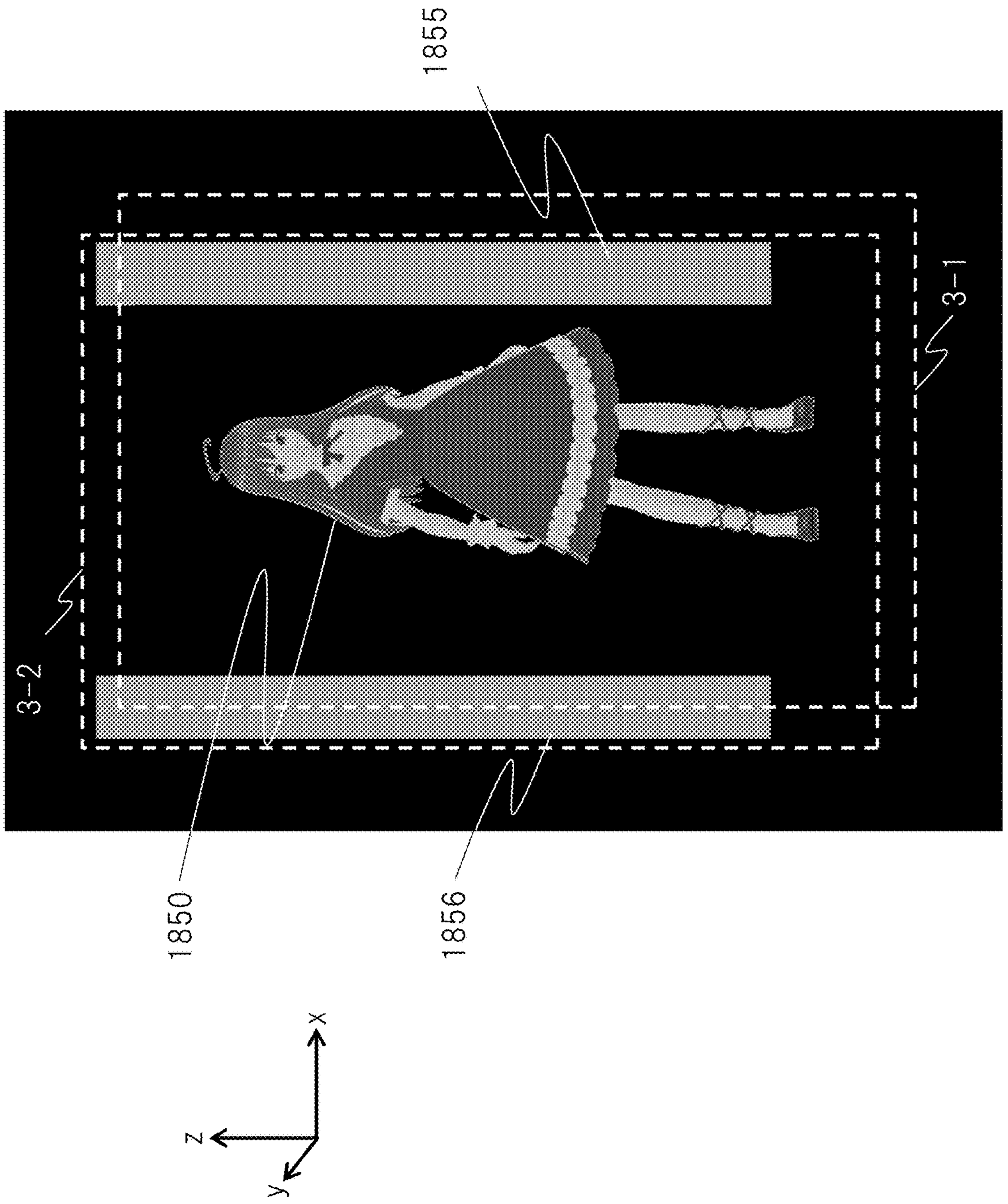
FIG. 18B is a diagram showing a display example of the air floating video display apparatus according to one embodiment of the present invention.

Next, a display example in an air floating video display apparatus configured to display air floating videos in multiple layers having different projection amounts will be described with reference to FIG. 18B. The air floating video 3-1 and the air floating video 3-2 shown in FIG. 18B are air floating videos in multiple layers having different projection amounts. It is the air floating video 3-1 that is displayed on the near side as viewed from the user, and it is the air floating video 3-2 that is displayed on the far side as viewed from the user. The display example of FIG. 18B can be used in, for example, the air floating video display apparatus provided with any of the optical systems shown in FIG. 15A to FIG. 17A. The display example of FIG. 18B can be used in, for example, any of the air floating video display apparatuses shown in FIG. 17B to FIG. 17D. For example, when the display example of FIG. 18B is applied to the air floating video display apparatus 1000 of FIG. 17B, the air floating video 3-1 corresponds to the air floating video 3E of FIG. 17B, and the air floating video 3-2 corresponds to the air floating video 3D of FIG. 17B.

In FIG. 18B, a display object 1850 is the object displayed in the display video of the air floating video 3-1. In the example of FIG. 18B, the display object 1850 is a display object of a character. In the example of FIG. 18B, the character is a human character. A display object 1855 and a display object 1856 are objects displayed in the display video of the air floating video 3-2. In the example of FIG. 18B, the display object 1855 and the display object 1856 are background objects. In the example of FIG. 18B, the background is a pillar.

In other words, in FIG. 18B, the display object of the character is arranged near the center of the air floating video 3-1, which serves as foreground, in the left-right direction, and the display object 1855 and the display 1856 which are background objects are arranged at the left and right positions away from the center in the air floating video 3-2 which serves as background. In this display example, the main content of the display content (the content desired to attract attention from the user) is the display object 1850 which is the display object of the character. The display object 1855 and the display object 1856 are secondary contents, and are displayed so as to allow the user to more appropriately recognize the display object 1850 which is the main content.

The advantages of such an object display layout will be described using the air floating video display apparatus configured to display air floating videos in multiple layers having different projection amounts. For example, when a display object of a character is displayed in the air floating video in the case of an air floating video display apparatus configured to display an air floating video in a single layer, since there are no objects serving as reference for depth in front of or behind the display object of the character, it may not be easy for the user to recognize the depth of the display position of the air floating video. In contrast, in the display example of FIG. 18B, using the air floating video display apparatus configured to display air floating videos in multiple layers having different projection amounts, the display object 1850 of the character is displayed near the center of the air floating video 3-1 in the left-right direction, and the display object 1855 of the pillar and the display object 1856 of the pillar which are background objects are arranged at the left and right positions in the air floating video 3-2 which serves as background.

At this time, since there is a difference in depth between the air floating video 3-1 and the air floating video 3-2, when the user moves his/her head to change the viewpoint, due to the principle of motion parallax, the distance in the left-right direction and the relative position of the display object 1855 of the pillar and the display object 1856 of the pillar change with respect to the display object of the character displayed at the center in the left-right direction. This allows the user to more clearly recognize that the display object of the character displayed at the center of the air floating video 3-1 in the left-right direction is located on the near side relative to the display object 1855 of the pillar and the display object 1856 of the pillar displayed at the left and right positions in the air floating video 3-2. Here, the two air floating videos such as the air floating video 3-1 and the air floating video 3-2 are visually recognized as overlapping from the user, depending on the relationship of the display ranges thereof. In this case, if the air floating video 3-2 which is on the far side as viewed from the user is bright and the air floating video 3-1 which is on the near side as viewed from the user is dark, the display video of the air floating video 3-2 which is on the far side as viewed from the user may penetrate the display video of the air floating video 3-1 which is on the near side as viewed from the user, and the user may not be able to properly recognize the front-to-back positional relationship of the display objects.

In view of this, video processing to adjust the brightness may be performed such that the display object region of the air floating video 3-1 which is on the near side as viewed from the user becomes brighter overall and the display object region of the air floating video 3-2 which is on the far side as viewed from the user becomes darker overall. However, depending on the character design of the display object displayed in the air floating video 3-1, there are cases in which it is not possible to increase the overall brightness of the display object region. For example, this may be the case when the character's costume is dark gray. In the case of a character with such a dark design, it is desirable that the display object of the air floating video 3-2 which is on the far side as viewed from the user is not visually recognized as overlapping with the display object of the character in the air floating video 3-1 which is on the near side as viewed from the user.

Thus, as shown in FIG. 18B, the display object of the character is arranged near the center of the air floating video 3-1, which serves as foreground, in the left-right direction, and the display object 1855 and the display object 1856 which are background objects are arranged at the left and right positions in the air floating video 3-2, which serves as background, away from the center in the left-right direction which is the position of the display object of the character in the air floating video 3-1, whereby characters and background objects can be displayed so as not to overlap as viewed from the user even when characters with various character designs are displayed. Furthermore, because of the effect of motion parallax described above, the display position of the display object 1850 of the character, which is the main content, in the depth direction can be recognized more clearly, and the user's recognition in the depth direction can be maintained more properly.

Note that the motion parallax in the display example of FIG. 18B described above is a motion parallax that occurs based on the actual spatial positions of the air floating video 3-1 and the air floating video 3-2 which are real images, and is not a pseudo motion parallax. This is different from the technique that generates a pseudo motion parallax by image processing based on the user's viewpoint position. The technique shown in the display example of FIG. 18B does not require video processing based on the user's viewpoint position, and the amount of processing can be relatively reduced. Also, although the technique that requires image processing based on the user's viewpoint position often cannot easily cope with simultaneous viewing by a plurality of people, the technique shown in the display example of FIG. 18B does not require video processing based on the user's viewpoint position, and it is thus possible to obtain a more favorable motion parallax effect for each user even in the case of the viewing of a plurality of different users from different angles.

Figure 18C:
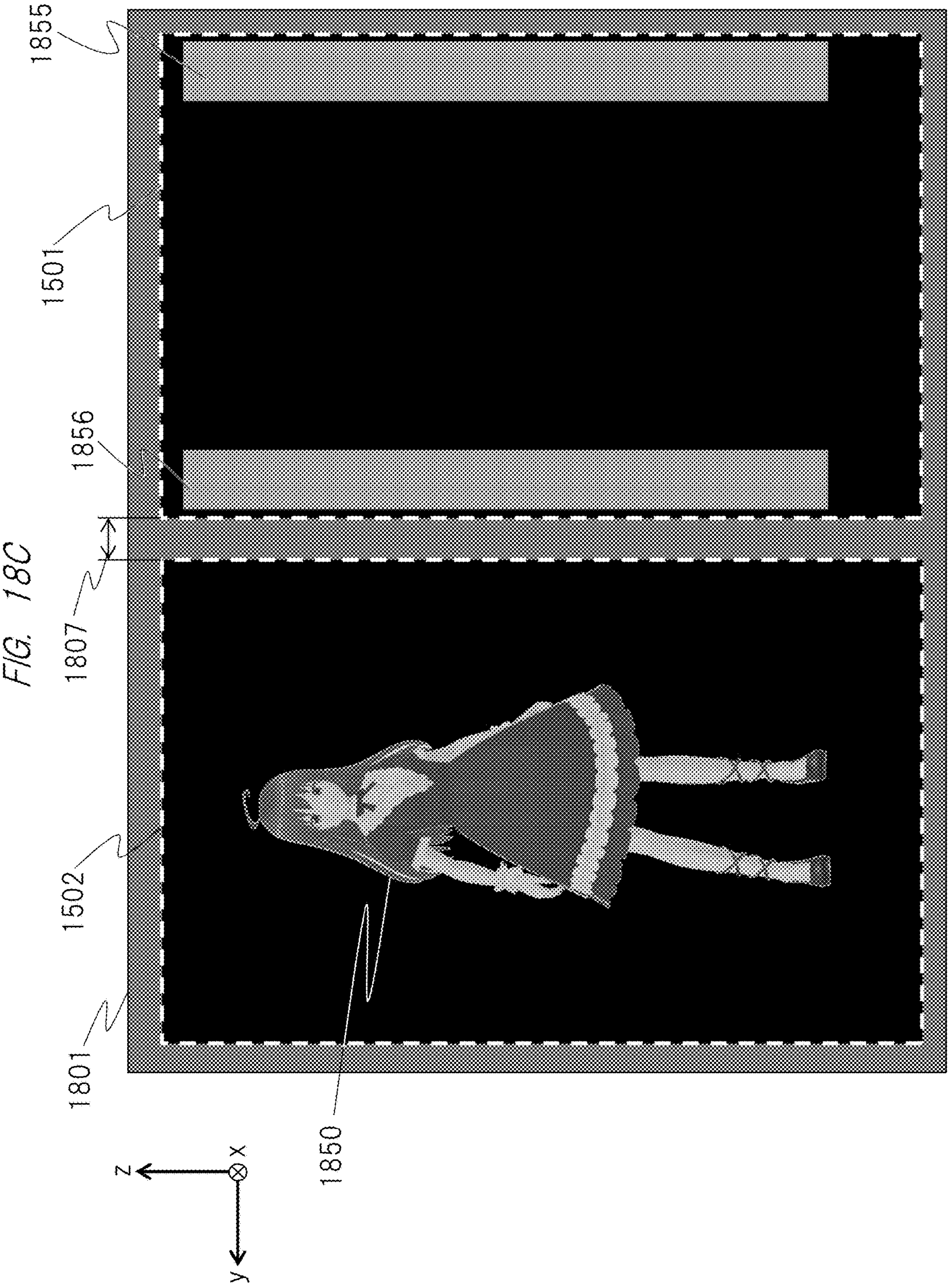
FIG. 18C is a diagram showing a display example of the air floating video display apparatus according to one embodiment of the present invention.

Next, an example of the display videos of the display apparatus 1 which are the original videos of the air floating video 3-1 and the air floating video 3-2 described in FIG. 18B will be described with reference to FIG. 18C. FIG. 18C shows an example of the display video of the display apparatus 1 when the display example of FIG. 18B is displayed using the air floating video display apparatus 1000 of FIG. 17B provided with the optical system of FIG. 17A. A display screen 1801 of the display apparatus 1 includes the display region 1501 and the display region 1502. In the air floating video display apparatus 1000 of FIG. 17B, the display video of the display region 1502 of the display apparatus 1 is displayed in the air as the air floating video 3E, and this corresponds to the air floating video 3-1 of FIG. 18B.

In the air floating video display apparatus 1000 of FIG. 17B, the display video of the display region 1501 of the display apparatus 1 is displayed in the air as the air floating video 3D, and this corresponds to the air floating video 3-2 of FIG. 18B. The display video of the display region 1502 displayed in the air floating video 3-1 of FIG. 18B is displayed on the near side of the user relative to the display video of the display region 1501 displayed in the air floating video 3-2 of FIG. 18B. Note that, when the optical system of FIG. 15A to FIG. 16B is used, the front-to-back relationship of the air floating video 3D and the air floating video 3E in the depth direction as viewed from the user is reversed, and thus the display video of the display region 1501 is displayed in the air on the near side relative to the display video of the display region 1502.

As shown in FIG. 18C, in the air floating video display apparatus 1000 according to this embodiment, it is possible to display video sources of two videos which are displayed at different depth positions in the air, by single hardware, that is, the display apparatus 1. The videos are displayed in the display region 1501 and the display region 1502 of the display apparatus 1, respectively, but the images of each frame of the two videos are stored in the state of being included in one single image in the frame memory of the display apparatus 1. Therefore, as compared with a configuration in which different display apparatuses are used to display the two videos, the configuration of this embodiment is more favorable because it is not necessary to realize the synchronization of the two videos by providing a complex synchronization system. As compared with a configuration in which different display apparatuses are used to display the two videos, the configuration of this embodiment can be realized at lower cost because it is not necessary to provide two systems of hardware for various processes such as display memory.

Here, in the example of the display video of the display apparatus 1 of FIG. 18C, a gap 1807 is provided between the display region 1501 and the display region 1502. In the region of this gap 1807, the display apparatus 1 fixes the video to black display. The reason for this will be described below. As described above, in any of the optical systems in FIG. 15A to FIG. 17A, a light-shielding plate is provided between the display region 1501 and the display region 1502 on the emission surface of the display screen of the display apparatus 1. The light-shielding plate is provided to prevent the video light emitted from the display region 1501 and the video light emitted from the display region 1502 from mixing in each other's optical paths as much as possible.

Furthermore, it is desirable that the gap 1807 is provided between the display region 1501 and the display region 1502 and the width of the gap 1807 is made larger than the thickness of the light-shielding plate provided between the display region 1501 and the display region 1502 on the emission surface of the display screen of the display apparatus 1. In this way, it is possible to prevent the vignetting of the video light emitted from the display region 1501 and the video light emitted from the display region 1502 by the light-shielding plate, and to prevent the video lights from mixing in each other's optical paths as much as possible. Note that, although the video in the region of the gap 1807 has been described as being fixed to black display, it may also be expressed as a content non-display region in which no content is displayed.

Here, a first processing example for the process to realize the display example of FIG. 18C will be described using the configuration of the air floating video display apparatus 1000 of FIG. 3. The first processing example is an example in which the video to be displayed in the display region 1501 and the video to be displayed in the display region 1502 are each reproduced and displayed from the storage 1170.

Specifically, the content including video information of the character of the display object 1850 and background video information of the display object 1855 and the display object 1856 which are background objects is stored in the storage 1170 in advance, and the video controller 1160 reproduces the video information of the character of the display object 1850 and arranges the reproduced video information at a position corresponding to the display region 1502 of the display apparatus 1 of FIG. 18C. The video controller 1160 may further perform the control of reproducing the background video information including the display object 1855 and the display object 1856 stored in the storage 1170 and displaying it in the display region 1501 of the display apparatus 1 of FIG. 18C.

Also, a second processing example for the process to realize the display example of FIG. 18C will be described using the configuration of the air floating video display apparatus 1000 of FIG. 3. The second processing example is an example in which a content creator, who comprehends the layout of the entire screen of the display screen 1801 of the display apparatus 1 and the display regions 1501 and 1502 shown in FIG. 18C, creates video content corresponding to the display screen 1801 including the display region 1501 and the display region 1502 in advance and stores the content in the storage 1170, and the video controller 1160 controls to reproduce the video of the content and display it on the entire screen of the display screen 1801 of the display apparatus 1.

The video of the video content has the content corresponding to the display screen 1801, includes a video of the display object 1850 which is a character at a position corresponding to the display region 1502, and includes videos of the display object 1855 and the display object 1856 which are background objects at positions corresponding to the display region 1501. Since the video of the content already corresponds to the layout of the entire screen of the display screen 1801 and the display regions 1501 and 1502 of FIG. 18C when stored in the storage 1170, the video controller 1160 only needs to control to reproduce the video of the content and display it on the entire screen of the display screen 1801 of the display apparatus 1, and it is not always necessary to perform complex image superimposing processing when displaying the content, making it possible to reduce the processing amount.

Also, a third processing example for the process to realize the display example of FIG. 18C will be described using the configuration of the air floating video display apparatus 1000 of FIG. 3. In the third processing example, a content creator, who comprehends the layout of the entire screen of the display screen 1801 of the display apparatus 1 and the display regions 1501 and 1502 shown in FIG. 18C, creates video content corresponding to the display screen 1801 including the display region 1501 and the display region 1502 in advance and stores the content in an external device different from the air floating video display apparatus 1000.

The external device and the air floating video display apparatus 1000 are connected such that a video output signal from the external device can be input from the video signal input unit 1131 of the air floating video display apparatus 1000 in FIG. 3. The external device outputs a video signal of the video content corresponding to the display screen 1801 including the display region 1501 and the display region 1502, and inputs it to the video signal input unit 1131 of the air floating video display apparatus 1000. The video controller 1160 controls to reproduce the video signal of the video content input to the video signal input unit 1131 and display it on the display screen 1801 of the display apparatus 1.

The content of the video content is similar to that of the second processing example for the process to realize the display example of FIG. 18C, and thus repetitive descriptions thereof will be omitted. Since the video of the content already corresponds to the layout of the entire screen of the display screen 1801 and the display regions 1501 and 1502 of FIG. 18C when input to the video signal input unit 1131, the video controller 1160 only needs to control to reproduce the video of the content and display it on the entire screen of the display screen 1801 of the display apparatus 1, and it is not always necessary to perform complex image superimposing processing when displaying the content, making it possible to reduce the processing amount.

Furthermore, a fourth processing example for the process to realize the display example of FIG. 18C will be described using the configuration of the air floating video display apparatus 1000 of FIG. 3. The fourth processing example is an example in which a video generation program is used to generate the video to be displayed in the display region 1501 and the video to be displayed in the display region 1502 by rendering them from a 3D model.

Specifically, first, the video generation program capable of generating a rendering video of a 3D model of the character corresponding to the display object 1850 and generating a rendering video of a 3D model of the background objects corresponding to the display object 1855 and the display object 1856 is stored in the storage 1170 in advance. The controller 1110 reads out the video generation program from the storage 1170 and deploys it in the memory 1109. The controller 1110 executes the video generation program deployed in the memory 1109, and the video generation program generates the video of the display object 1850 by rendering the 3D model of the character.

The video controller 1160 controls to display the generated video of the display object 1850 in the display region 1502 of FIG. 18C. In parallel, the video generation program generates the videos of the display object 1855 and the display object 1856 by rendering the 3D model of the background objects. The video controller 1160 may control to display the generated videos of the display object 1855 and the display object 1856 in the display region 1501 of FIG. 18C.

In the example of FIG. 18B, the character which is the main content is a human character, but it may also be an animal character or a robot character. It may also be a character related to a so-called avatar used in a virtual space. Here, the display object 1850 may be a character video rendered from a 3D model. Alternatively, a 2D animation character may be used. Alternatively, a live-action video of a human or the like may be used as the character video.

Further, in the example of FIG. 18B, the display object 1855 and the display object 1856 which are the secondary contents are objects indicating pillars, but they may be virtual frame objects or furniture equipment objects that are arranged in the space in which the character which is the main content is to exist. Any object is possible as long as it is a background object located behind the character in the space in which the character is to exist.

According to the display examples of FIG. 18B and FIG. 18C described above, in the air floating video display apparatus configured to display air floating videos in multiple layers having different projection amounts, the display position of the display object of the character or the like which is the main content in the depth direction can be recognized more clearly, and the user's recognition in the depth direction can be maintained more properly.

Figure 18D:
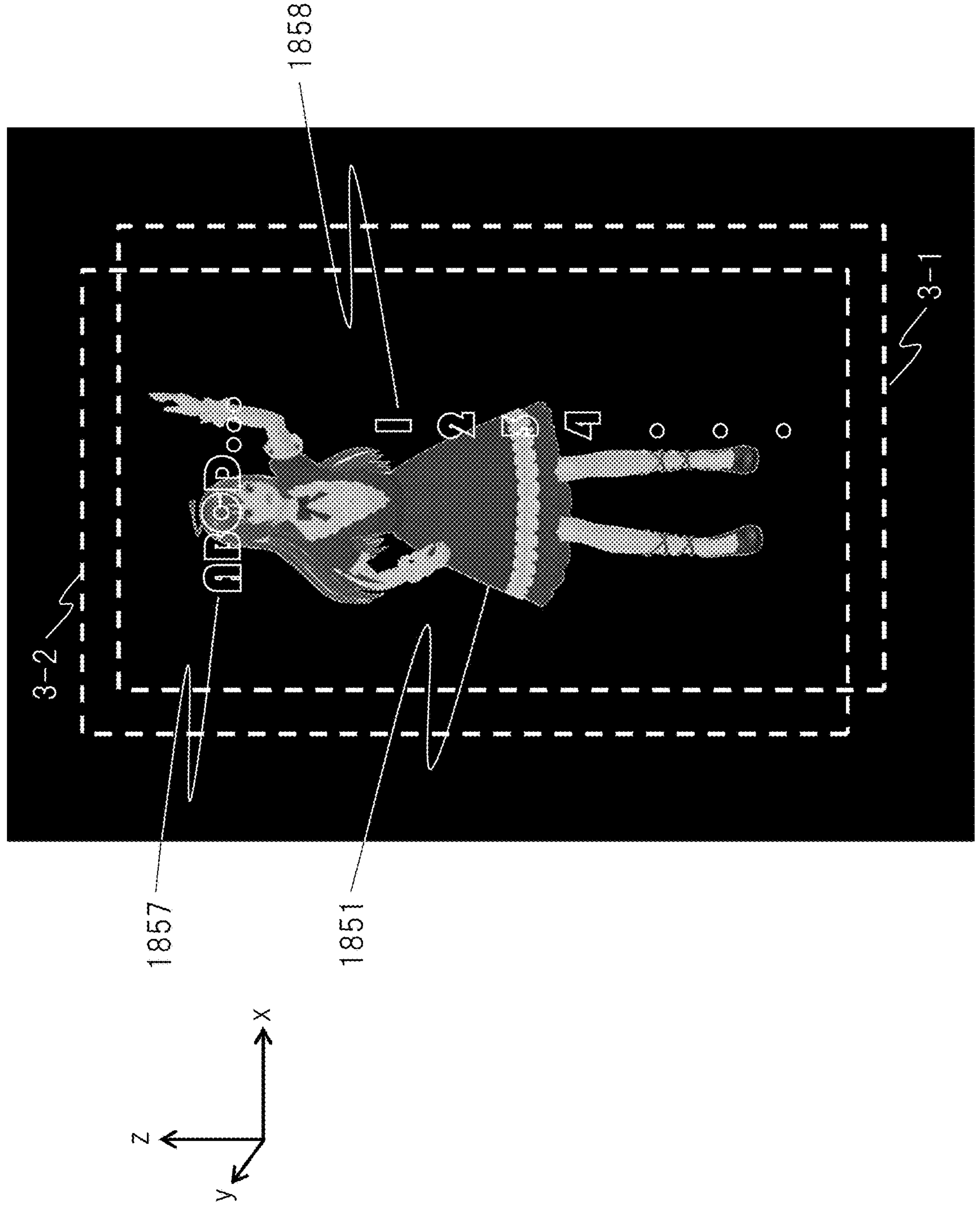
FIG. 18D is a diagram showing a display example of the air floating video display apparatus according to one embodiment of the present invention.

Next, another display example in an air floating video display apparatus configured to display air floating videos in multiple layers having different projection amounts will be described with reference to FIG. 18D. The air floating video 3-1 and the air floating video 3-2 shown in FIG. 18D are air floating videos in multiple layers having different projection amounts. It is the air floating video 3-1 that is displayed on the near side as viewed from the user, and it is the air floating video 3-2 that is displayed on the far side as viewed from the user.

The display example of FIG. 18D can be used in, for example, the air floating video display apparatus provided with any of the optical systems shown in FIG. 15A to FIG. 17A. The display example of FIG. 18D can be used in, for example, any of the air floating video display apparatuses shown in FIG. 17B to FIG. 17D. For example, when the display example of FIG. 18D is applied to the air floating video display apparatus 1000 of FIG. 17B, the air floating video 3-1 corresponds to the air floating video 3E of FIG. 17B, and the air floating video 3-2 corresponds to the air floating video 3D of FIG. 17B.

In FIG. 18D, the display object 1851 is an object displayed in the display video of the air floating video 3-2. In the example of FIG. 18D, the display object 1851 is a display object of a character. In the example of FIG. 18D, the character is a human character. In the example of FIG. 18D, a display object 1857 and a display object 1858 are objects displayed in the display video of the air floating video 3-1. In the example of FIG. 18D, the display object 1857 and the display object 1858 are foreground objects. In the example of FIG. 18D, the foreground object is an object to be displayed spatially in front of the main content of the display content (on the near side as viewed from the user). In the example of FIG. 18D, the background is a letter.

In other words, as the secondary content for the display object 1851 of a character which is the main content of the display content, the letter is displayed in the foreground in FIG. 18D. This display example is, for example, an animated video of the character of the display object 1851 singing a song, and the letters of the song's lyrics are displayed in the foreground as the display objects 1857 and 1858. In this drawing, the display object 1857 is an example of horizontally written letters, and the display object 1858 is an example of vertically written letters.

In the example of FIG. 18D, the display object 1857 and the display object 1858 which are the lyrics of the song being sung by the character of the display object 1851 displayed in the display video of the air floating video 3-2 are displayed in the air floating video 3-1 in the foreground in synchronization with the animation of the character singing the song. In other words, as the singing progresses, the lyrics displayed may be changed in conjunction with it. Various expressions are possible for the display position of the lyrics, the orientation, size, font, and others of the letters. The letters may be scrolled in accordance with the progression of the singing, or the letters may be switched and displayed between a few letters at a time while changing their position and size.

Unlike the display example of FIG. 18B, there is no particular need to avoid overlapping between the display object 1851 of the character and the display object 1857 or the display object 1858 of the letter. If this is effective as a display performance, the objects may be displayed such that they appear to overlap as viewed from the front as in FIG. 18D.

In general, there exists a technique for displaying video and text information in an overlapping manner even on flat 2D displays. However, when video and text information are displayed in an overlapping manner on a flat 2D display without special processing, no motion parallax occurs in the positional relationship between the video and text information even if user changes his/her viewpoint. Therefore, even if text information is superimposed on top of the video, the user will visually recognize it as if it is superimposed on the same plane as the video, and it is not easy to make the user recognize that the text information is displayed at a position different from the video in depth.

Also, in this case, the video on which text information is superimposed on a flat 2D display is likely to be recognized as the video on a flat plane because motion parallax does not occur in the positional relationship between the video and the text information even if the user changes his/her viewpoint, and it is difficult for the user to stereoscopically view the video.

In contrast, in the example of FIG. 18D, since the air floating video 3-1 and the air floating video 3-2 are real images with a difference in depth, when the user moves his/her head to change his/her viewpoint, the distance and relative position of the display object 1857 and display object 1858 of the letters change with respect to the position of the display object 1851 of the character due to the principle of motion parallax. This makes it possible for the user to easily recognize that the display object 1857 and display object 1858 of the letters are displayed in front of the display object 1851 of the character.

At this time, it is easy to recognize that the display object 1857 and display object 1858 of the letters displayed in the air floating video 3-2 are not on the same plane as the display object 1851 of the character displayed in the air floating video 3-1. This is more favorable because the display of the display object 1851 of the character displayed in the air floating video 3-1 is not subject to the restriction of planar recognition that it is on the same plane as the display object 1857 and display object 1858 of the letters.

Note that the motion parallax in the display example of FIG. 18D described above is a motion parallax that occurs based on the actual spatial positions of the air floating video 3-1 and the air floating video 3-2 which are real images, and is not a pseudo motion parallax. This is different from the technique that generates a pseudo motion parallax by image processing based on the user's viewpoint position. The technique shown in the display example of FIG. 18D does not require video processing based on the user's viewpoint position, and the amount of processing can be relatively reduced. Also, although the technique that requires image processing based on the user's viewpoint position often cannot easily cope with simultaneous viewing by a plurality of people, the technique shown in the display example of FIG. 18D does not require video processing based on the user's viewpoint position, and it is thus possible to obtain a more favorable motion parallax effect for each user even if a plurality of different users view from different angles.

Note that the example of FIG. 18D shows the case where the display object 1857 and the display object 1858 are displayed simultaneously, but this is an example of the letter display modes and they do not necessarily need to be displayed simultaneously. There may be times when neither is displayed.

Figure 18E:
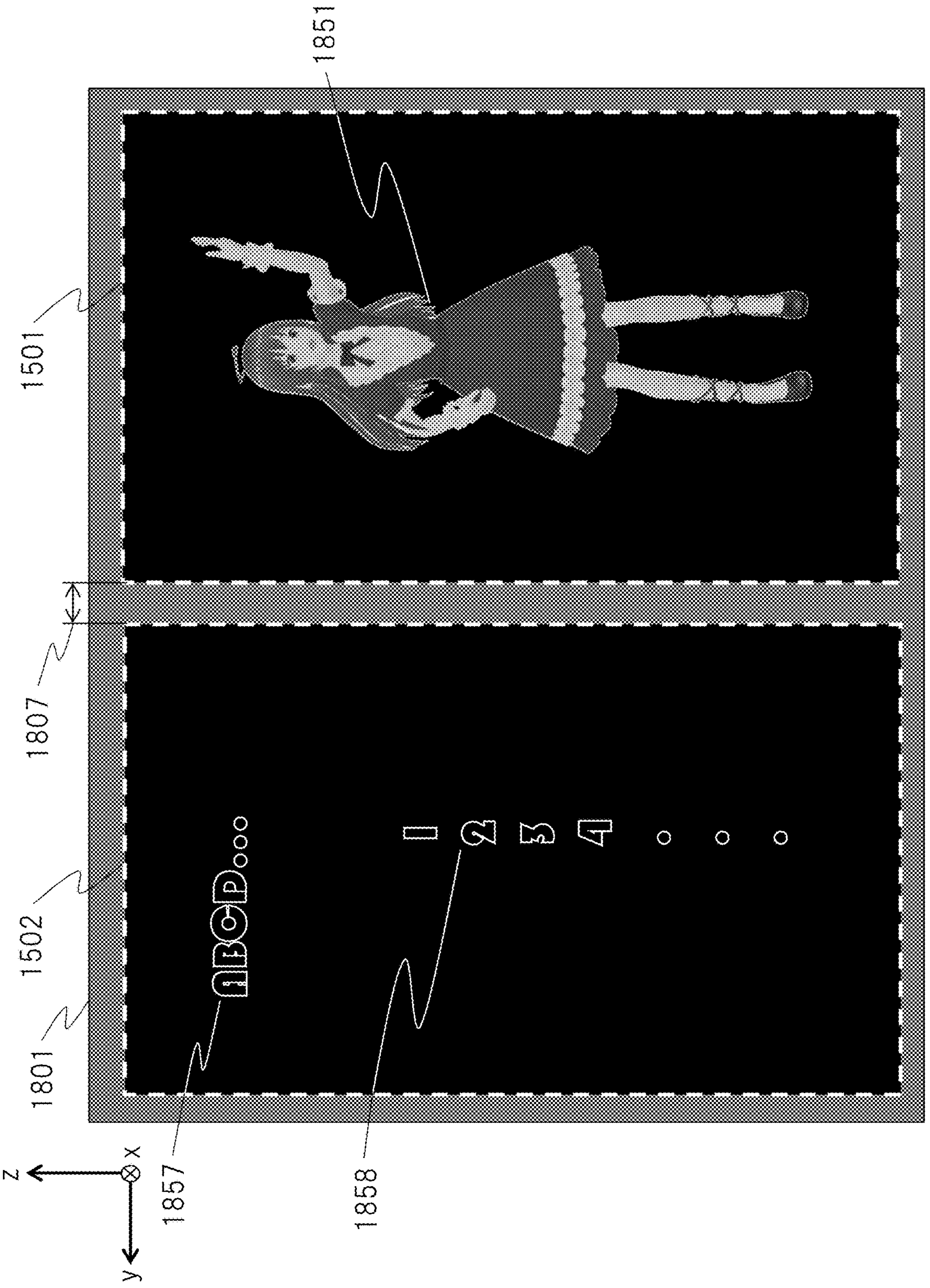
FIG. 18E is a diagram showing a display example of the air floating video display apparatus according to one embodiment of the present invention.

Next, an example of the display videos of the display apparatus 1 which are the original videos of the air floating video 3-1 and the air floating video 3-2 described in FIG. 18D will be described with reference to FIG. 18E. FIG. 18E shows an example of the display video of the display apparatus 1 when the display example of FIG. 18D is displayed using the air floating video display apparatus 1000 of FIG. 17B provided with the optical system of FIG. 17A.

The display screen 1801 of the display apparatus 1 includes the display region 1501 and the display region 1502. In the air floating video display apparatus 1000 of FIG. 17B, the display video of the display region 1502 of the display apparatus 1 is displayed in the air as the air floating video 3E, and this corresponds to the air floating video 3-1 of FIG. 18D. In the air floating video display apparatus 1000 of FIG. 17B, the display video of the display region 1501 of the display apparatus 1 is displayed in the air as the air floating video 3D, and this corresponds to the air floating video 3-2 of FIG. 18D. The display video of the display region 1502 displayed in the air floating video 3-1 of FIG. 18D is displayed on the near side of the user relative to the display video of the display region 1501 displayed in the air floating video 3-2 of FIG. 18D.

Note that, when the optical system of FIG. 15A to FIG. 16B is used, the front-to-back relationship between the air floating video 3D and the air floating video 3E in the depth direction as viewed from the user is reversed, and thus the display video of the display region 1501 is displayed in the air on the near side relative to the display video of the display region 1502.

Here, the advantage of displaying video sources of two videos which are displayed at different depth positions in the air, by single hardware, that is, the display apparatus 1 as in the example of FIG. 18E is the same as that described in FIG. 18C, and thus repetitive descriptions thereof will be omitted. Also, the advantage of providing the region of the gap 1807 between the display region 1501 and the display region 1502 as in the example of FIG. 18E is the same as that described in FIG. 18C, and thus repetitive descriptions thereof will be omitted.

Here, a first processing example for the process to realize the display example of FIG. 18E will be described using the configuration of the air floating video display apparatus 1000 of FIG. 3. The first processing example is an example in which the video to be displayed in the display region 1501 and the video to be displayed in the display region 1502 are each reproduced and displayed from the storage 1170.

The content including video information of the singing character of the display object 1851, the text information of the lyrics, and additional information such as display timing information of the text information is stored in the storage 1170 in advance, and the video controller 1160 reproduces the video information of the singing character of the display object 1851 and arranges the reproduced video information at a position corresponding to the display region 1501 of the display apparatus 1 of FIG. 18E.

The video controller 1160 may further control to reproduce the text information and the additional information of the content stored in the storage 1170 and display them in the display region 1502 of the display apparatus 1 of FIG. 18E in synchronization with the display of the video information described above using the display timing information. At this time, if the additional information includes information such as the display position, size, font, and display color of the text information, the display position, size, font, and display color of the text information can be determined for display based on the information.

Also, a second processing example for the process to realize the display example of FIG. 18E will be described using the configuration of the air floating video display apparatus 1000 of FIG. 3. The second processing example is an example in which a content creator, who comprehends the layout of the entire screen of the display screen 1801 of the display apparatus 1 and the display regions 1501 and 1502 shown in FIG. 18E, creates video content corresponding to the display screen 1801 including the display region 1501 and the display region 1502 in advance and stores the content in the storage 1170, and the video controller 1160 controls to reproduce the video of the content and display it on the entire screen of the display screen 1801 of the display apparatus 1.

The video of the video content has the content corresponding to the display screen 1801, includes a video of the display object 1851 which is a singing character at a position corresponding to the display region 1501, and includes videos of the display object 1857 and the display object 1858 which are objects of the letters of lyrics at positions corresponding to the display region 1502. Since the video of the content already corresponds to the layout of the entire screen of the display screen 1801 and the display regions 1501 and 1502 of FIG. 18E when stored in the storage 1170, the video controller 1160 only needs to control to reproduce the video of the content and display it on the entire screen of the display screen 1801 of the display apparatus 1, and it is not always necessary to perform complex image superimposing processing when displaying the content, making it possible to reduce the processing amount.

Also, a third processing example for the process to realize the display example of FIG. 18E will be described using the configuration of the air floating video display apparatus 1000 of FIG. 3. In the third processing example, a content creator, who comprehends the layout of the entire screen of the display screen 1801 of the display apparatus 1 and the display regions 1501 and 1502 shown in FIG. 18E, creates video content corresponding to the display screen 1801 including the display region 1501 and the display region 1502 in advance and stores the content in an external device different from the air floating video display apparatus 1000.

The external device and the air floating video display apparatus 1000 are connected such that a video output signal from the external device can be input from the video signal input unit 1131 of the air floating video display apparatus 1000 in FIG. 3. The external device outputs a video signal of the video content corresponding to the display screen 1801 including the display region 1501 and the display region 1502, and inputs it to the video signal input unit 1131 of the air floating video display apparatus 1000. The video controller 1160 controls to reproduce the video signal of the video content input to the video signal input unit 1131 and display it on the display screen 1801 of the display apparatus 1.

The content of the video content is similar to that of the second processing example for the process to realize the display example of FIG. 18E, and thus repetitive descriptions thereof will be omitted. Since the video of the content already corresponds to the layout of the entire screen of the display screen 1801 and the display regions 1501 and 1502 of FIG. 18E when input to the video signal input unit 1131, the video controller 1160 only needs to control to reproduce the video of the content and display it on the entire screen of the display screen 1801 of the display apparatus 1, and it is not always necessary to perform complex image superimposing processing when displaying the content, making it possible to reduce the processing amount.

Furthermore, a fourth processing example for the process to realize the display example of FIG. 18E will be described using the configuration of the air floating video display apparatus 1000 of FIG. 3. The fourth processing example is an example in which a video generation program is used to generate the video to be displayed in the display region 1501 and the video to be displayed in the display region 1502 by rendering them from a 3D model.

Specifically, first, the video generation program capable of generating a rendering video of a 3D model of the character corresponding to the display object 1851 and generating a rendering video of a model of the text information in a 3D space corresponding to the display object 1857 and the display object 1858 is stored in the storage 1170 in advance. The controller 1110 reads out the video generation program from the storage 1170 and deploys it in the memory 1109. The controller 1110 executes the video generation program deployed in the memory 1109, and the video generation program generates the video of the display object 1851 by rendering the 3D model of the singing animated character.

The video controller 1160 controls to display the generated video of the display object 1851 in the display region 1501 of FIG. 18E. In parallel, the video generation program generates the videos of the display object 1857 and the display object 1858 by rendering the model of the text information in the 3D space. The video controller 1160 may control to display the generated videos of the display object 1857 and the display object 1858 in the display region 1501 of FIG. 18E.

Note that a character video rendered from a 3D model may be used as the display object 1851 of the character which is the main content. Alternatively, a 2D animation character may be used. Alternatively, a live-action video of a human or the like may be used as the character video. A music promotion video of a singing character or human may be used as the display object 1851 of the character.

Further, in the example of FIG. 18D, the display object 1857 and the display object 1858 which are the secondary contents are the display objects of the letters indicating the lyrics of the song that the character is singing, but the display objects 1857 and 1858 are not limited to these, and may be the display objects of so-called effect images displayed in front of the character. Specific examples of the effect images include an effect image that displays stars showing sparkling, an effect image that displays a thunder, an effect image that displays rain, an effect image that displays falling snow, and an effect image that displays fluttering petals, and any display objects capable of displaying effects in front of the character may be used. These effect images may also be displayed in conjunction with the animation of the character which is the main content.

Even when the effect images are displayed as the display object 1857 and the display object 1858 which are the secondary contents, the display object 1857 and the display object 1858 are displayed in an air floating video having a different depth from the display object 1851 of the character which is the main content, and the motion parallax occurs. This provides the effect of making the display object of the character or the like less likely to be subject to the restriction that it is planarly recognized even when the display object of the effect image is superimposed in front of the display object of the character.

According to the display examples of FIG. 18D and FIG. 18E described above, in the air floating video display apparatus configured to display air floating videos in multiple layers having different projection amounts, the text information and the effect image which are secondary contents can be displayed at the display positions different in the depth direction from the display object of the character or the like which is the main content in conjunction with it. This is more favorable because it is possible to make the display object of the character or the like less likely to be subject to the restriction that it is planarly recognized even when the display object of the letters and the display object of the effect image are displayed at the positions superimposed on the display object of the character.

In the display examples of FIG. 18D and FIG. 18E, the case where the air floating video 3-1 and the air floating video 3-2 having different depths are used, the display object 1851 of the character is displayed as the air floating video 3-2, and the display object 1857 and display object 1858 of the letters are displayed as the air floating video 3-1 has been described. This allows the user to easily recognize that the display object 1857 and display object 1858 of the letters are displayed on the near side relative to the display object 1851 of the character.

In contrast to this, as a modification, an object of an operation menu may be displayed as the air floating video 3-1 instead of or in addition to the display object of the letter. The object of the operation menu may be an operation menu for operating the air floating video display apparatus 1000. Examples of the operations of the air floating video display apparatus 1000 include an operation to adjust the output audio level of the audio output unit 1140, a mute operation, and others.

Also, the object of the operation menu may be an operation menu for performing operations related to the display of the display object 1851 of the character which is the main content. Examples of the operations related to the display of the display object 1851 include an operation to switch characters, an operation to change the shape or color of the character's costume, an operation to change the character's motion, and others. Examples of the operations related to the display of the display object 1851 may further include an operation to change the display brightness of the display object 1851, an operation to change the display position, an operation to change the display size, and others.

For example, if configured such that the user operation to the air floating video 3-1 on the near side of the multiple air floating videos having different depths can be detected as in the aerial operation detection sensor 1351E shown in FIG. 17C, it becomes possible to perform various operations by operating the object of the operation menu. With this configuration, it becomes possible to operate the display of another air floating video having a different depth from one air floating video by using the user operations via the operation menu displayed on the one air floating video of the multiple air floating videos having different depths.

In addition, because of the motion parallax effect caused by the viewpoint movement, the user can clearly recognize that the object of the operation menu displayed in the air floating video 3-1 located on the near side and the object of the main content displayed in the air floating video 3-2 located on the far side are displayed at multiple display positions different in depth.

In the technique according to the present embodiment, by displaying the high-resolution and high-luminance video information in the air floating state, for example, the user can operate without feeling anxious about contact infection of infectious diseases. If the technique according to the present embodiment is applied to a system used by an unspecified number of users, it will be possible to provide a non-contact user interface that can reduce the risk of contact infection of infectious diseases and can eliminate the feeling of anxiety. In this way, it is possible to contribute to "Goal 3: Ensure healthy lives and promote well-being for all at all ages" in the Sustainable Development Goals (SDGs) advocated by the United Nations.

In addition, in the technique according to the present embodiment, only the normal reflected light is efficiently reflected with respect to the retroreflection plate by making the divergence angle of the emitted video light small and aligning the light with a specific polarized wave, and thus a bright and clear air floating video can be obtained with high light utilization efficiency. With the technique according to the present embodiment, it is possible to provide a highly usable non-contact user interface capable of significantly reducing power consumption. In this way, it is possible to contribute to "Goal 9: Build resilient infrastructure, promote inclusive and sustainable industrialization and foster innovation" and "Goal 11: Make cities and human settlements inclusive, safe, resilient and sustainable" in the Sustainable Development Goals (SDGs) advocated by the United Nations.

In the foregoing, various embodiments have been described in detail, but the present invention is not limited only to the above-described embodiments, and includes various modifications. For example, in the above-described embodiments, the entire system has been described in detail so as to make the present invention easily understood, and the present invention is not necessarily limited to that including all the configurations described above. Also, part of the configuration of one embodiment may be replaced with the configuration of another embodiment, and the configuration of one embodiment may be added to the configuration of another embodiment. Furthermore, another configuration may be added to part of the configuration of each embodiment, and part of the configuration of each embodiment may be eliminated or replaced with another configuration.

REFERENCE SIGNS LIST

1 . . . display apparatus, 2 . . . retroreflection plate (retroreflective plate), 3 . . . space image (air floating video), 105 . . . window glass, 100 . . . transparent member, 101 . . . polarization separator, 101B . . . polarization separator, 12 . . . absorptive polarization plate, 13 . . . light source apparatus, 54 . . . light direction conversion panel, 151 . . . retroreflection plate, 102, 202 . . . LED substrate, 203 . . . light guide, 205, 271 . . . reflection sheet, 206, 270 . . . retardation plate, 230 . . . user, 1000 . . . air floating video display apparatus, 1110 . . . controller, 1160 . . . video controller, 1180 . . . imager, 1102 . . . video display, 1350 . . . aerial operation detector, 1351 . . . aerial operation detection sensor

The invention claimed is:

1. An air floating video display apparatus configured to display an air floating video, the air floating video display apparatus comprising:

a display configured to display a video;

a first polarization separator;

a first λ/4 plate;

a first retroreflection plate;

a second polarization separator;

a second λ/4 plate;

a specular reflection plate;

a third λ/4 plate; and a second retroreflection plate, wherein a display screen of the display includes a first video display region and a second video display region, and wherein the display, the first polarization separator, the first λ/4 plate, the first retroreflection plate, the second polarization separator, the second λ/4 plate, the specular reflection plate, the third λ/4 plate, and the second retroreflection plate are arranged such that:

a video light of a specific polarized light emitted from the first video display region of the display screen of the display passes through the first polarization separator, the transmitted video light passes through the first λ/4 plate and is retroreflected by the first retroreflection plate, the video light retroreflected by the first retroreflection plate passes through the first λ/4 plate, thereby being converted into a video light of the other polarized light whose phase differs by 90° from the specific polarized light, and the video light of the other polarized light is reflected by the first polarization separator and forms a first air floating video which is a real image in air; and a video light of a specific polarized light emitted from the second video display region of the display screen of the display passes through the second polarization separator, the transmitted video light passes through the second λ/4 plate and is reflected by the specular reflection plate, the video light reflected by the specular reflection plate passes through the second λ/4 plate, thereby being converted into a video light of the other polarized light whose phase differs by 90° from the specific polarized light, the video light of the other polarized light is reflected by the second polarization separator, passes through the third λ/4 plate, and is retroreflected by the second retroreflection plate, the video light retroreflected by the second retroreflection plate passes through the third λ/4 plate, thereby being converted into the video light of the specific polarized light whose phase differs by 90° from the other polarized light, the video light of the specific polarized light traveling from the third λ/4 plate to the second polarization separator passes through the second polarization separator, the video light of the specific polarized light traveling from the second polarization separator to the first polarization separator passes through the first polarization separator, and the video light of the specific polarized light that has passed through the first polarization separator forms a second air floating video which is a real image in air.

2. The air floating video display apparatus according to claim 1, wherein the first air floating video and the second air floating video form air floating videos in multiple layers having different depths as viewed from a user.

3. The air floating video display apparatus according to claim 1, wherein the first air floating video, the second air floating video, the first polarization separator, the second polarization separator, and the second retroreflection plate are arranged on a same straight line.

4. The air floating video display apparatus according to claim 3, wherein the display, the first retroreflection plate, and the specular reflection plate are arranged at positions deviated from the same straight line.

5. An air floating video display apparatus configured to display an air floating video, the air floating video display apparatus comprising:

a display configured to display a video;

a λ/2 plate;

a first polarization separator;

a first λ/4 plate;

a first retroreflection plate;

a second polarization separator;

a second λ/4 plate; and a second retroreflection plate, wherein a display screen of the display includes a first video display region and a second video display region, and wherein the display, the λ/2 plate, the first polarization separator, the first λ/4 plate, the first retroreflection plate, the second polarization separator, the second λ/4 plate, and the second retroreflection plate are arranged such that:

a video light of a specific polarized light emitted from the first video display region of the display screen of the display passes through the first polarization separator, the transmitted video light passes through the first λ/4 plate and is retroreflected by the first retroreflection plate, the video light retroreflected by the first retroreflection plate passes through the first λ/4 plate, thereby being converted into a video light of the other polarized light whose phase differs by 90° from the specific polarized light, and the video light of the other polarized light is reflected by the first polarization separator and forms a first air floating video which is a real image in air; and a video light of a specific polarized light emitted from the second video display region of the display screen of the display passes through the λ/2 plate, thereby being converted into a video light of the other polarized light whose phase differs by 90° from the specific polarized light, and is reflected by the second polarization separator, the reflected video light passes through the second λ/4 plate and is retroreflected by the second retroreflection plate, the video light retroreflected by the second retroreflection plate passes through the second λ/4 plate, thereby being converted into the video light of the specific polarized light whose phase differs by 90° from the other polarized light, the video light of the specific polarized light traveling from the second λ/4 plate to the second polarization separator passes through the second polarization separator, the video light of the specific polarized light traveling from the second polarization separator to the first polarization separator passes through the first polarization separator, and the video light of the specific polarized light that has passed through the first polarization separator forms a second air floating video which is a real image in air.

6. The air floating video display apparatus according to claim 5, wherein the first air floating video and the second air floating video form air floating videos in multiple layers having different depths as viewed from a user.

7. The air floating video display apparatus according to claim 5, wherein the first air floating video, the second air floating video, the first polarization separator, the second polarization separator, and the second retroreflection plate are arranged on a same straight line.

8. The air floating video display apparatus according to claim 7, wherein the display and the first retroreflection plate are arranged at positions deviated from the same straight line.

9. The air floating video display apparatus according to claim 5, wherein an angle control sheet configured to shift a light traveling direction by a predetermined angle is attached to a display surface of the display, and the display is arranged so as to be inclined at an angle corresponding to the predetermined angle by which the angle control sheet shifts the light traveling direction, and wherein, since the display is arranged so as to be inclined, an optical path length of the video light emitted from the first video display region of the display screen of the display to reach the first retroreflection plate is shorter than an optical path length of the video light emitted from the second video display region of the display screen of the display to reach the second retroreflection plate.

10. An air floating video display apparatus configured to display an air floating video, the air floating video display apparatus comprising:

a display configured to display a video;

a first polarization separator;

a λ/4 plate;

a retroreflection plate;

a second polarization separator; and a λ/2 plate, wherein a display screen of the display includes a first video display region and a second video display region, and wherein the display, the first polarization separator, the λ/4 plate, the retroreflection plate, the second polarization separator, and the λ/2 plate are arranged such that:

a video light of a specific polarized light emitted from the first video display region of the display screen of the display passes through the first polarization separator, the transmitted video light passes through the λ/4 plate and is retroreflected by the retroreflection plate, the video light retroreflected by the retroreflection plate passes through the first λ/4 plate, thereby being converted into a video light of the other polarized light whose phase differs by 90° from the specific polarized light, and the video light of the other polarized light is reflected by the first polarization separator and forms a first air floating video which is a real image in air; and a video light of a specific polarized light emitted from the second video display region of the display screen of the display passes through the second polarization separator, the transmitted video light passes through the λ/4 plate and is retroreflected by the retroreflection plate, the video light retroreflected by the retroreflection plate passes through the λ/4 plate, thereby being converted into a video light of the other polarized light whose phase differs by 90° from the specific polarized light, the video light of the other polarized light is reflected by the second polarization separator, the video light reflected by the second polarization separator passes through the λ/2 plate, thereby being converted into the video light of the specific polarized light whose phase differs by 90° from the other polarized light, the video light of the specific polarized light traveling from the λ/2 plate to the first polarization separator passes through the first polarization separator, and the video light of the specific polarized light that has passed through the first polarization separator forms a second air floating video which is a real image in air.

11. The air floating video display apparatus according to claim 10, wherein the first air floating video and the second air floating video form air floating videos in multiple layers having different depths as viewed from a user.

12. The air floating video display apparatus according to claim 10, wherein the first air floating video, the second air floating video, the first polarization separator, the λ/2 plate, and the second polarization separator are arranged on a same straight line.

13. The air floating video display apparatus according to claim 12, wherein the display and the retroreflection plate are arranged at positions deviated from the same straight line.

14. The air floating video display apparatus according to claim 10, wherein an angle control sheet configured to shift a light traveling direction by a predetermined angle is attached to a display surface of the display, and the display is arranged so as to be inclined at an angle corresponding to the predetermined angle by which the angle control sheet shifts the light traveling direction, and wherein, since the display is arranged so as to be inclined, an optical path length of the video light emitted from the first video display region of the display screen of the display to reach the retroreflection plate is shorter than an optical path length of the video light emitted from the second video display region of the display screen of the display to reach the retroreflection plate.

15. An air floating video display apparatus configured to display an air floating video, the air floating video display apparatus comprising:

a display configured to display a video;

a first polarization separator;

a second polarization separator; and one or plurality of retroreflection plates, wherein a display screen of the display includes a first video display region and a second video display region, and wherein a video light emitted from the first video display region of the display screen of the display forms a first air floating video in air after undergoing a passage through the first polarization separator and a retroreflection by any one retroreflection plate included in the one or plurality of retroreflection plates, and a video light emitted from the second video display region of the display screen of the display forms a second air floating video in air after undergoing a passage or reflection by the second polarization separator and a retroreflection by any one retroreflection plate included in the one or plurality of retroreflection plates, whereby the first air floating video and the second air floating video form air floating videos in multiple layers having different depths as viewed from a user.

16. The air floating video display apparatus according to claim 15, further comprising a video processor configured to perform video processing related to the video displayed on the display, wherein, when a first display object is displayed in the first air floating video and a second display object is displayed in the second air floating video, the video processor performs the video processing by which a virtual shadow of the display object displayed in one air floating video of the first and second air floating videos located on a vertically upper side of a space where the air floating video display apparatus is installed is displayed in a part of a region of the display object displayed in the other air floating video located on a vertically lower side of the space where the air floating video display apparatus is installed.

17. The air floating video display apparatus according to claim 16, wherein the video processing of displaying the virtual shadow performed by the video processor is video processing of performing black display in the part of the region of the display object displayed in the other air floating video, video processing of reducing brightness of a video signal, or video processing of reducing saturation of the video signal.

18. The air floating video display apparatus according to claim 15, wherein, in an air floating video displayed on a near side as viewed from the user of the air floating videos in multiple layers, a first display object which is a main content is displayed near a center in a left-right direction as viewed from the user, and wherein, in an air floating video displayed on a far side as viewed from the user of the air floating videos in multiple layers, a second display object which is a secondary content is displayed at a position away from the center in the left-right direction as viewed from the user.

19. The air floating video display apparatus according to claim 18, wherein the first display object which is the main content is an object of a character.

20. The air floating video display apparatus according to claim 19, wherein the second display object which is the secondary content is a background object located behind the character.

21. The air floating video display apparatus according to claim 15, wherein, in an air floating video displayed on a far side as viewed from the user of the air floating videos in multiple layers, a first display object which is a main content is displayed, and wherein, in an air floating video displayed on a near side as viewed from the user of the air floating videos in multiple layers, a second display object which is an object arranged in front of the first display object and is a secondary content is displayed.

22. The air floating video display apparatus according to claim 21, wherein the first display object which is the main content is an object of a character.

23. The air floating video display apparatus according to claim 22, wherein the second display object which is the secondary content is an object of a letter.

24. The air floating video display apparatus according to claim 22, wherein the second display object which is the secondary content is an object of an effect image.

25. The air floating video display apparatus according to claim 15, further comprising a light-shielding plate configured to partition an optical path of the video light emitted from the first video display region of the display screen of the display toward the first polarization separator and an optical path of the video light emitted from the second video display region of the display screen of the display toward the second polarization separator, wherein a predetermined gap region is provided between the first video display region and the second video display region in the display screen of the display, the predetermine gap region is a content non-display region, and a width of the predetermined gap is larger than a thickness of the light-shielding plate.

26. An air floating video display apparatus configured to display an air floating video, the air floating video display apparatus comprising:

a display configured to display a video;

a polarization separator;

a first λ/4 plate;

a specular reflection plate;

a second λ/4 plate; and a retroreflection plate, wherein the display, the polarization separator, the first λ/4 plate, the specular reflection plate, the second λ/4 plate, and the retroreflection plate are arranged such that:

a video light of a specific polarized light emitted from a display apparatus passes through the polarization separator, the transmitted video light passes through the first λ/4 plate and is reflected by the specular reflection plate, the video light reflected by the specular reflection plate passes through the first λ/4 plate, thereby being converted into a video light of the other polarized light whose phase differs by 90° from the specific polarized light, the video light of the other polarized light is reflected by the polarization separator, passes through the second λ/4 plate, and is retroreflected by the retroreflection plate, the video light retroreflected by the retroreflection plate passes through the second λ/4 plate, thereby being converted into the video light of the specific polarized light whose phase differs by 90° from the other polarized light, the video light of the specific polarized light traveling from the second λ/4 plate to the polarization separator passes through the polarization separator, and the video light of the specific polarized light that has passed through the polarization separator forms an air floating video which is a real image in air.

27. The air floating video display apparatus according to claim 26, wherein the first λ/4 plate is attached to the specular reflection plate.

28. The air floating video display apparatus according to claim 26, wherein the second λ/4 plate is attached to the retroreflection plate.

* * * * *